United States Patent [19]

Chen et al.

[11] Patent Number: 5,197,130
[45] Date of Patent: Mar. 23, 1993

[54] CLUSTER ARCHITECTURE FOR A HIGHLY PARALLEL SCALAR/VECTOR MULTIPROCESSOR SYSTEM

[75] Inventors: Steve S. Chen, Chippewa Falls; Frederick J. Simmons, Neillsville; George A. Spix, Eau Claire; Jimmie R. Wilson, Eau Claire; Edward C. Miller, Eau Claire; Roger E. Eckert, Eau Claire; Douglas R. Beard, Eleva, all of Wis.

[73] Assignee: Supercomputer Systems Limited Partnership, Eau Claire, Wis.

[21] Appl. No.: 459,083

[22] Filed: Dec. 29, 1989

[51] Int. Cl.$^5$ .................................................. G06F 15/16
[52] U.S. Cl. .................................. 395/325; 395/800; 364/228.7; 364/228.1; 364/931.4
[58] Field of Search ............... 364/DIG. 1, DIG 2; 395/325, 800

[56] References Cited

U.S. PATENT DOCUMENTS

| | | | |
|---|---|---|---|
| 3,510,844 | 7/1966 | Aranyi et al. | 395/725 |
| 3,618,045 | 11/1971 | Campbell | 395/650 |
| 3,676,861 | 7/1972 | Ruth | 395/725 |
| 3,889,237 | 6/1975 | Alferness et al. | 395/725 |
| 3,916,383 | 10/1975 | Malcolm | 395/650 |
| 4,009,470 | 2/1977 | Danilenko et al. | 395/425 |
| 4,028,664 | 6/1977 | Monahan e. al. | 395/275 |
| 4,044,333 | 8/1977 | Ausperg et al. | 395/325 |
| 4,124,889 | 11/1978 | Kaufman et al. | 395/275 |
| 4,130,865 | 12/1978 | Heart et al. | 395/200 |
| 4,200,930 | 4/1980 | Rawlings | 364/200 |
| 4,228,496 | 10/1980 | Katzman et al. | 395/200 |
| 4,229,791 | 10/1980 | Levy et al. | 395/325 |
| 4,240,143 | 12/1980 | Besemer | 364/200 |
| 4,257,095 | 3/1981 | Nadir | 395/325 |
| 4,314,335 | 2/1982 | Pezzi | 395/725 |
| 4,351,025 | 9/1982 | Hall | 364/200 |
| 4,356,550 | 10/1982 | Katzman et al. | 395/575 |
| 4,363,096 | 12/1982 | Comfort et al. | 395/725 |
| 4,365,292 | 12/1982 | Barnes et al. | 395/800 |
| 4,365,295 | 12/1982 | Katzman et al. | 395/425 |
| 4,392,200 | 7/1983 | Arulpragasam et al. | 395/425 |
| 4,400,768 | 8/1983 | Tomlinson | 395/800 |
| 4,418,382 | 11/1983 | Larson et al. | 395/200 |
| 4,445,171 | 4/1984 | Neches | 395/325 |
| 4,449,183 | 5/1984 | Flahive et al. | 395/425 |
| 4,453,214 | 6/1984 | Adcock | 395/425 |
| 4,473,880 | 9/1984 | Budde et al. | 395/325 |
| 4,484,262 | 11/1984 | Sullivan et al. | 395/425 |
| 4,499,538 | 2/1985 | Finger et al. | 395/352 |
| 4,543,630 | 9/1985 | Neches | 395/200 |
| 4,563,738 | 1/1986 | Klan | 395/325 |
| 4,636,942 | 1/1987 | Chen et al. | 395/725 |
| 4,667,287 | 5/1987 | Allen et al. | 395/800 |
| 4,672,535 | 6/1987 | Katzman et al. | 395/275 |
| 4,707,781 | 11/1987 | Sullivan et al. | 395/425 |
| 4,718,006 | 1/1988 | Nishida | 395/425 |
| 4,719,569 | 1/1988 | Ludemann et al. | 395/725 |
| 4,720,780 | 1/1988 | Dolecek | 395/800 |
| 4,729,095 | 3/1988 | Colley et al. | 395/375 |
| 4,745,545 | 5/1988 | Schiffleger | 395/325 |
| 4,754,398 | 6/1988 | Pribnow | 395/200 |
| 4,807,116 | 2/1989 | Katzman et al. | 395/200 |
| 4,816,990 | 3/1989 | Williams | 439/843 |
| 4,834,483 | 5/1989 | Arthurs et al. | 385/46 |
| 4,845,609 | 7/1989 | Lighthart et al. | 395/275 |
| 4,845,722 | 7/1989 | Kent et al. | 370/58.2 |
| 4,873,626 | 10/1989 | Gifford | 395/325 |
| 4,891,751 | 1/1990 | Call et al. | 395/500 |
| 4,894,769 | 1/1990 | Conforti | 395/325 |

(List continued on next page.)

OTHER PUBLICATIONS

Burroughs B6700 Information Processing Systems, Reference Manual, Burroughs Corporation, 1969, 1970, 1972.

(List continued on next page.)

*Primary Examiner*—David Y. Eng
*Attorney, Agent, or Firm*—Patterson & Keough

[57] ABSTRACT

A cluster architecture for a highly parallel multiprocessor computer processing system is comprised of one or more clusters of tightly-coupled, high-speed processors capable of both vector and scalar parallel processing that can symmetrically access shared resources associated with the cluster, as well as the shared resources associated with other clusters.

19 Claims, 36 Drawing Sheets

U.S. PATENT DOCUMENTS

| | | | |
|---|---|---|---|
| 4,901,230 | 2/1990 | Chen et al. | 395/325 |
| 4,905,145 | 2/1990 | Sauber | 395/425 |
| 4,920,484 | 4/1990 | Ranade | 395/200 |
| 4,920,485 | 4/1990 | Vahidsafa | 395/725 |
| 4,924,380 | 5/1990 | McKenney | 364/200 |
| 4,937,733 | 6/1990 | Gillett, Jr. et al. | 395/325 |
| 4,945,479 | 7/1990 | Rusterholz | 395/800 |
| 4,947,368 | 8/1990 | Donaldson et al. | 395/325 |
| 4,972,342 | 11/1990 | Davis et al. | 395/375 |
| 5,010,476 | 4/1991 | Davis | 395/325 |
| 5,016,162 | 5/1991 | Epstein et al. | 395/775 |
| 5,016,167 | 5/1991 | Nguyen et al. | 395/725 |
| 5,053,942 | 10/1991 | Srini | 395/325 |
| 5,081,575 | 1/1992 | Hiller et al. | 395/325 |

OTHER PUBLICATIONS

G. Almasi and A. Gottlieb, *Highly Parallel Computing*. Benjamin Cummings Publishing Co., (1989), Chpt. 8, pp. 278–299.

Hennesy, J. and Patterson, D., Computer Architecture: A Quantitative Approach, Morgan Kaufman Publ. Inc., San Mateo, Calif. (1990), Chapter 10, "Future Directions", pp. 570–592.

Murakami, K., et al; "An Overview of the Kyushi University Reconfigured Parallel Processor", Aug. 1988, pp. 130–137.

Seznac, A., Jegou, Y., "Synchronizing Processors Through Memory Requests in a Tightly Coupled Multiprocessor", Proceedings on the 1988 International Conference on Parallel Processing, Feb. 1988, IEEE, pp. 393–400.

Naedel, D., "Closely Coupled Asynchronous Hierarchial and Parallel Processing in an Open Architecture", Conference Proceedings for the 12th Annual International Symposium on Computer Architecture, Jun. 1985, pp. 215–220.

Clementi, E., Logan, D., Saarinen, J., "ICAP/3090: Parallel Processing For Large-Scale Scientific and Engineering Problems", IBM Systems Journal, vol. 27, No. 4, 1988, pp. 475–509.

Goodman, J. and Woest, P., "The Wisconsin Multicube: A New Large-Scale Cache-Coherent Multiprocessor", Proceedings on the 1988 International Conference on Parallel Processing, Feb. 1988, IEEE, pp. 422–431.

*ETA 10 System Overview:EOS*. Tech. Note. Publ. 1006, Rev. B. ETA Systems, Sep. 30, 1988.

G. Pfister, "The IBM Research Parallel Processor Prototype (RP3): Introduction and Architecture", International Conference on Parallel Processing, pp. 764–771, Aug. 1985.

Mark, P., "The Sequioa Computer: A Fault-Tolerant Tightly-Coupled Multiprocessor Architecture", Conference Proceedings for the 12th Annual International Symposium on Computer Architecture, Jun. 1985, p. 232.

*Parallel Processing for Supercomputers and Artificial Intelligence*, McGraw Hill, 1989; Chapter 2, pp. 31–67, K. Hwang and D. DeGroot.

R. Kain, *Computer Architecture*, Prentice Hall, 1989, vol. 1, Chapter 3; pp. 178–250.

David J. Kuck, et al.; "Parallel Supercomputing Today and the Cedar Approach;" *Science*, vol. 231, pp. 967–974, Feb. 1986.

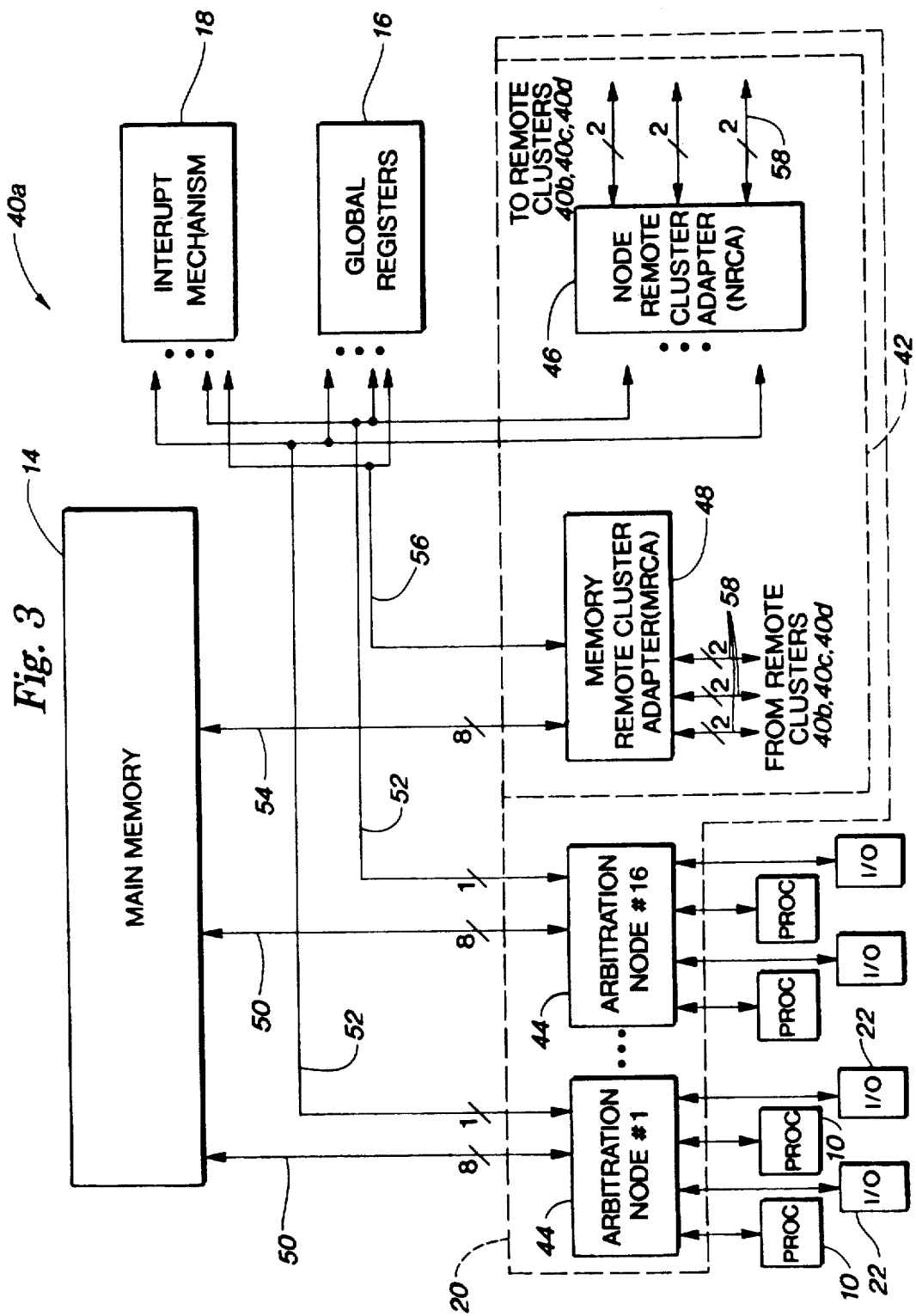

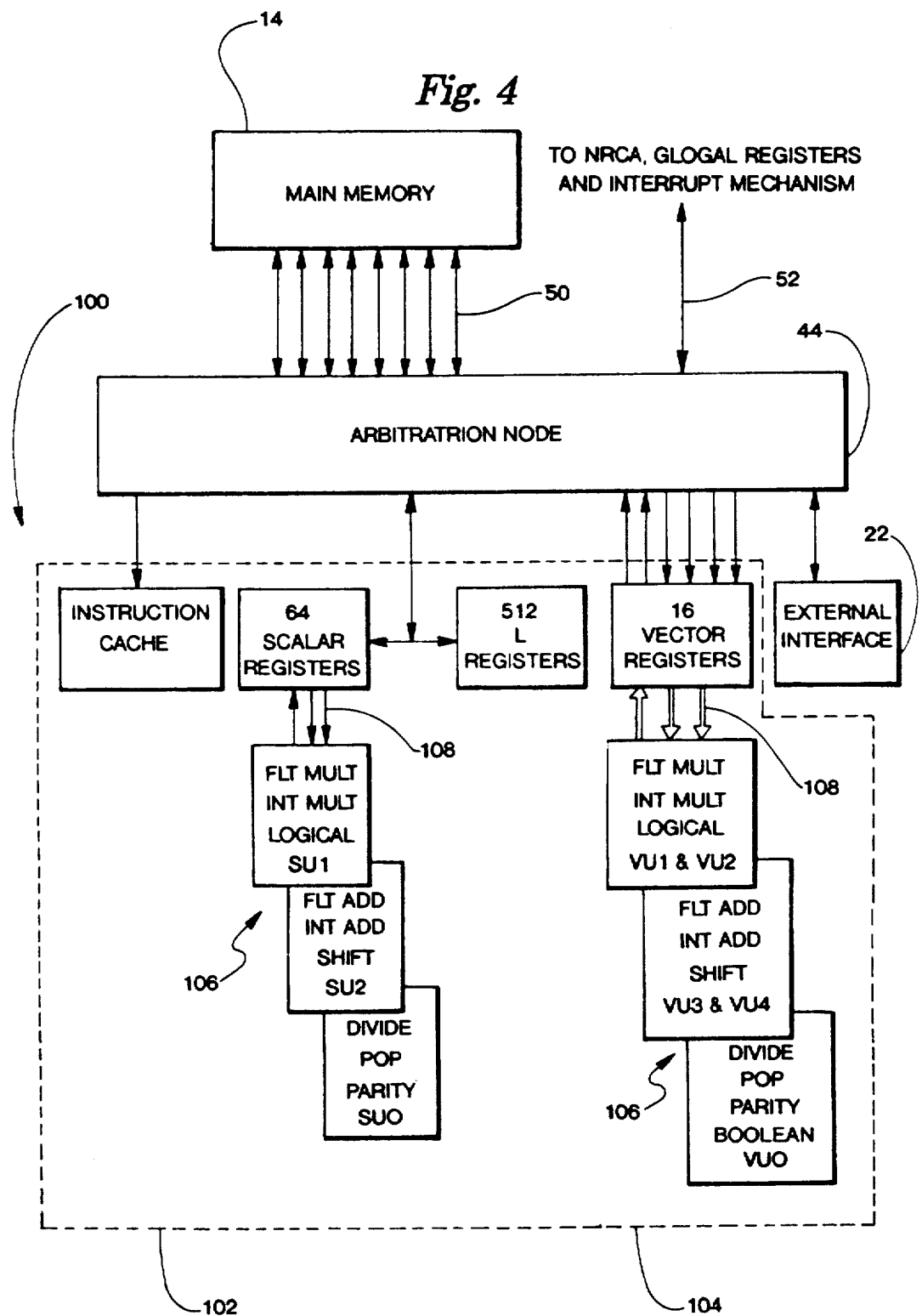

INSTRUCTION ADDRESS TRANSLATION

OPERAND ADDRESS TRANSLATION

HIGHEST                LOWEST

INITIAL STATE:   REQ 3 - REQ 2 - REQ 1 - REQ 0

HIGHEST                LOWEST

TIME 1:   REQ 3 - REQ 1 - REQ 0 - REQ 2

HIGHEST  LOWEST

TIME 2:   REQ 0 - REQ 2 - REQ 1 - REQ 3

HIGHEST  LOWEST

TIME 3:   REQ 2 - REQ 1 - REQ 3 - REQ 0

HIGHEST  LOWEST

TIME 4:   REQ 2 - REQ 1 - REQ 3 - REQ 0

EXTERNAL CLUSTER DATA FLOW DIAGRAM

EXTERNAL CLUSTER DATA FLOW DIAGRAM

Fig. 20

| PHASE | PHASE I | PHASE II | PHASE III | PHASE IV | PHASE V |
|---|---|---|---|---|---|
| TYPE | PORT TO ARBITRATION NODE | ARBITRATION NODE TO BANK | MEMORY | BANK TO ARBITRATION NODE | ARBITRATION NODE TO PORT |
| DELAY | N1 + V1 | N2 + V2 | N3 | N4 + V4 | N5 + V5 |
| CONFLICTS | SSC CQF | SBC BBC HQC | NONE | SRC DQF | PBC |

GLOBAL REGISTER PHYSICAL ADDRESS MAP

| 15 | 14 | 13 12 | 4 3 | 0 |
|---|---|---|---|---|
| SETN SELECT | CLUSTER SELECT | REGISTER SELECT | GROUP SELECT | |

GLOBAL REGISTER ADDRESS IMPLEMENTATION

| 33 32 | 31      14 | 13 12 | 3 2 | 0 |
|---|---|---|---|---|
| CLUSTER SELECT | RESERVED | SETN SELECT | REGISTER SELECT | GROUP SELECT |

SIGNAL DEVICE SELECTION

Fig. 28b
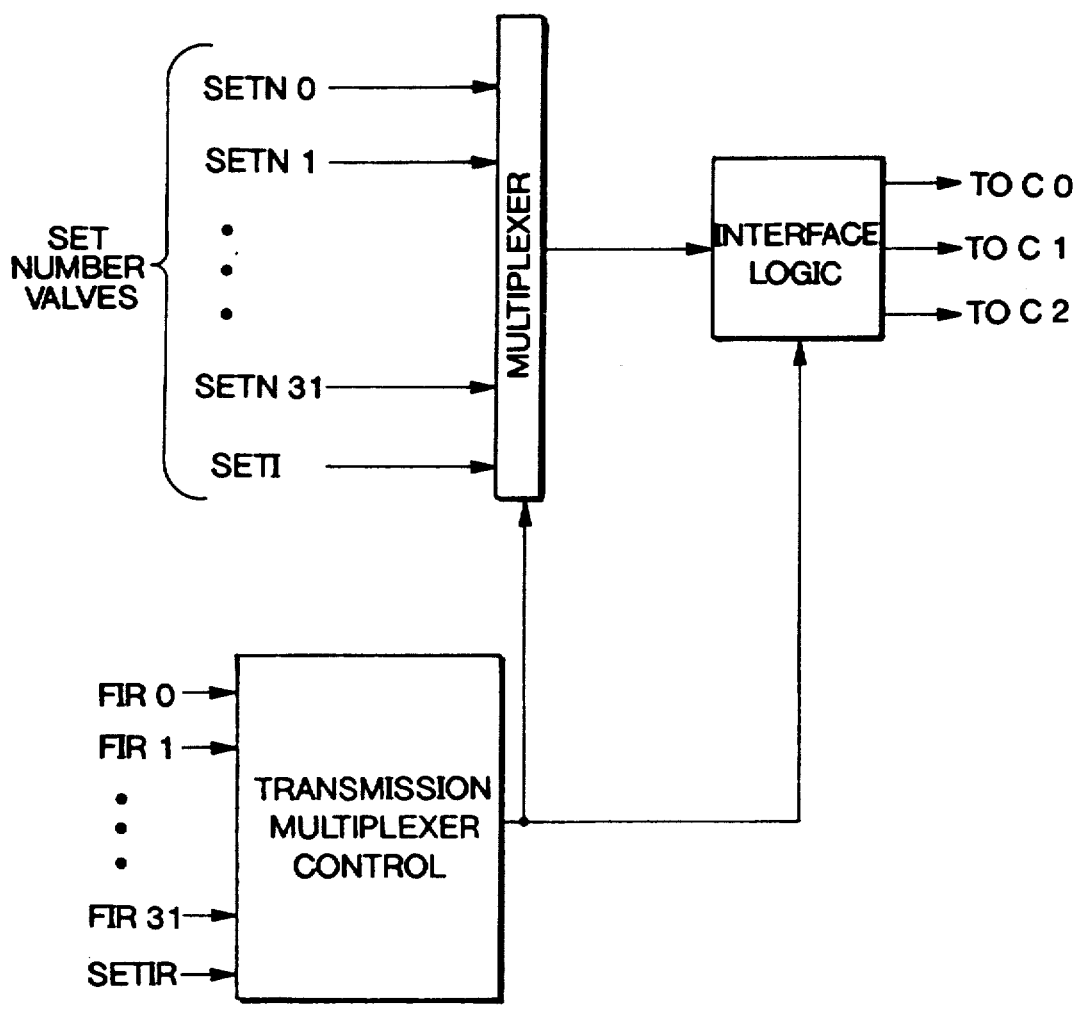
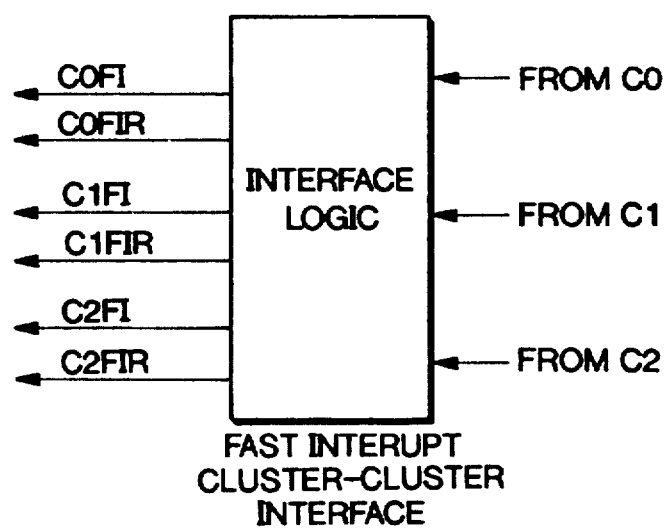
FAST INTERUPT
CLUSTER-CLUSTER
INTERFACE

ONE 1-PARCEL INSTRUCTION FORMAT

- ONE CYCLE TO ISSUE

TWO 1-PARCEL INSTRUCTIONS FORMAT

- TWO CYCLES TO ISSUE
- NO INTERRUPT BETWEEN THESE INSTRUCTIONS

ONE 2-PARCEL INSTRUCTION FORMAT

- ONE CYCLE TO ISSUE

CLUSTER ARCHITECTURE FOR A HIGHLY PARALLEL SCALAR/VECTOR MULTIPROCESSOR SYSTEM

TECHNICAL FIELD

This invention relates generally to the field of parallel computer architectures for very high-speed multiprocessor computer processing systems capable of both scaler and vector parallel processing. More particularly, the present invention relates to a method and apparatus for creating a cluster architecture for a highly parallel scaler/vector multiprocessor system. The cluster architecture provides for one or more clusters of tightly-coupled, high-speed processors capable of both vector and scaler parallel processing that can symmetrically access shared resources associated with the cluster, as well as shared resources associated with other clusters.

BACKGROUND ART

Various high-speed computer processing systems, sometimes referred to as supercomputers, have been developed to solve a variety of computationally intensive applications, such as weather modeling, structural analysis, fluid dynamics, computational physics, nuclear engineering, real-time simulation, signal processing, etc. The architectures of such present supercomputer systems can be generally classified into one of two broad categories: minimally parallel processing systems and massively parallel processing systems.

The minimally parallel class of supercomputers includes both uniprocessors and shared memory multiprocessors. A uniprocessor is a very high-speed processor that utilizes multiple functional elements, vector processing, pipeline and look-ahead techniques to increase the computational speed of the single processor. Shared-memory multiprocessors are comprised of a small number of high-speed processors (typically two, four or eight) that are tightly-coupled to each other and to a common shared-memory using either a bus-connected or direct-connected architecture.

The massively parallel class of supercomputers includes both array processors and distributed-memory multicomputers. Array processors generally consist of a very large array of single-bit or small processors that operate in a single-instruction-multiple-data (SIMD) mode, as used for example in signal or image processing. Distributed-memory multicomputers also have a very large number of computers (typically 1024 or more) that are loosely-coupled together using a variety of connection topologies such as hypercube, ring, butterfly switch and hypertrees to pass messages and data between the computers in a multiple-instruction-multiple-data (MIMD) mode.

As used within the present invention, the term multiprocessor will refer to a tightly-coupled, shared-memory multiple-processor computer processing system. The term multicomputer will refer to a loosely-coupled, multiple-processor computer processing system with distributed local memories. The terms tightly-coupled and loosely-coupled refer to the relative difficulty and time delay in passing messages and data between processors. Tightly-coupled processors share a common connection means and respond relatively quickly to messages and data passed between processors. Loosely-coupled computers, on the other hand, do not necessarily share a common connection means and may respond relatively slowly to messages and data passed between computers. An architectural taxonomy for the existing architectures of modern supercomputers using these definitions is set forth in Hwang, K., *Parallel Processing for Supercomputers and Artificial Intelligence*, pp. 31–67 (1989).

For most applications for which a supercomputer system would be useful, the objective is to provide a computer processing system with the fastest processing speed and the largest problem solving space, i.e., the ability to process a large variety of traditional application programs. In an effort to increase the problem solving space and the processing speed of supercomputer systems, the minimally parallel and massively parallel architectures previously described have been introduced into supercomputer systems.

It will be recognized that parallel computer processing systems work by partitioning a complex job into processes and distributing both the program instructions and data for these processes among the different processors and other resources that make up the computer processing system. For parallel computer processing systems, the amount of processing to be accomplished between synchronization points in a job is referred to as the granularity of the job. If there is a small amount of processing between synchronization points, the job is referred to as fine grain. If there is a large amount of processing between synchronization points, then the job is referred to as large grain. In general, the finer the granularity of a job, the greater the need for synchronization and communication among processors, regardless of whether the computer processing system is a minimally parallel or massively parallel system. The exception to this situation is the SIMD processor array system that operates on extremely parallel problems where the limited locality of shared data requires communication among only a very few processors.

The approach taken by present massively parallel computer processing systems is to increase the processing speed by increasing the number of processors working on the problem. In theory, the processing speed of any parallel computer processing system should be represented as the number of processors employed in solving a given job multiplied by the processing speed of each processor. In reality, the problems inherent in present parallel computer processing systems prevent them from realizing this full potential. The principal problems of massively parallel computer processing systems are the inability to successfully divide jobs into several generally coequal but independent processes, and the difficulties in the distribution and coordination or synchronization of these processes among the various processors and resources during actual processing. The present architectures for massively parallel computer processing systems cannot perform the interprocessor communication and coordination efficiently enough to justify the large overhead for setting up such a system because inter-processor communication is, at best, indirect. In addition, massively parallel systems sacrifice problem solving space for speed by requiring users to reprogram traditional applications to fit the distributed memory architecture of such systems. By analogy, these problems are similar to the problems that prevent a job requiring 1,000 person-hours of effort from being completed by 1,000 workers in a single hour.

Minimally parallel computer processing systems, on the other hand, attempt to increase problem solving space and processing speed by increasing the speed of the individual processors. Such minimally parallel systems have a larger problem space because a shared-memory system is required to execute traditional application programs. Unfortunately, the clock speed of the individual processors used in present minimally parallel computer processing systems is approaching the practical and theoretical limits that are achievable using current semiconductor technology. While this technique works relatively well for large grain problems where inter-processor communication is limited, the small number of processors limit the number of independent parallel processes that may be simultaneously performed, regardless of the speed of each individual processor. Again, by analogy, a 1,000 person-hour job cannot be completed in less than 125 hours if a maximum of four people can work on the job, even if each person can work twice as fast as a normal person.

Ideally, it would be desirable to extend the direct-connection methods of inter-processor communication of minimally parallel computer processing systems to the numbers of processors used in massively parallel computer processing systems. Unfortunately, the present direct-connection methods of coordinating the processors in minimally parallel systems severely limits the number of processors that may be efficiently interconnected and cannot be extended to serve the numbers of processor utilized in a massively parallel system. For example, in the architecture for the Cray X-MP supercomputer system developed by Cray Research, Inc., that is the subject of U.S. Pat. No. 4,363,942, a deadlock interrupt means is used to coordinate two high-speed processors. While this type of tightly-coupled, direct-connection method is an efficient means for coordinating two high speed processors, the hardware deadlock interrupt mechanism described in this invention is most effective when the number of processors being coupled together is very small, i.e., eight or less.

Because of the inherent limitations of the present architectures for minimally parallel and massively parallel supercomputer systems, such computer processing systems are unable to achieve significantly increased processing speeds and problem solving spaces over current systems. Therefore, a new architecture is needed for interconnecting parallel processors and associated resources that allows the speed and coordination of current minimally parallel multiprocessor systems to be extended to larger numbers of processors, while also resolving some of the synchronization problems associated with massively parallel multicomputer systems. This range between minimally parallel and massively parallel systems will be referred to as highly parallel computer processing systems and can include multiprocessor systems having sixteen to 1024 processors.

Presently, the only attempts to define an architecture suitable for use with such highly parallel computer processing systems have been memory-hierarchy type supercomputers. In these systems, some type of hierarchical or divided memory is built into the supercomputer system.

In the Cedar supercomputer system developed at the University of Illinois, a two stage switch is used to connect an existing cluster of processors in the form of an Alliant FX/8 eight processor supercomputer to an external global memory module. In this system, the global memory is separate and distinct from the cluster memory. Coordination among clusters is accomplished by paging blocks of data or instructions in and out of each cluster memory from common blocks of data or instructions in the global memory. Kuck, D., "Parallel Supercomputing Today and the Cedar Approach", *Science*, Vol. 231, pp. 967-74 (February 1986).

In the ETA-10 supercomputer system developed by Control Data Corporation, but now abandoned, each of eight processors has a register file and a central processor memory. Each processor also has access to a common shared memory and a shared virtual memory existing on disk storage that is accessible through eighteen I/O units. A communication buffer that is not part of the virtual memory system provides fast locking and synchronization functions. *ETA10 System Overview: EOS*, Tech. Note, Publ. 1006, Rev. B, ETA Systems, Sep. 30, 1988.

In the RP3 supercomputer system developed at the IBM Watson Research Center, 512 32-bit microprocessors are configured together in eight groups of 64 microprocessors. Each microprocessor has its own local memory, a portion of which may be reconfigurable as global memory at the run time for a particular job. In essence, the local/global boundary is dynamically determined at the beginning of each job in an attempt to maximize the granularity of the system while minimizing inter-processor communication bottlenecks. Pfister, G., "The IBM Research Parallel Processor Prototype (RP3): Introduction and Architecture", *International Conference on Parallel Processing*, pp. 764-71, August 1985.

The principal problem with using these kinds of memory-hierarchy type architectures for highly parallel supercomputer systems is that the structure of each software application program must be optimized to fit the particular memory-hierarchy architecture of that supercomputer system. In other words, the software programmer must know how the memory is divided up in the memory-hierarchy in order to similarly divide the job into tasks so as to optimize the processing speed for the particular job. If a job is not optimized for the particular memory-hierarchy, not only will the memory-hierarchy supercomputer not approach its maximum theoretical processing speed, but, in fact, the processing speed may actually be slower than other comparable supercomputers because of the memory thrashing that may occur between the different levels of memory.

While the present architectures for supercomputer systems have allowed such systems to achieve peak performances in the range of 0.2 to 2.4 GFLOPS (billion floating point operations per second), it would be advantageous to provide a method and apparatus for creating a cluster architecture for a highly parallel scaler/vector multiprocessor system that is capable of effectively connecting between sixteen and 1024 processors together in a highly parallel architecture to achieve peak performance speeds in the range of 10 to 1,000 GFLOPS. More importantly, there is a need for a highly parallel architecture for a multiprocessor computer processing system that allows for the symmetric access of all processors to all shared resources and minimizes the need for optimization of software applications to a particular memory-hierarchy.

SUMMARY OF THE INVENTION

The highly parallel multiprocessor system of the present invention is comprised of one or more multiprocessor clusters operably connected to one another. Each multiprocessor cluster includes shared resources for storing and retrieving data and control information, a plurality of tightly-coupled, high-speed processors capable of both vector and scaler parallel processing and a plurality of distributed external interfaces that allow for the transfer of data and control information between the shared resources and one or more external data sources. All of the processors and external interfaces in a cluster are symmetrically interfaced to the shared resources, both intra-cluster and inter-cluster, through a plurality of arbitration nodes. At least two processors are connected to each arbitration node. For inter-cluster access, a remote cluster adapter associated with each cluster is operably connected to remote cluster adapters in all other clusters. The remote cluster adapter allows the arbitration nodes in one cluster to access the shared resources of all other clusters, and also allows all other clusters to access the shared resources within this cluster. The remote cluster adapter allows the symmetric architecture that exists within a cluster to be extended to more than one multiprocessor cluster.

The shared resources of the present invention include a shared main memory, a shared group of global registers and a shared interrupt mechanism. Access to the shared resources is equivalent and symmetric across all processors and external interfaces, whether the processors and external interfaces are connected to the same arbitration node, to different arbitration nodes in the same cluster, or to arbitration nodes in different clusters. While the average access times for requests to shared resources may differ slightly between intra-cluster requests and inter-cluster requests, the protocol and formats of such requests do not differ. The need for job optimization which would otherwise be required in order to accommodate a particular memory-hierarchy is minimized by the symmetry of access to shared resources within the present invention.

Another important feature of the present invention is the distributed external interfaces that provide for communication of data and control information between the shared resources and external data sources. Such external data sources may include, for example, secondary memory storage (SMS) systems, disk drive storage systems, other external processors such as a host processor or front-end processor, communication networks, and conventional I/O devices such as printers, displays and workstations. The external interfaces of the present invention are connected to one or more I/O concentrators. The I/O concentrators are in turn connected to a plurality of channel adapters for interfacing with external data sources (peripherals) over standard channels and to a single high-speed channel for interfacing with a SMS system. Unlike the central I/O controllers of present shared-memory supercomputer systems or the buffered I/O systems of present memory-hierarchy supercomputer systems, the distributed external interfaces of the present invention increase the effective transfer bandwidth between the shared resources and the external data sources. Because the responsibility for I/O communication is distributed over a plurality of external interfaces and because the external interfaces are connected to the shared resources through a plurality of arbitration nodes, transfer bottlenecks are reduced.

The present invention provides an architecture for a highly parallel scaler/vector multiprocessor system with a larger problem solving space and a faster processing speed than present supercomputer architectures. These objectives are achieved by the symmetry and balance of the design of this architecture on several levels. First, both processors and external interface means are granted equivalent and symmetric access to all shared resources. Second, all processors, external interface means and shared resources are capable of operating in a distributed and democratic fashion. This allows both processors and external interface means to be considered as equal requestors by the operating system software. Third, the design of the access to the shared resource is generated from the perspective of the shared resource, rather than from the perspective of the requesting processor of I/O device. Finally, the operating system of the preferred embodiment may treat the various processes of one or more user programs as equal and symmetric processes in the allocation of these processes among the various processors, external interface means and shared resources of the present invention. In essence, the symmetry of requestors is present at all levels of the architecture, from the allocation of functional units within a processor to the allocation of processes to the various resources by the operating system. The symmetry of the architecture of the present invention is independent of the level or scale of the request for resources being considered.

In addition, the architecture of the present invention recognizes and makes use of the fact that there is a time delay between the time that a requestor makes a request for a resource and the time that the resource responds to the requestor. In essence, the present invention uses a pipeline technique between a group of requestors and the resources associated with those requestors so that multiple requests may be initiated without the need to wait for an earlier request to the completed.

This pipeline technique is present at each level throughout the architecture of the present invention. At the processor level, both a scaler means and vector means are simultaneously pipeline to various functional units for performing arithmetic and logical operations. At the arbitration node level, requests to the shared resources are pipelined, queued and arbitrated for on a symmetric basis. At the cluster level, the remote cluster adapter pipelines, queues and arbitrates inter-cluster requests. At the operating system level, the global registers and interrupt mechanisms are used to pipeline and queue processes to be executed. In addition, the processor supports pipeline execution during and through the transition from user to operating system and back to user as occurs when an operating system request is made or a signal (interrupt) is received. At the compilation level, the compiler uses a Data Mark mechanism and a Load and Flag mechanism to pipeline shared resource activities both within and among functional units, address streams, data ports, threads, processors, external interface means and clusters. In addition the instruction pipeline is maintained by compiler use of the fill instruction to preload the instruction cache.

An objective of the present invention is to provide a method and apparatus for creating a cluster architecture for a highly parallel scaler/vector multiprocessor system that is capable of effectively connecting together sixteen to 1024 high-speed processors in a highly parallel architecture that may achieve peak performance speeds in the range of 10 to 1,000 GFLOPS.

Another objective of the present invention is to provide a multiprocessor cluster of tightly-coupled, high-speed processors capable of both vector and scaler parallel processing that can symmetrically access shared resources, both in the same cluster and in different clusters.

A further objective of the present invention is to provide a cluster architecture for a highly parallel scaler/vector multiprocessor system that allows for the symmetric access of all processors to all shared resources and minimizes the need to optimize software applications to a particular memory-hierarchy.

An additional objective of the present invention is to provide a cluster architecture for a highly parallel scaler/vector multiprocessor system having distributed external interfaces that provide for communication of data and control information between shared resources and external data sources.

Still another objective of the present invention is to provide mechanisms to aid in the implementation of high performance parallel applications beyond current practice, including architectural support for extended precision floating point computation, infinite precision fixed point computation, a boolean unit for high performance bit-array manipulation, nested levels of parallelism, halt all cooperating processors on error and halt all cooperating processors when specified memory locations are referenced.

These and other objectives of the present invention will become apparent with reference to the drawings, the detailed description of the preferred embodiment and the appended claims.

DESCRIPTION OF THE DRAWINGS

FIG. 3 is a block diagram of a single multiprocessor cluster showing the arbitration node means of the preferred embodiment.

FIG. 4 is a block diagram of a single scaler/vector processor of the preferred embodiment.

FIG. 20 is a schematic representation of the various types of shared resource conflicts that may occur in the present invention.

FIGS. 28a and 28b are block diagrams of the Fast Interrupt facility of the present invention.

DESCRIPTION OF THE PREFERRED EMBODIMENTS

Figure 1:
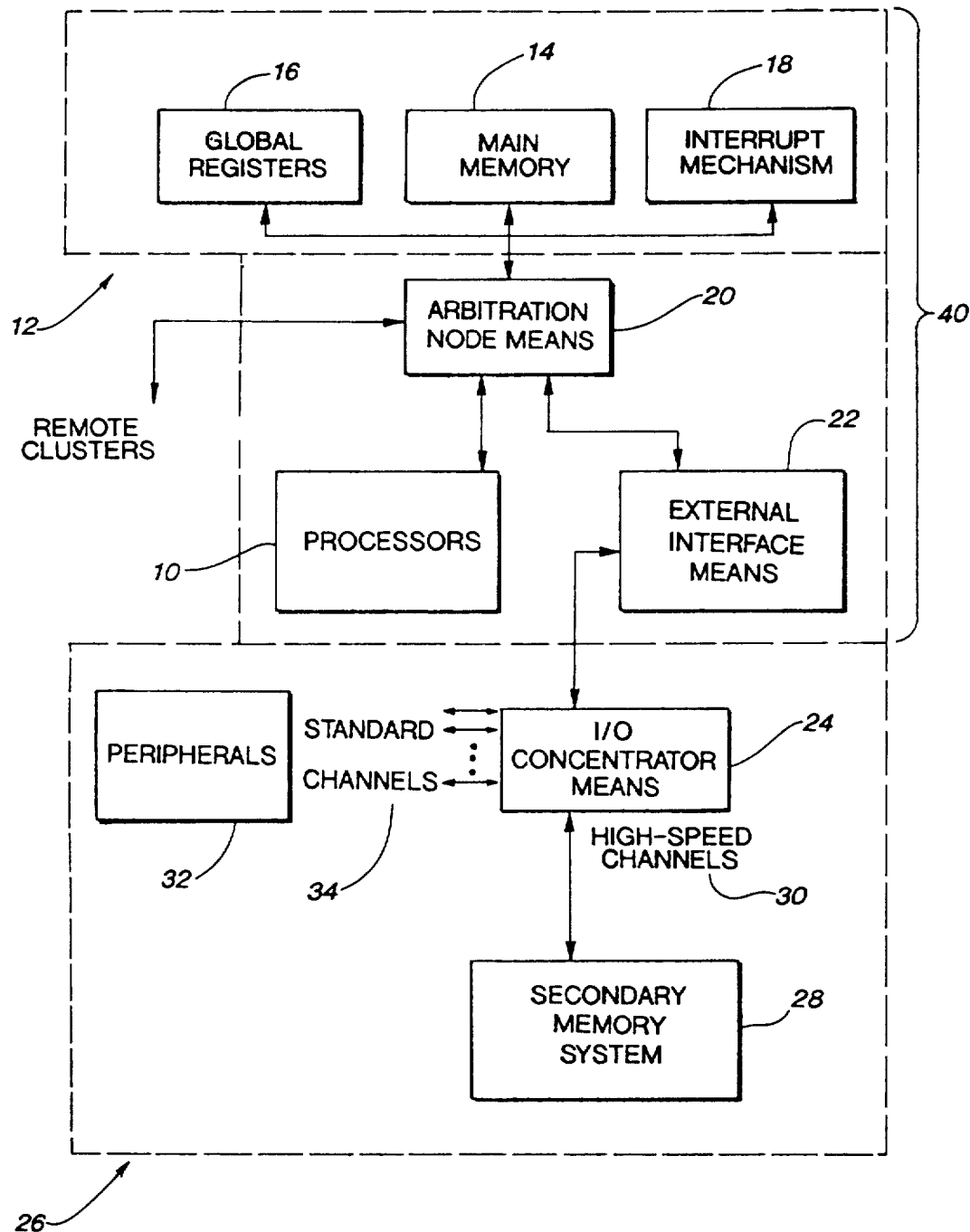
FIG. 1 is a block diagram of a single multiprocessor cluster of the preferred embodiment of the present invention.

Referring now to FIG. 1, a single multiprocessor cluster of the preferred embodiment of the present invention will be described. A cluster architecture for a highly parallel scaler/vector multiprocessor system in accordance with the present invention is capable of supporting a plurality of high-speed processors 10 sharing a large set of shared resources 12 (e.g., main memory 14, global registers 16, and interrupt mechanisms 18). The processors 10 are capable of both vector and scaler parallel processing and are connected to the shared resources 12 through an arbitration node means 20. The processors 10 are also connected through the arbitration node means 20 and a plurality of external interface means 22 and I/O concentrator means 24 to a variety of external data sources 26. The external data sources 26 may include a secondary memory storage (SMS) system 28 linked to the I/O concentrator means 24 via a high speed channel 30. The external data sources 26 may also include a variety of other peripheral devices and interfaces 32 linked to the I/O concentrator means via one or more standard channels 34. The peripheral devices and interfaces 32 may include disk storage systems, tape storage systems, terminals and workstations, printers, external processors, and communication networks. Together, the processors 10, shared resources 12, arbitration node means 20 and external interface means 22 comprise a single multiprocessor cluster 40 for a highly parallel vector/scaler multiprocessor system in accordance with the present invention.

Figure 2A:
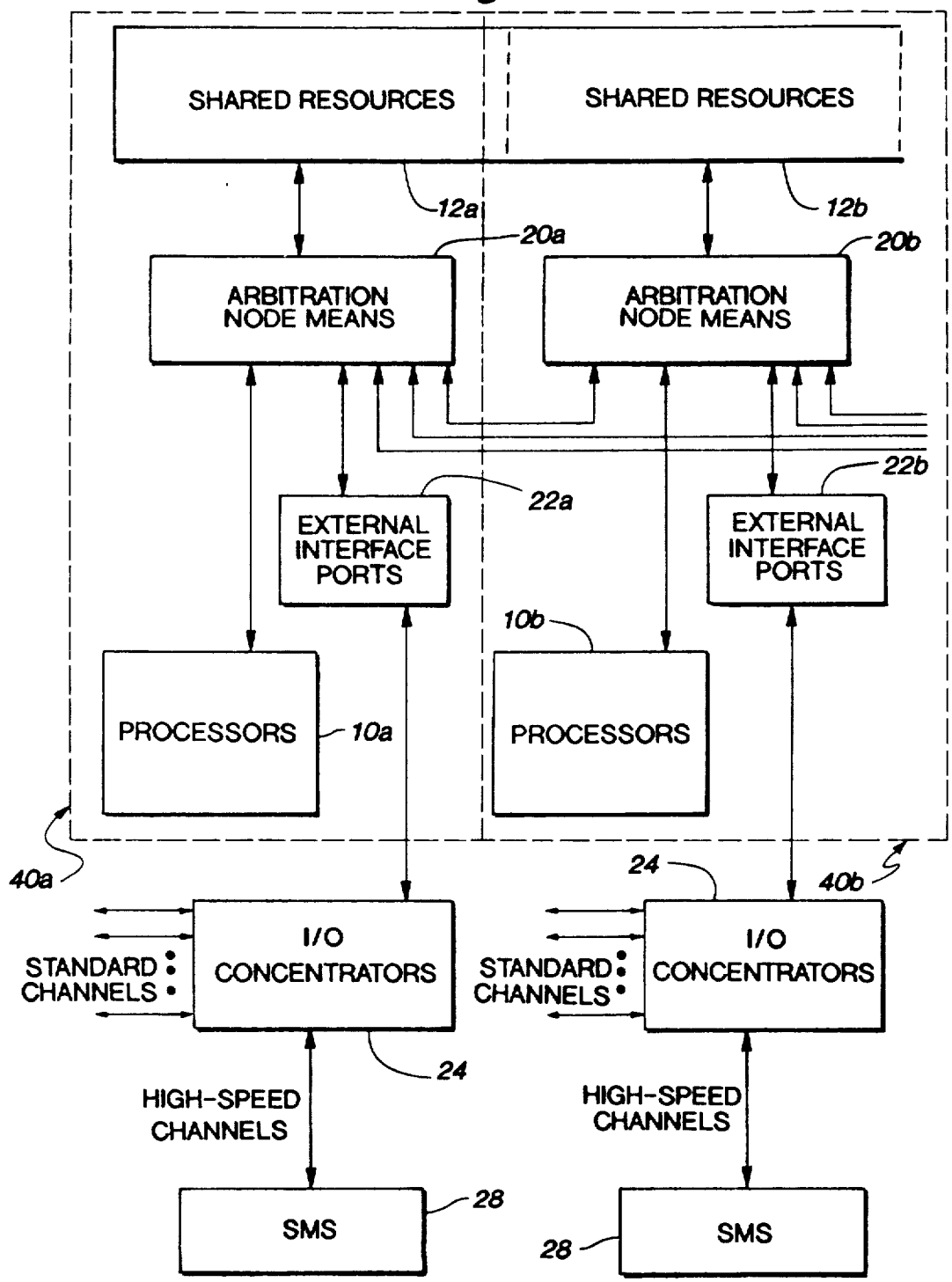
FIGS. 2a and 2b are is a block diagram of a four cluster implementation of the preferred embodiment of the present invention.
Figure 2B:
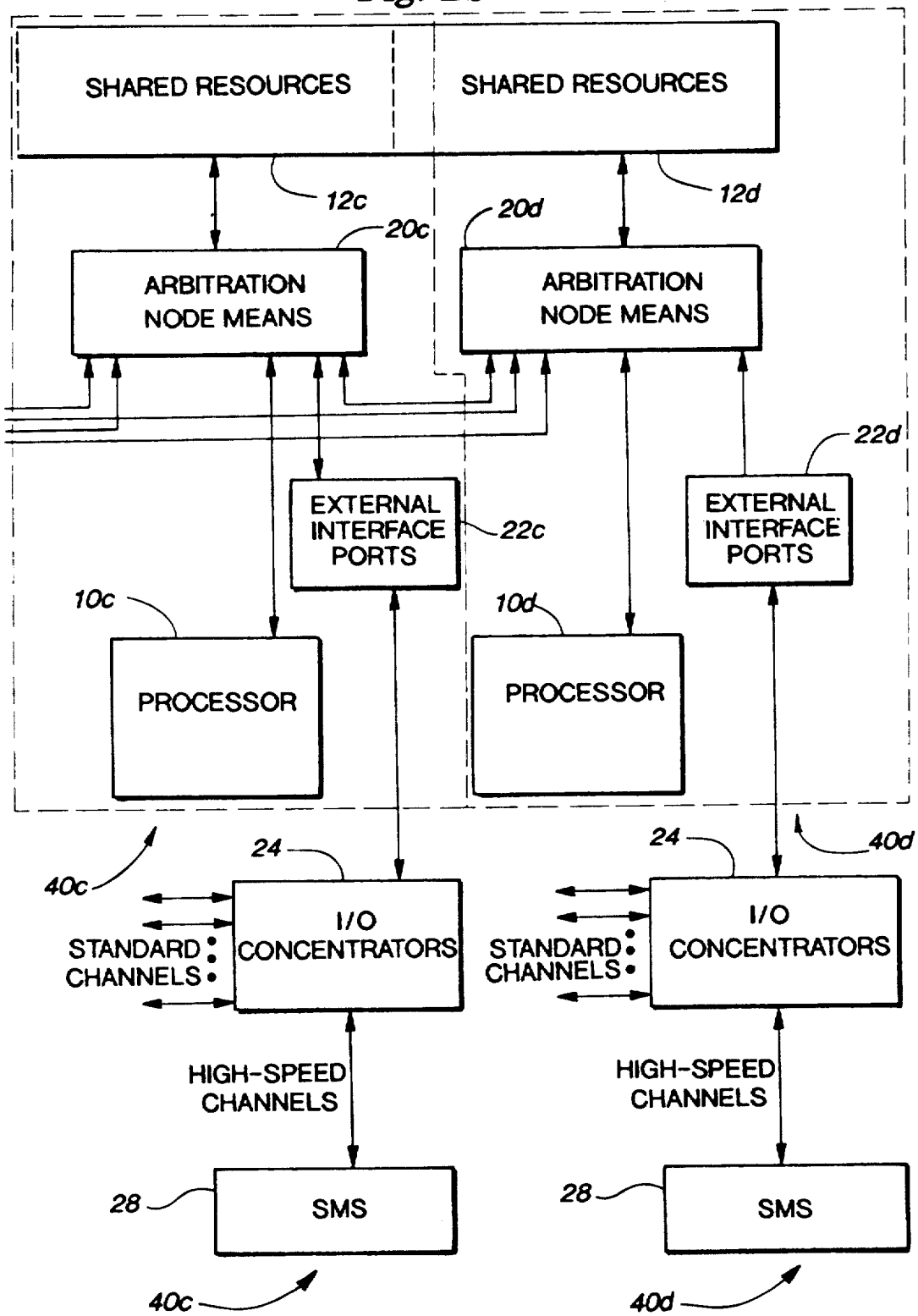

The present invention overcomes the direct-connection interface problems of present shared-memory supercomputer systems by physically organizing the processors 10, shared resources 12, arbitration node means 20 and external interface means 22 into one or more clusters 40. In the preferred embodiment shown in FIG. 2, there are four clusters: 40a, 40b, 40c and 40d. Each of the clusters 40a, 40b, 40c and 40d physically has it own set of processors 10a, 10b, 10c and 10d, shared resources 12a, 12b, 12c and 12d, and external interface means 22a, 22b, 22c and 22d that are associated with that cluster. The clusters 40a, 40b, 40c and 40d are interconnected through a remote cluster adapter means 42 that is an integral part of each arbitration node means 20a, 20b, 20c and 20d as explained in greater detail hereinafter. Although the clusters 40a, 40b, 40c and 40d are physically separated, the logical organization of the clusters and the physical interconnection through the remote cluster adapter means 42 enables the desired symmetrical access to all of the shared resources 12a, 12b, 12c and 12d across all of the clusters 40a, 40b, 40c and 40d.

In the preferred embodiment of a single cluster 40 as shown in FIG. 1, a total of 32 individual processors 10 and 32 external interface means 22 are connected to the shared resources 12 through the arbitration node means 20. The cluster architecture of the present invention provides for a maximum of 256 processors 10 and 256 external interface means 22 to be organized into a single cluster 40. Although four clusters 40a, 40b, 40c and 40d are interconnected together in the preferred embodiment shown in FIG. 2, it will be noted that a maximum of 256 clusters may be interconnected together in a single highly parallel multiprocessor system in accordance with the present invention. Accordingly, full expansion of the architecture of the present invention would yield a multiprocessor system have $2^{16}$ processors.

Referring now to FIG. 3, the preferred embodiment of the arbitration node means 20 for a single cluster 40 will be described. At a conceptual level, the arbitration node means 20 comprises a plurality of cross bar switch mechanisms that symmetrically interconnect the processors 10 and external interface means 22 to the shared resources 12 in the same cluster 40, and to the shared resources 12 in other clusters 40 through the remote cluster adapter means 42. Typically, a full cross bar switch would allow each requestor to connect to each resource where there are an equivalent number of requestors and resources. In the present invention, the arbitration node means 20 allows a result similar to a full cross bar switch to be achieved in the situation where there are more requestors than resources. In the preferred embodiment, the arbitration node means 20 is comprised of sixteen arbitration nodes 44 and the remote cluster adapter means 42. The remote cluster adapter means 42 is divided into a node remote cluster adapter (NRCA) means 46 and a memory remote cluster adapter (MRCA) means 48. The NRCA means 46 allows the arbitration node 44 to access the remote cluster adapter means 42 of all other multiprocessor clusters 40. Similarly, the MRCA means 48 controls access to the shared resources 12 of this cluster 40 from the remote cluster adapter means 42 of all other multiprocessor clusters 40.

In this embodiment, the sixteen arbitration nodes 44 interconnect thirty-two processors 10 and thirty-two external interface means 22 with the main memory 14 and the NRCA means 46. Each arbitration node 44 is connected with the main memory 14 by eight bidirectional parallel paths 50. A single parallel bidirectional path 52 connects each arbitration node 44 with the NRCA means 46. In the preferred embodiment, the same path 52 from each arbitration node 44 is also used to connect the arbitration node 44 with the global registers 16 and the interrupt mechanism 18, although it will be recognized that separate paths could be used to accomplish this interconnection. As explained in greater detail hereinafter, the minimum ratio of processors 10 to arbitration nodes 44 is 2:1. Accordingly, the maximum number of arbitration nodes 44 per cluster 40 is 128.

Like each of the arbitration nodes 44, the MRCA means 48 is connected with the main memory 14 by eight parallel bidirectional paths 54. Similarly, a single parallel bidirectional path 56 connects the MRCA means 48 with the global registers 16 and interrupt mechanism 18. A total of six parallel bidirectional paths 58 are used to interconnect the cluster with two bidirectional paths 58 from each cluster to every other cluster. For example, cluster 40a has two paths 58 that connect with each cluster 40b, 40c and 40d. In this manner, the MRCA means 48 allows other clusters 40 to have direct access to the shared resources 12 of this cluster 40.

The paths 50, 52, 54, 56 and 58 each include a fetch data path and a store data path with error correcting codes, and control and address signals with parity bits. All of the paths 50, 52, 54, 56 and 58 are capable of requesting transfers at the rate of one data word each clock cycle. Shared resource access latency of an intercluster request over the paths 58 is estimated to be 1.5 to 2 times the latency of an intra-cluster access over the paths 50. In the preferred embodiment, all paths are comprised of two electrical connections capable of supporting a differential signal for each bit of information. Differential signals are used to reduce electrical noise, transients, and interference that may occur on the paths 50, 52, 54, 56 and 58 due to the high clock speeds and close physical proximity of the paths in the preferred embodiment.

Unlike the direct connection interfaces of the shared-memory supercomputers or the partitioned memories of the hierarchy-memory supercomputers, the arbitration node means 20 provides for logically symmetric access of each processor 10 to all shared resources 12 and minimizes the need to optimize software applications for a particular memory-hierarchy. This symmetry of access occurs both within the cluster 40 and between clusters 40 via the remote cluster adapter means 42. While the present invention provides the logical capability to symmetrically access all of the shared resources 12 in any cluster 40 and the physical equality of symmetrical access to all of the shared resources 12, it will be recognized that the physical access rates to the shared resource 12 varies. To understand how the arbitration node means 20 can provide symmetric access to the shared resources 12, it is important to understand the organization of both the processor 10 and the main memory 14 in the present invention.

The Processor

With reference to FIG. 4, a block diagram shows a single processor 100 that comprises one of the plurality of processors 10 in the preferred embodiment of the present invention. The processor 100 is logically and physically partitioned into a scalar means 102 and a vector means 104. Both the scalar means 102 and the vector means 104 have their own register set and dedicated arithmetic resources as described in greater detail hereinafter. All registers and data paths in the processor 100 are 64-bits (one word) wide. For the scalar means 102, there are 64 scalar S registers and 512 local L registers. The L registers serve as a software-managed register cache for the scalar means 102. The vector means 104 has 16 vector V registers. The architecture can support up to a total combination of 256 S and V registers per processor 100. Each processor 100 also has up to 256 control C registers (FIG. 5) that are physically distributed throughout the processor 100 and are used to gather and set control information associated with the operation of the processor.

Unlike most prior scalar/vector processors, the scalar means 102 and vector means 104 that comprise the high-speed processor 100 of the preferred embodiment are capable of simultaneous operation. Both the scalar means 102 and the vector means 104 include a plurality of arithmetic resources in the form of arithmetic functional units 106. For the scalar means 102, the arithmetic functional units 106 include: Scalar Unit SU0 (divide, pop, and parity); Scalar Unit SU1 (floating point multiply, integer multiply, and logical operations); and Scalar Unit SU2 (floating point addition, integer addition, and shift operations). For the vector means 104, the arithmetic functional units 106 include: Vector Unit VU0 (divide, pop, parity and boolean); Vector Units VU1 and VU2 (floating point multiply, integer multiply, and logical operations); and Vector Units VU3 and VU4 (floating point addition, integer addition, logical and shift operations). Internal paths 108 to each of the functional units 106 may be allocated independently in the scalar means 102 and vector means 104 and each of the functional units 106 can operate concurrently, thereby allowing the scalar means 102 and vector means 104 to operate concurrently. No common functional units 106 are shared between the scalar means 102 and the vector means 104.

Figure 5:
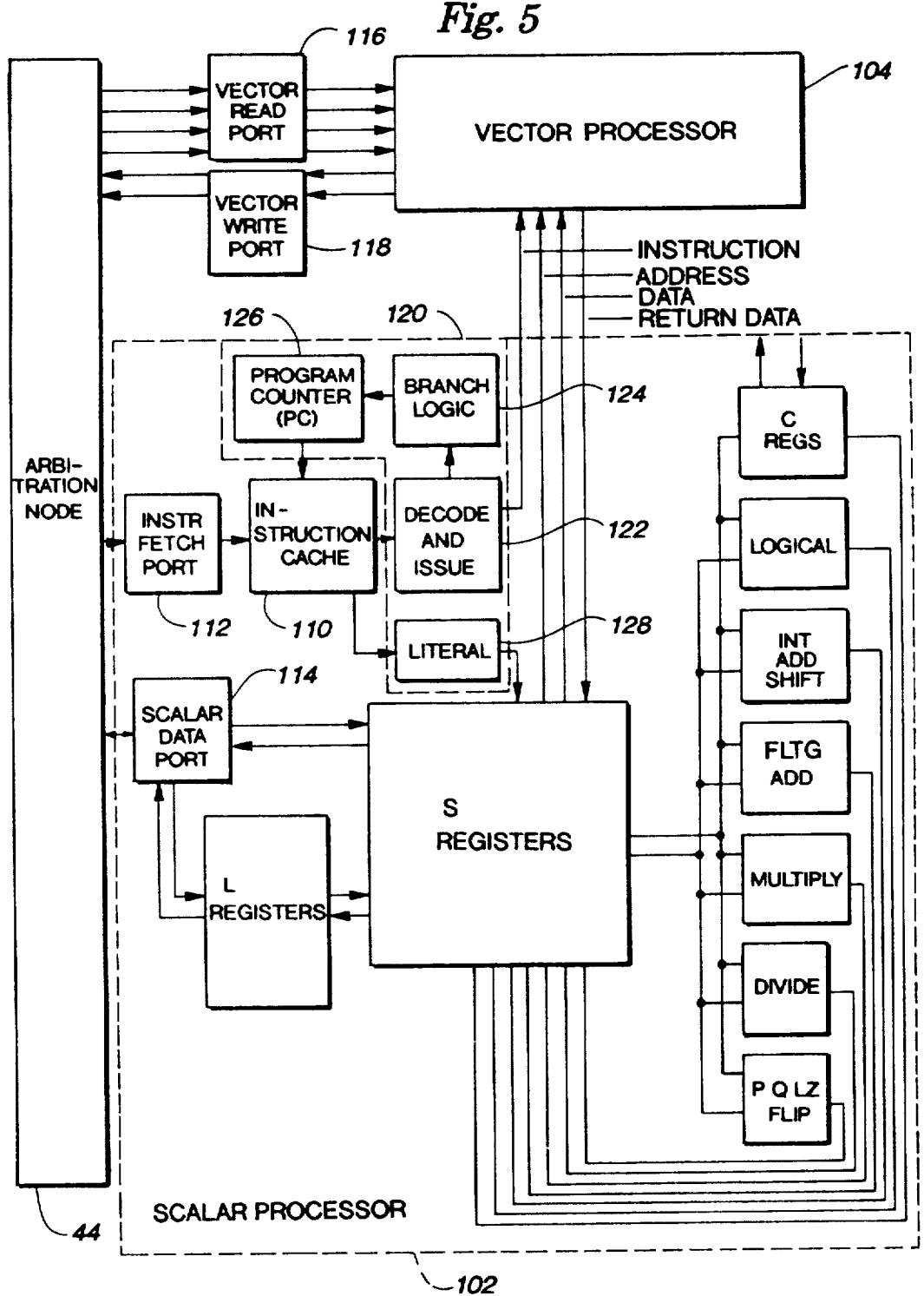
FIG. 5 is a more detailed block diagram of the instruction execution logic elements of the scaler means shown in FIG. 4.

Referring now to FIG. 5, the scalar means 102 receives all control information in the form of instructions via an instruction cache 110. The instruction cache 110 is connected to an arbitration node 44 through an instruction fetch port 112. Data information is provided to both the scaler means 102 and vector means 104 through a series of data ports. A single bi-directional scalar data port 114 supports both reads and writes to the S and L registers in the scalar means 102. Four vector read ports 116 and two vector write ports 118 support data transfers to the vector means 104. The operation of the ports 112, 114, 116 and 118 will be described in greater detail hereinafter in connection with the discussion of the arbitration nodes 44.

An instruction execution unit 120 in the scalar means 102 includes decode and issue means 122, branch logic means 124, a program counter (PC) register 126 and literal transfer means 128. The instruction execution unit 120 is pipelined with instruction fetch, decode and execution. The instruction pipeline is capable of sustaining an instruction issue rate of one instruction per cycle. All instructions are decoded directly without the support of microcode. Instruction issue and control is handled separately for scalar and vector instructions by the respective scalar means 102 and vector means 104. Both one- and two-parcel instructions (32 bits per parcel) are supported in the instruction cache 110. A more detailed discussion of the instructions of the processor 100 is presented hereinafter in connection with Appendices A and B.

Each instruction, vector or scalar, has a nominal starting point referred to as issue. All scalar and vector instructions must issue (i.e., begin execution) one instruction at a time. After the issue clock cycle, operands are read and operations are performed in a pipeline fashion using the various arithmetic functional units 106 of the respective scalar means 102 or vector means 104 if such functions are requested by the instruction. Instructions may complete in any order.

Scalar and vector instructions have different requirements to issue. A scalar operation will not issue until all of its operand data and required resources are available. Once a scalar instruction issues, it will complete execution in a fixed number of clock cycles. Unlike current vector processors, a vector instruction in the present invention may issue without regard to the availability of its required vector resources. Not only can the necessary vector data be unavailable, but the V registers, memory ports (as explained hereinafter) and functional units 106 all may be busy. For a vector instruction to issue, however, there must be a check for the availability of any scalar data that may be needed, such as in scalar/vector operations or as in a scalar value required for a memory address.

Figure 6:
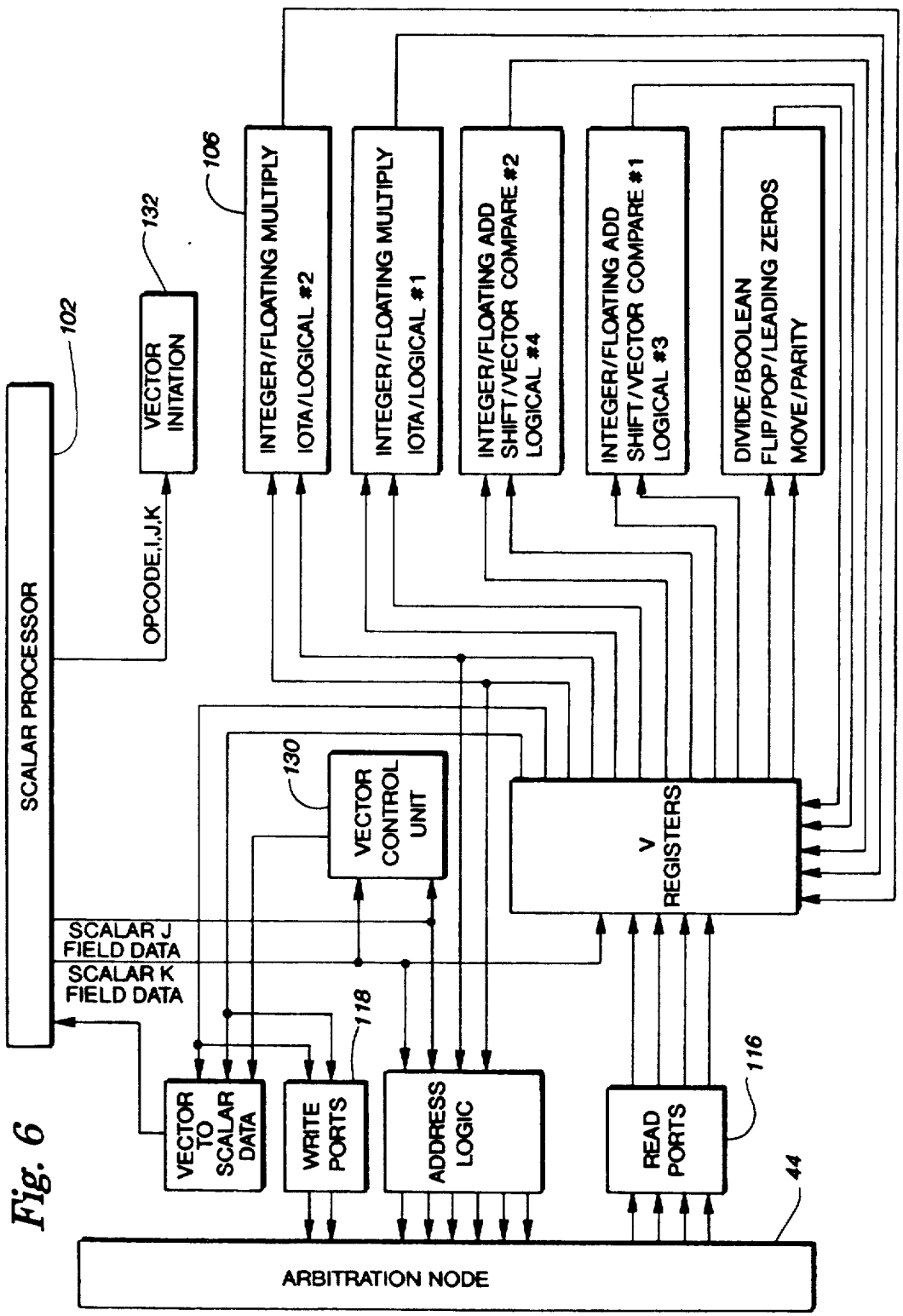
FIG. 6 is a more detailed block diagram of the vector means shown in FIG. 4.

Referring now to FIG. 6, once a vector instruction has issued, it must then "initiate". The vector control unit 130 starts each vector instruction in turn, at a maximum of one per clock cycle, after checking the availability of the vector instruction's required resources. In the preferred embodiment of the present invention, a vector initiation queue 132 holds up to five vector instructions that have issued, but not yet initiated. A vector instruction may initiate only if the required V registers are not busy. A vector instruction may initiate before a functional unit 106 or memory port is available, but the vector control unit 130 will delay the first element of the vector operation until the previous operation on the functional unit 106 or memory port is completed.

Because of the difference between issue and initiate with respect to the vector means 104, the vector means 104 and the scalar means 102 are not in the lock step, so no assumptions should be made about synchronization. Memory synchronization rules should be followed between the scalar means 102 and the vector means 104. For example, just because a second load to a V register has issued does not mean that the first load to that V register is complete.

Figure 7:
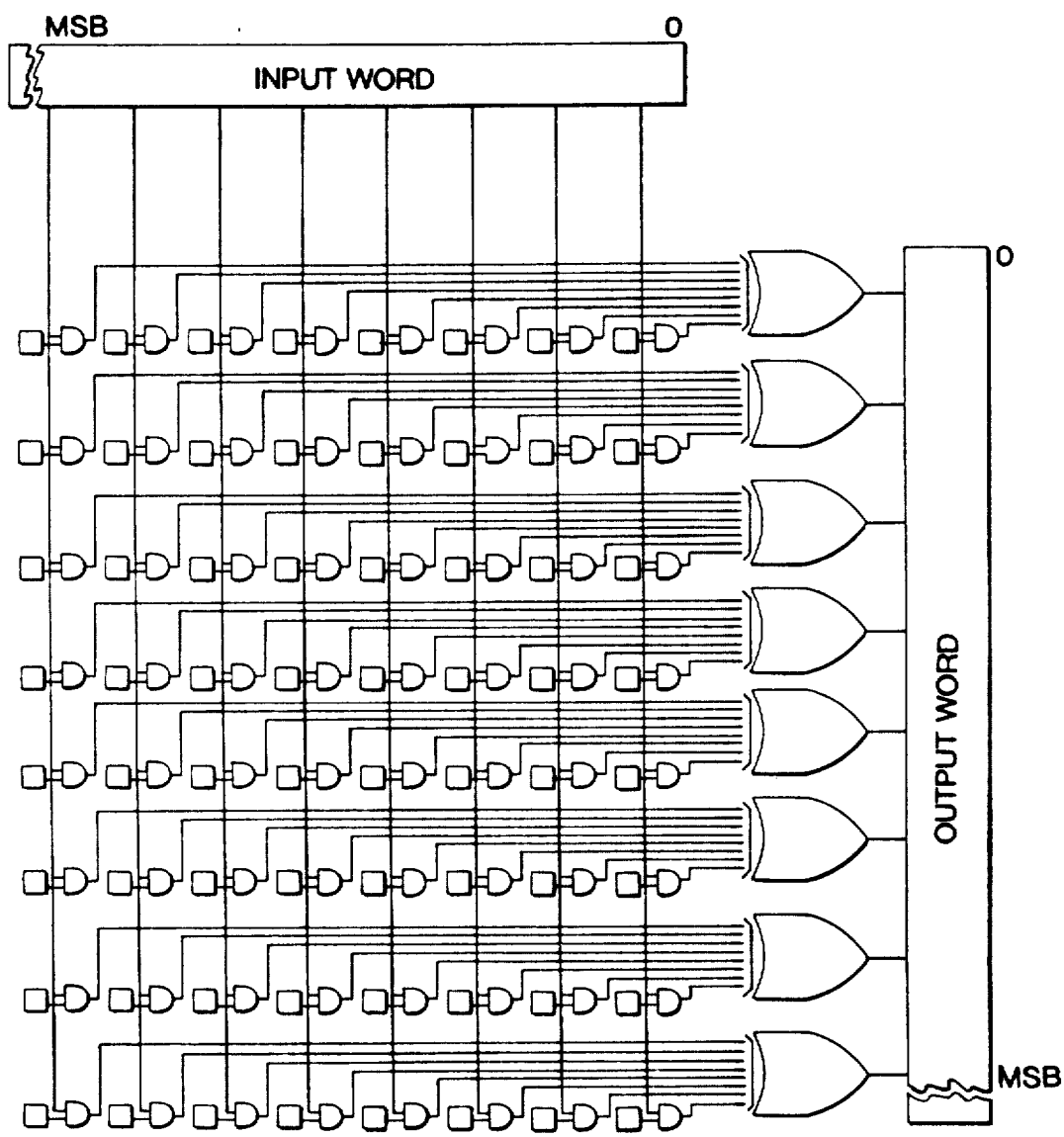
FIG. 7 is a block diagram of the boolean unit in the vector means of the preferred embodiment of the present invention.

Referring now to FIG. 7, the operation of the Boolean Unit will be described. The Boolean Unit is one of the function units 106 associated the vector means 104. The Boolean Unit is a user programmable, fully pipelined, parallel, bit manipulation means capable of transforming a sixty-four bit operand to a sixty-four bit result each clock. This bit manipulation means is programmed by loading a 4096 bit state array from a vector register using the ldbool instruction. The state array specifies the logical transformation of the operand bit stream. This transformation occurs when the bool instruction is executed with a vector register operand and a vector register result.

Figure 8:
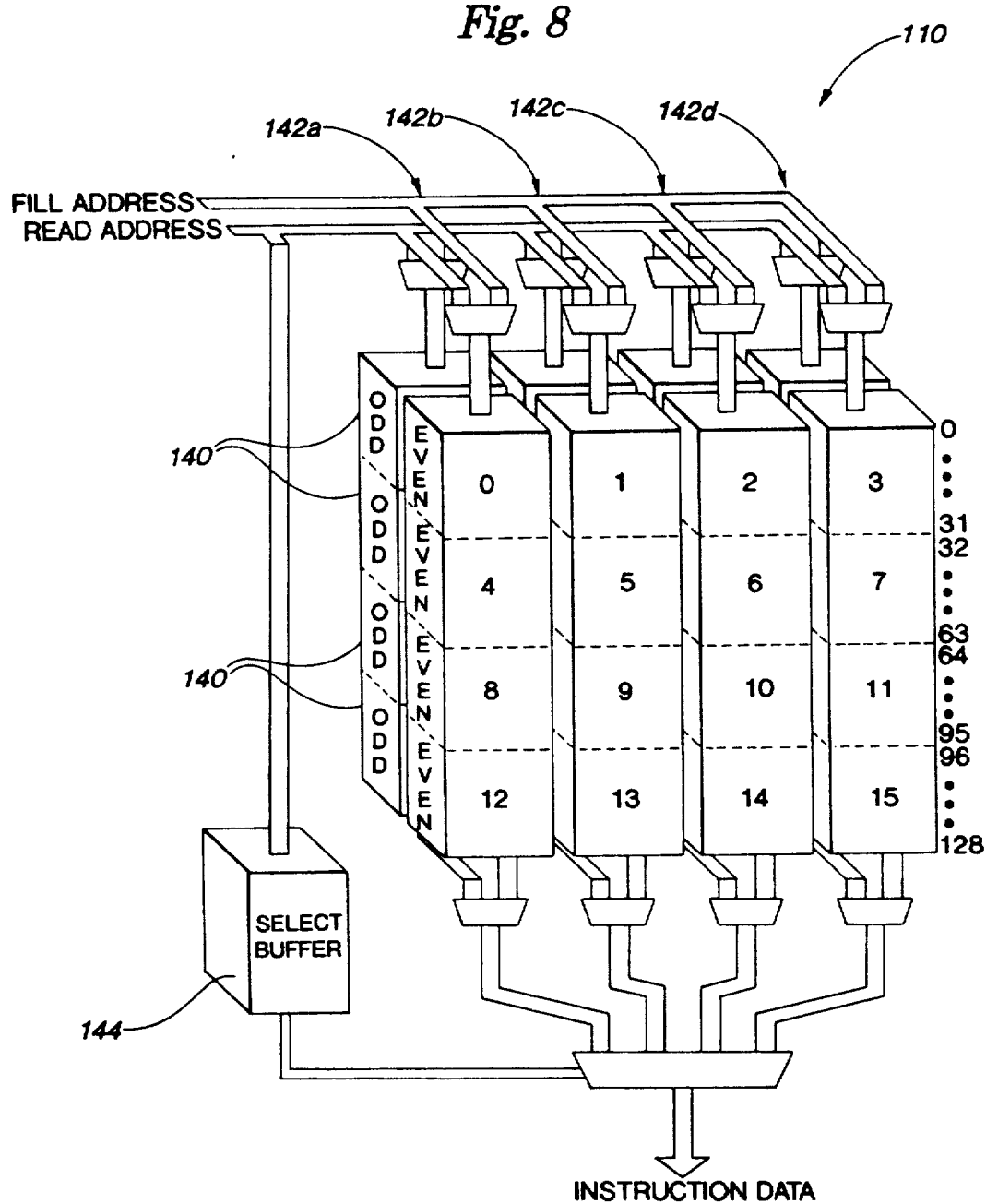
FIG. 8 is a block diagram showing the various instruction buffers that comprise the instruction cache.
Figure 9:
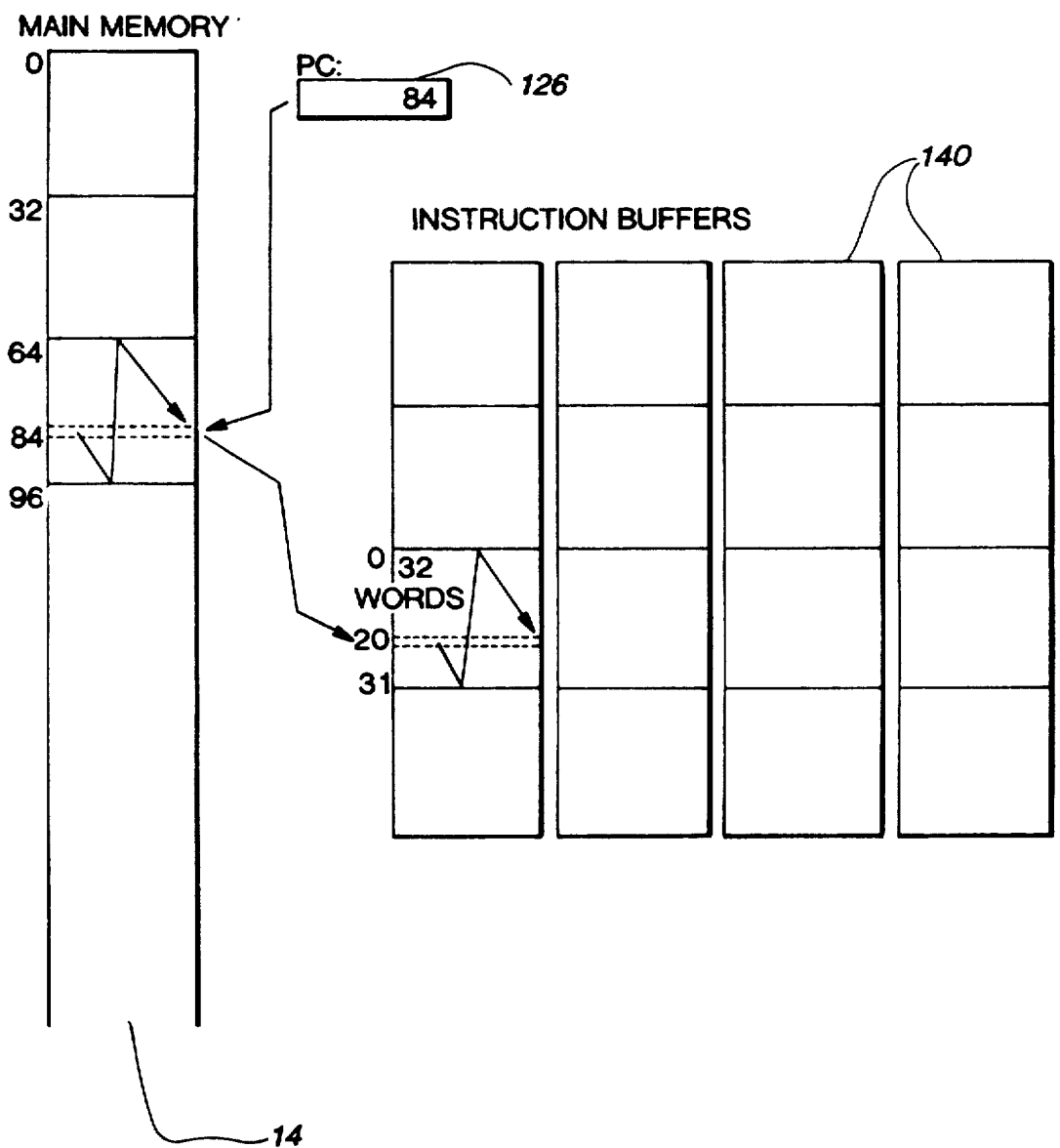
FIG. 9 is a simplified block diagram showing the operational flow of a buffer-fill operation of the instruction cache.

Referring now to FIGS. 8 and 9, the operation of the instruction cache 110 (FIGS. 4 and 5) will be described. The instruction cache 110 consists of sixteen buffers 140. Each buffer 140 can hold 32 words (64 parcels) of instructions. The buffers are logically and physically organized into four columns 142a, 142b, 142c and 142d, with four buffers 140 per column 142a-d. Each column 142a-d has separate fill address and read address logic. The buffers 140 in each column 142a-d are arranged to address a consecutive block of addresses with low-order bit addresses ranging from 0–(buffers 0, 1, 2 and 3); 32–63 (buffers 4, 5, 6 and 7); 64–95 (buffers 8, 9, 10 and 11); and 96–127 (buffers 12, 13, 14 and 15). In this way, the columns 142a-d are four-way associative; that is, a word at any given address may be found in one of four columns 142a-d depending upon the high-order bits of its address. A select buffer logic 144 is used to choose which of the four columns 142a-d will be muxed to the instruction execution unit 120 (FIG. 5).

In principal, an instruction cache is a compromise between the need to have instructions quickly available to the processor and the impracticality of having each instruction stored in a separately addressable memory location. In a typical instruction cache, a single smaller block of instructions is loaded into a faster access cache hardware to increase the access time. If an instruction is not found in the cache (e.g., a jump is made out of the range of the cache), then new instructions must be loaded into the cache from the main memory. If a program contains many jumps or branches, this process of loading new instructions into the cache may be repeatedly performed leading to an undesirable condition known as cache thrashing. The organization of the instruction cache 110 as a four-way associative buffer allows the instruction cache 110 of the preferred embodiment to minimize both instruction fetch times and cache thrashing.

In the preferred embodiment, the PC register 126 (FIG. 5) contains a 34-bit word address and is used to fetch the 64-bit words out of the instruction cache 110. Words are fetched from the instruction cache 110 at a rate of up to one per clock cycle as needed by the instruction execution unit 120. There is no cycle penalty for two-parcel instructions. The addresses as found in the PC register 126 are defined as follows:

Bits 0–4 select a word within a buffer 140;
Bits 5–6 select a buffer 140 within a column 142; and
Bits 7–33 are used to match the tag for this instruction.

The tag for the instruction is generated as the instruction is read from main memory 14 as described hereinafter in the section relating to the Main Memory. In general, the tag may be thought of as the high-order logical address bits for a thirty-two word block of instructions. Each buffer 140 has a unique tag associated with the instructions stored in that buffer. For example, buffer 0 might contain the thirty-two instructions having address '1C00' to '1C1F' and buffer 4 might contain the thirty-two instructions having address 'C320' to 'C33F'.

If a match is not found for the tag of the next requested instruction within any of the buffers 140, an "out-of-buffer" condition exists and the hardware will automatically start a buffer-fill operation. One of the four buffers 140 that contains the same least significant bits as the instruction requested (bits 0–4) is selected during the buffer-fill operation for overwriting on a least-recently-used basis. That buffer is given a new tag value and filled from main memory 14. The buffer-fill operation starts with the word pointed to by the PC register 126 and wraps through all 32 words in that particular buffer 140. When the buffer-fill operation is completed, the buffer 140 contains 32 new words of instructions that are aligned to a 32-word boundary in main memory 14.

Referring to FIG. 9, a simplified diagram of the operational flow of an automatic fill-buffer operation is shown. In this example, a jump to location "84" instruction causes the buffer-fill operation because location "84" is not found in any of the buffers 140 of the cache 110. One of the four columns of the buffers 140 is chosen by a least-recently-used algorithm. The row is chosen based on bits 5–6 of the PC register 126. The buffer-fill operation starts at word "84" in the main memory 14, continues through the end of the 32-word area, then wraps back to the previous 32-word boundary and continues through word "83" to complete the fill of the particular buffer 140. In this manner, a 32-word block of instructions is loaded from main-memory 14, but the target word is loaded first. Execution may resume as soon as word "84" appears in the instruction buffer 140. A program may explicitly request a buffer-fill operation by specifying a "fill" instruction. The fill instruction specifies an address in main memory 14, but does not specify which buffer 140 the instructions will be loaded into. The buffer is selected on the basis of the same least-recently-used algorithm as used for an automatic buffer-fill in response to an out-of buffer condition.

The Main Memory

Figure 10:
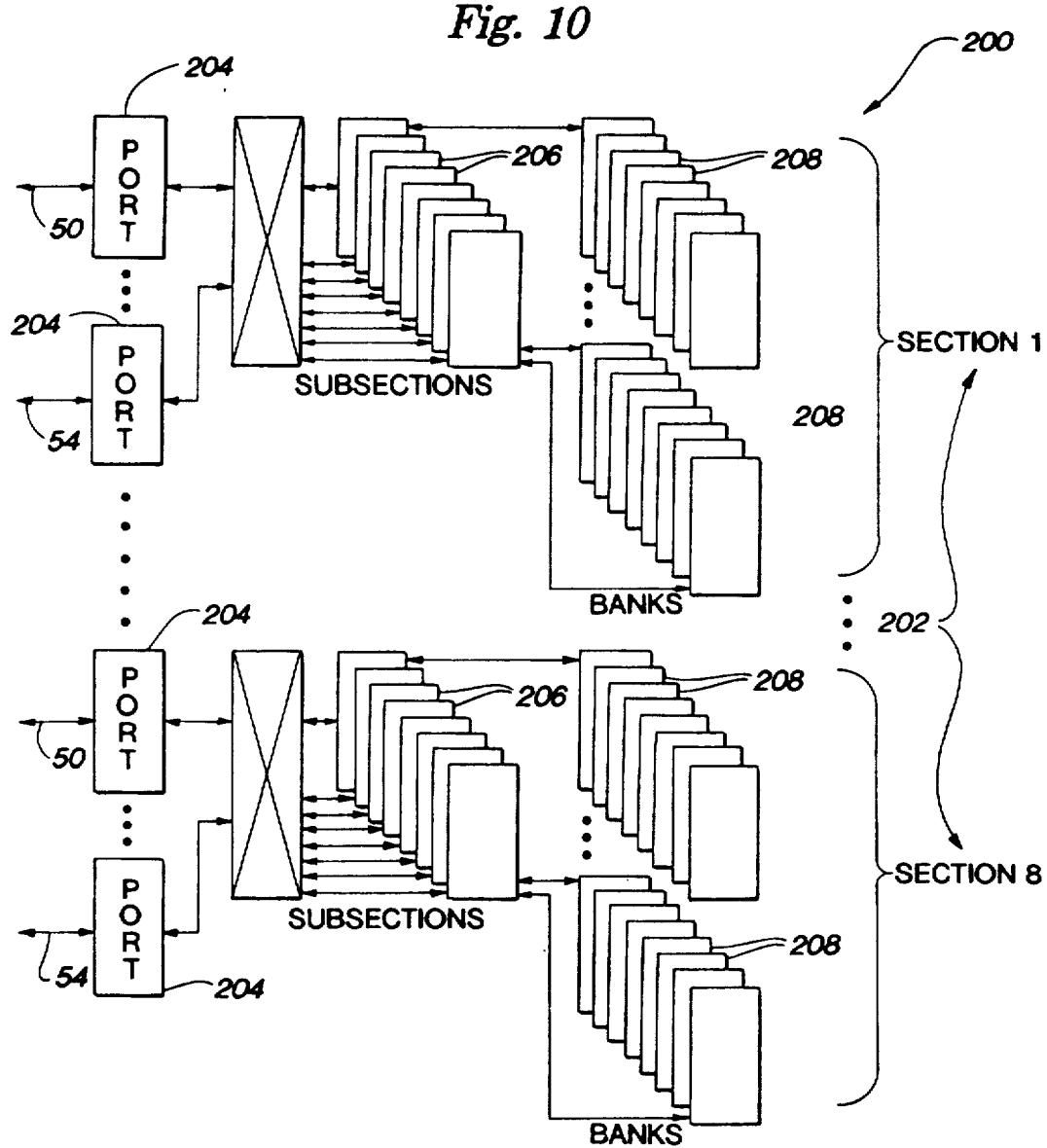
FIG. 10 is a block diagram of the portion of main memory physically associated with a single cluster.

With reference to FIG. 10, a block diagram of the main memory 14 shows the shared portion of the main memory 14 that is physically within a single cluster 40. The memory portion 200 is a highly interleaved, multiported memory system providing an extremely high bandwidth. In the preferred embodiment, the memory portion 200 for each cluster 40 is organized into eight memory sections 202. The architecture of the present invention may support up to 256 sections 202 of memory per cluster 40.

Each memory section 202 has seventeen ports 204 for connecting the memory section 202 to the parallel read/write paths 50 and 54. One port 204 is assigned to each of the sixteen arbitration node means 20 and the seventeenth port 204 supports the MRCA means 48. Each memory section 202 is further subdivided by input and output steering logic into eight subsections 206. Each subsection 206 has eight banks 208 for a total cluster bank interleave factor of 512. In the preferred embodiment, the memory portion 200 is implemented using 1 Megabit SRAMs yielding a total memory space of 512 million words per cluster 40, with one million words per bank 208. All data words are 64-bits wide and are protected with an 8-bit SECDED (single error correct, double error detect) code.

Each request to main memory 14 from a processor 100, whether it is a read or write, is presented as a Memory Reference and undergoes a transformation referred to as Memory Mapping. Memory Mapping is used by the operating system of the multiprocessor system of the present invention to allocate the shared resources 12 and enable more than one program or process to execute in a single processor 100 as explained in greater detail hereinafter. More importantly, the Memory Mapping scheme of the present invention minimizes the need to optimize software programs to a particular memory-hierarchy. Because the physical mapping is hidden from the user program in the sense that physical addresses are not explicitly coded, the user's code does not have to change to support a change in the processors 10, memory sections 202, global registers 16 or clusters 40 in which the program is being run. it will be noted that configuration changes to the memory addressing scheme do not require changes to the user's program.

Figure 11A:
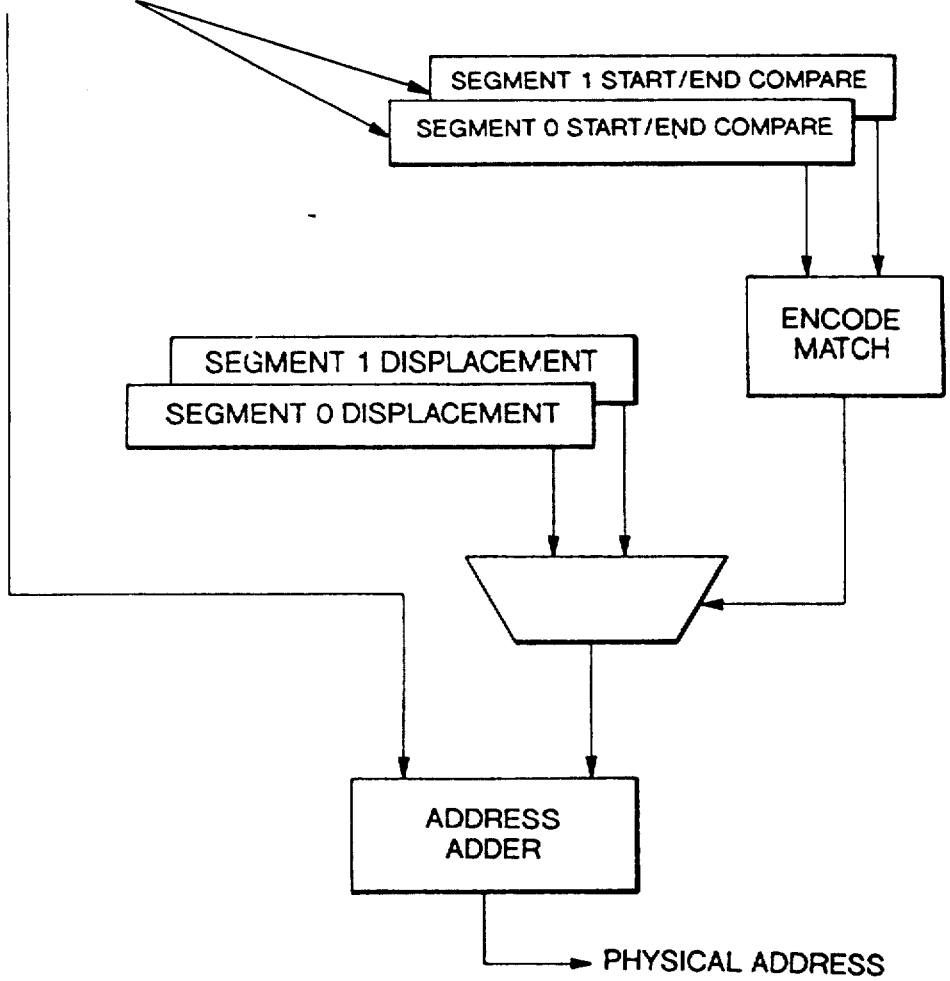
FIGS. 11a and 11b are block diagrams for the address translation scheme of the preferred embodiment.
Figure 11B:
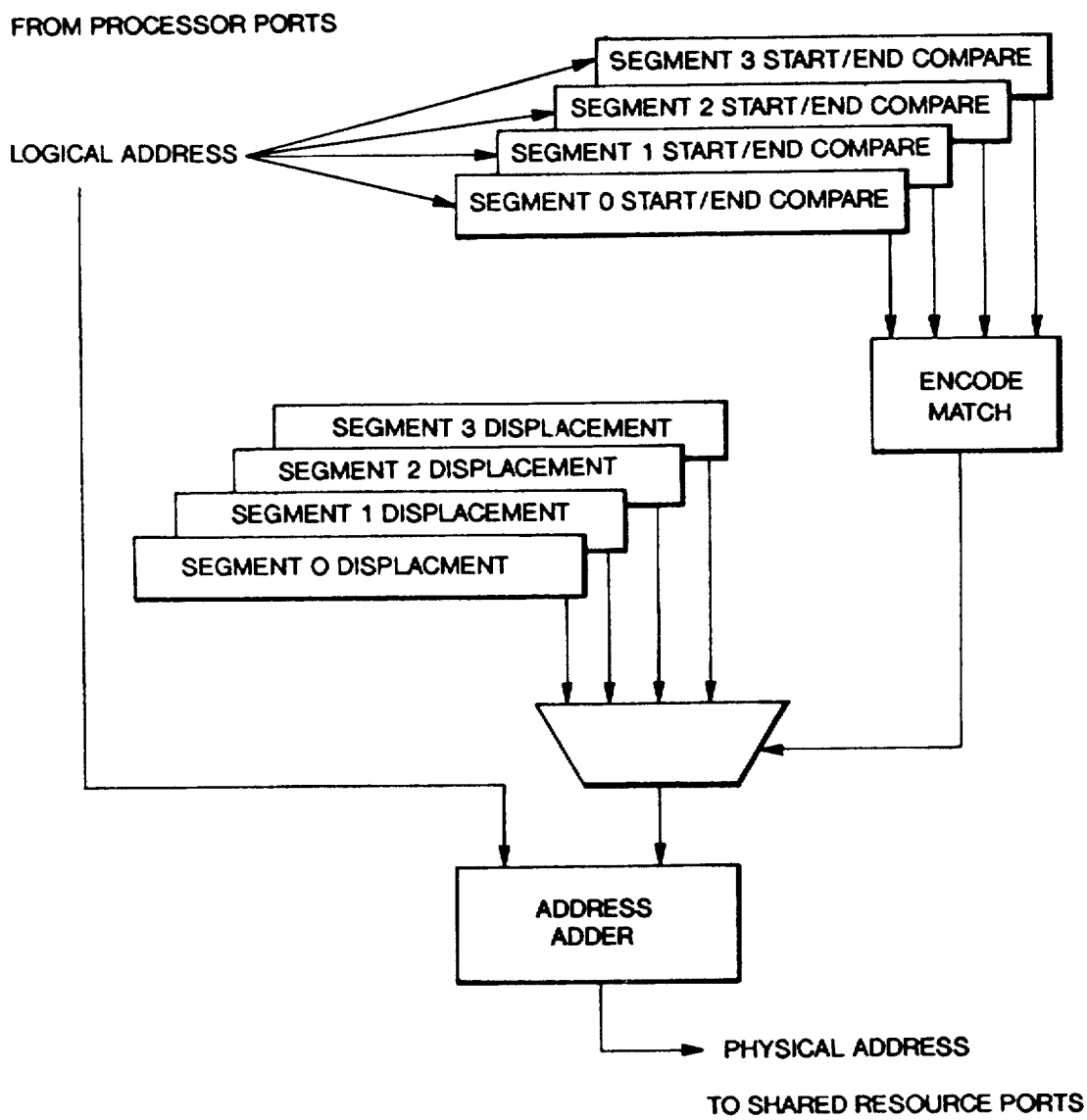

Referring now to FIGS. 11a and 11b, the Memory Mapping process of the preferred embodiment will be explained. Each Memory Reference is classified either as an Instruction Reference or an Operand Reference. An Instruction Reference, as shown in FIG. 11a, reads words of memory in the form of instructions into the instruction cache 110. An Operand Reference, as shown in FIG. 11b, reads or writes S registers, L registers, or elements of a V register. For each request, a Logical Address is generated by the processor 100 from an instruction, a register, or a memory location and is mapped into a Physical Address and is presented to the main memory 14 in the form of a Memory Reference.

In the preferred embodiment, one or more Segments are defined by the contents of a plurality of Mapping Registers that define the start, end and displacement values for each Segment. An Instruction Reference is checked against the Instruction Mapping Registers and a Operand Reference is checked against the Data Mapping Registers. The Mapping Registers are a subset of the C registers of the processor 100. For Operand References, there is at least one Segment defined per cluster 40 utilized in the particular configuration of the multiprocessor system.

To be mapped, two operations are performed on each Memory Reference. First, the Logical Address must be associated with a Segment and must be within a range of addresses defined by a Start/End compare for that Segment. If the Memory Reference is not within the current range of address for any of the Segments, then an address translation exception is generated and no request is made to the main memory 14. Next, the Displacement for the appropriate Segment is added to the Logical Address to generate the Physical Address. In the preferred embodiment, the Start/End value in the Instruction Registers is compared with the 20 most-significant bits of a 34-bit logical address, thereby defining a minimum mapping granularity of 16K words. For Instruction References, the 14 least-significant bits of the logical and physical addresses are the same. The minimum mapping granularity for an Operand Reference is 64K words as the Start/End value of the Operand Registers are compared with the 18 most-significant bits of a 34-bit logical address. For Operand References, the 16 least-significant bits of the logical and physical addresses are the same. Once a Memory Reference is mapped, it is then addressed and transferred to the proper physical bank 208 of the main memory 14, whether that memory bank 208 is in the memory portion 200 of the cluster 40 of the processor 100 making the Memory Reference, or elsewhere in another portion of the main memory 14 that is physically associated with a remote cluster 40.

The memory addressing scheme used by the main memory 14 of the present invention is structured to minimize memory system wait times. The lowest order address bits are used to interleave between the major resources within the main memory 14 (i.e., between memory sections 202), while the next lowest bits are used to interleave at the next major partition (i.e., subsections 206, banks 208) and so on. With this organization, the dispersion of Memory References is maximized for address streams having an odd stride, i.e. an odd increment between consecutive addresses. In general, for even strides, the smaller the stride or address increment, the better the performance.

Figure 12A:
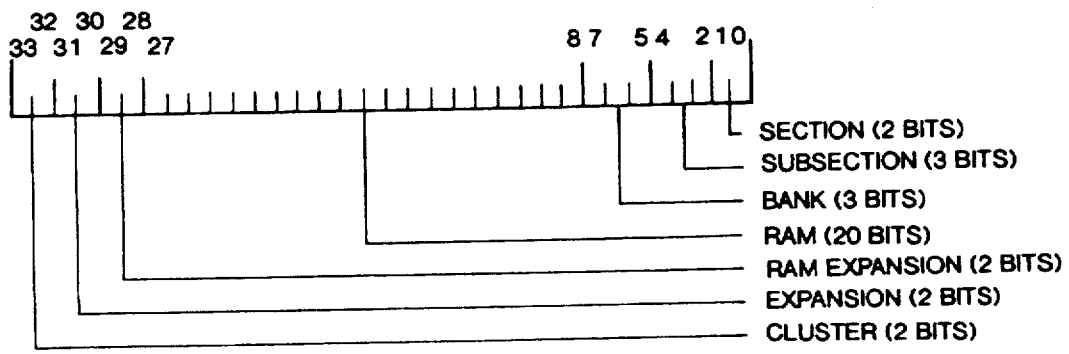
FIGS. 12a and 12b are diagrams of the memory addressing schemes of the present invention.
Figure 12B:
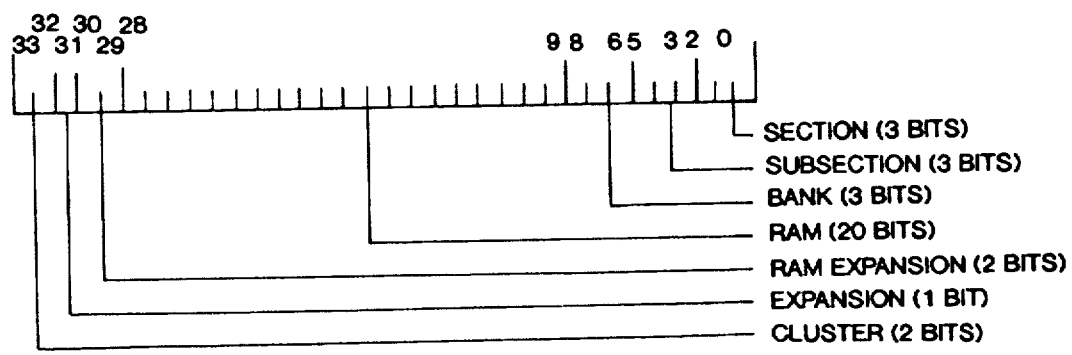

For ease of understanding the various configurations of the preferred embodiment of the present invention, each cluster 40 is designated by the reference X/YY, (i.e., 4/28). For each cluster 40, X defines the number of processors 10 as $2^X$ processors and YY defines the number of memory addresses in the memory portion 200 as $2^{YY}$ words of memory. For example, a 5/29 configuration would represent 32 ($2^5$) processors and 512 million ($2^{29}$) words of main memory per cluster. The memory addressing scheme for two possible configurations of the present invention, X/28 and X/29 is shown in FIGS. 12a and 12b, respectively.

It should be noted that the cluster architecture of the present invention allows the number of processors 10, external interfaces 22 and size of memory portion 200 of each cluster 40 to be configurable within the ranges described above. This ability to configure the multiprocessor cluster 40 makes the computer processing system of the present invention modular and expandable. For example, a user of the computer processing system may configure the multiprocessor clusters 40 so they are populated with more processors 10 and fewer external interfaces 22 when the jobs or programs most likely to be performed by the system are processing intensive, rather than data intensive. Conversely, the number of external interfaces 22 and size of memory portion 200, including the number of sections 208, could be increased if the jobs or programs were data intensive and required a significant data transfer bandwidth. Similarly, the number of clusters 40 may be decreased or increased within the range of the cluster architecture depending upon the computational processing needs of the particular user of the computer processing system of the present invention.

The Arbitration Nodes

Figure 13:
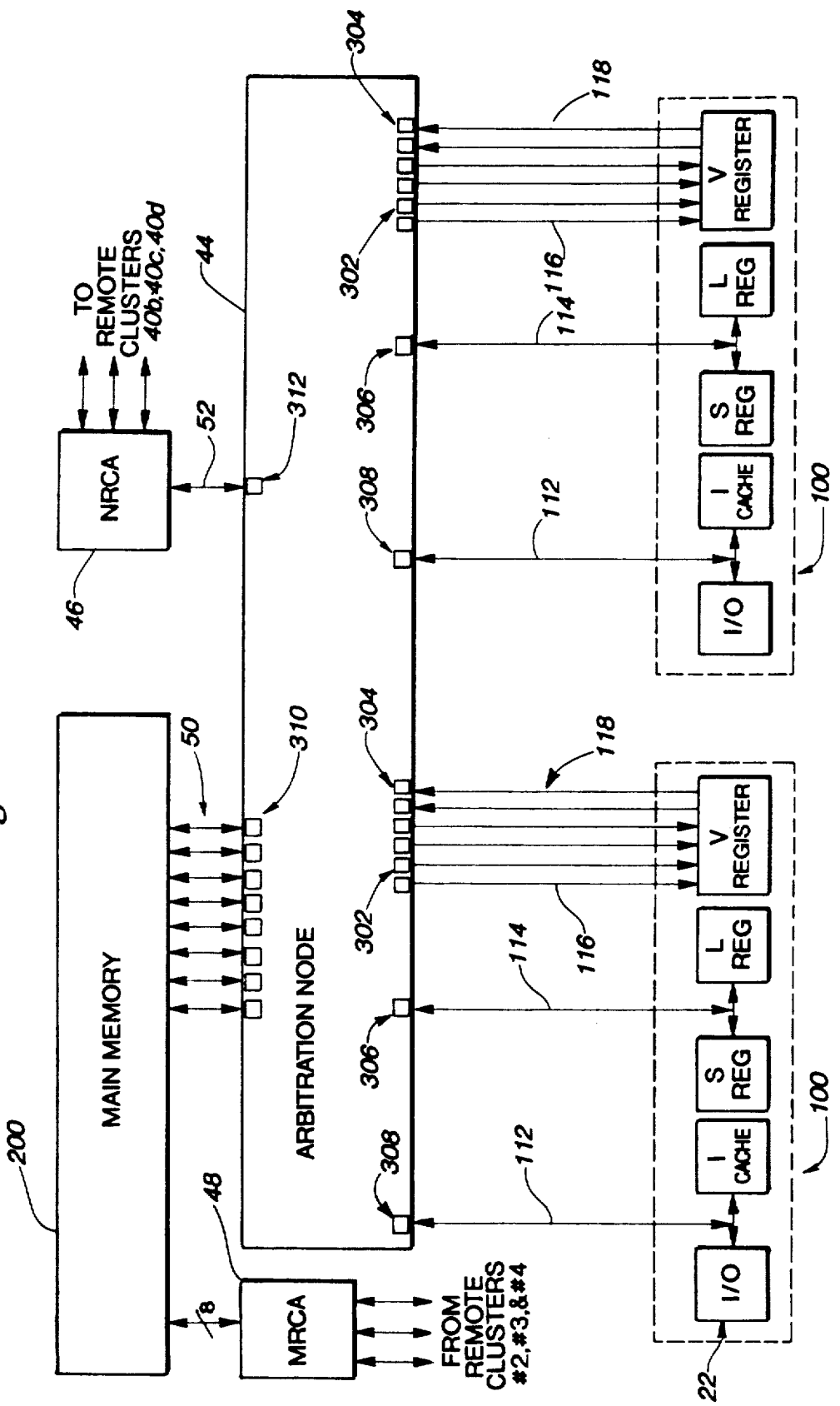
FIG. 13 is an overall block diagram of a single arbitration node.

In the preferred embodiment, each arbitration node 44 manages requests for the shared resources and the I/O operations from two processors 100 and two external interface means 22 as shown in FIG. 13. For each processor 100, the vector means 104 has four read ports 116 and two write ports 118 connecting the V registers to the arbitration node means 20 through ports 302 and 304, respectively. Each scalar means 102 has one bidirectional port 114 for the S and L registers. The instruction cache 110 has one bidirectional port 112 connected to port 308 in the arbitration node 44. In addition, each external interface means 22 shares the same physical port 112 with the instruction cache 110. Thus, the total number of ports interfacing with the processor side of each arbitration node 44 is sixteen in the preferred embodiment. On the shared resource side, each arbitration node 44 has eight separate bidirectional ports 310 that connect the arbitration node means 20 via the bidirectional paths 50 to the memory portion 200, one to each of the eight memory sections 202. A single bidirectional port 312 connects the arbitration node 44 with the NRCA means 46 and the global registers 16 over the path 52. Each arbitration node can receive up to sixteen requests per clock cycle, one per request port 302, 306 or 308. In the preferred embodiment the arbitration node 44 acts like a 16×9 cross bar switch that arbitrates the sixteen request ports for the nine shared resource ports on each cycle. All of the ports in the arbitration node 44 are capable of sustaining a peak transfer rate of one word per clock cycle. Memory and processor conflicts will degrade this peak transfer rate. All accesses are single-word accesses. Consecutive accesses may be any random mix of reads and writes.

The number of requests that may be handled by each arbitration node 44 is increased by limiting the number of processors 100 and external interface means 22 connected to each arbitration node 44. In the preferred embodiment, the ratio of processors 100 to arbitration node means 20 is 2:1. Although it will be recognized that alternative technologies might increase the number of connections that can effectively be made through an arbitration node 44, it is expected that the ratio of processors 100 to arbitration nodes 44 may be increased to 8:1 using current technologies before the performance of the arbitration node 44 falls below acceptable levels. It should also be noted that the ratio of processors 100 to external interface means 22 is 1:1 for each arbitration node 44 in the preferred embodiment; however, as previously discussed, the ratio of processors 100 to external interface means 22 is configurable.

Figure 14:
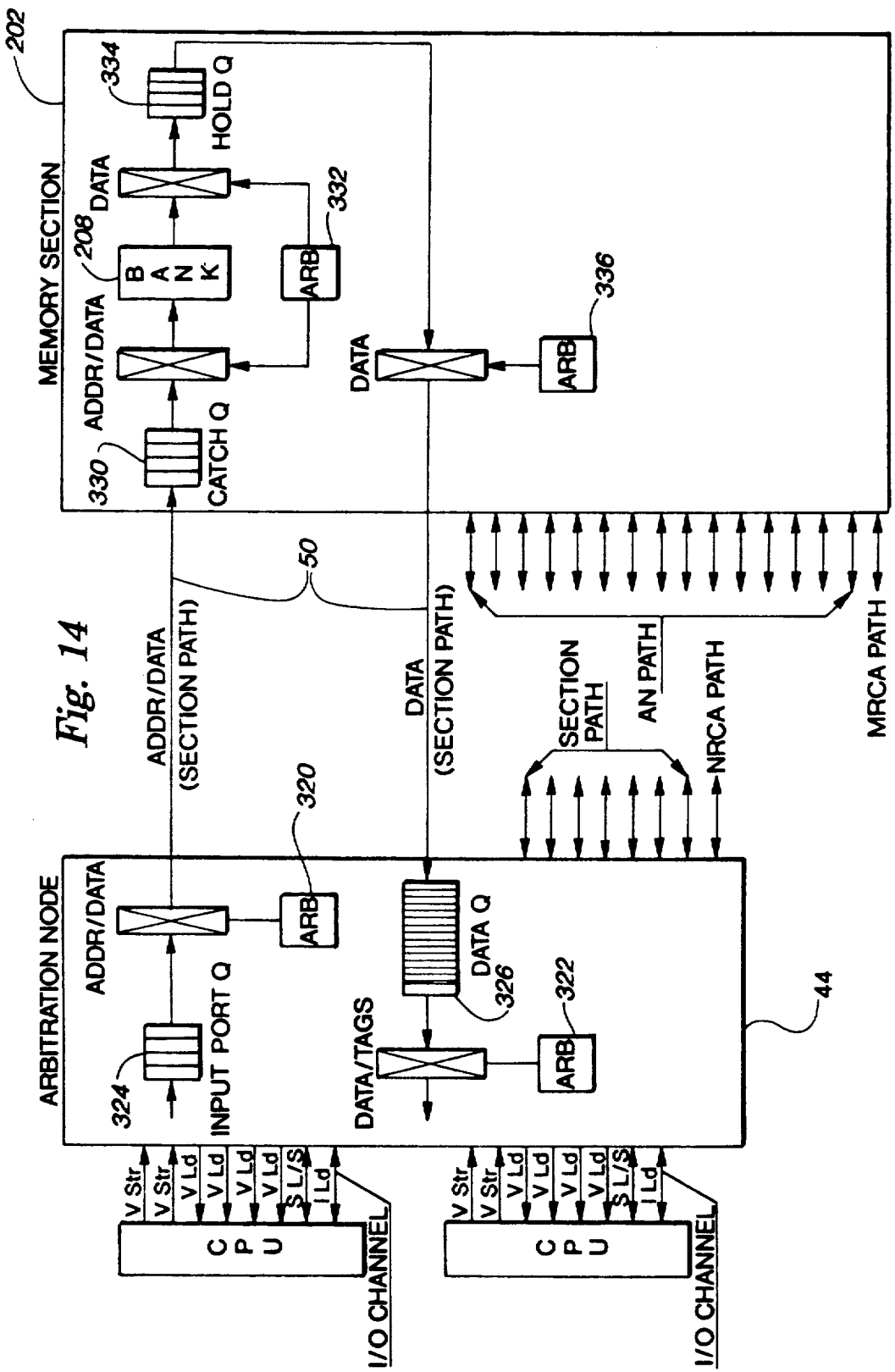
FIG. 14 is a detailed block diagram of the memory data flow between an arbitration node and a memory section.

As requests are issued from the processor 100 or external interface means 22 to any of the shared resources 12, the arbitration node 44 arbitrates the requests for access to the memory sections 202, global registers 16, interrupt mechanism 18 or the NRCA means 46. This arbitration provides fair and time-ordered access for each port 310 and 312 to each of the shared resources 12. Referring now to FIG. 14, a pair of similar arbitration networks 320 and 322 is shown for one of the memory ports 310 and one of the processor ports 308. It will be recognized that similar circuitry is replicated for each of the memory ports 310 and the MRCA port 312, and for each of the ports 302, 304, 306 and 308 connected to the processors 100. As explained in further detail hereinafter, the arbitration networks 320 and 322 use a first-come-first-served, multiple-requestor-toggling system to insure that the oldest reference is processed first. In the case of multiple old references of the same age, a fairness algorithm ensures equal access to the ports connected to that arbitration network 320 or 322.

As viewed from the perspective of the arbitration node 44 12, each outgoing request to a memory selection 202 or through the port 312 to the global registers 16, interrupt mechanism 18 or NRCA means 46 is arbitrated by a request arbitration network 320. A similar response arbitration network 322 arbitrates the responses returning from each request back to their respective processor ports 302, 304, 306 or 308. For incoming requests from the processor, an input port queue 324 holds up to sixteen requests that are waiting to be connected through the request arbitration network 320. For returning responses, a data queue 326 holds up to sixty four responses waiting to be connected to the original processor port 302, 306 or 308 by the response arbitration network 322.

When the request arbitration network 320 determines that an incoming request has the highest priority, the address and data components of that request are placed on the path 50 or 52 associated with the request arbitration network 320 to be routed to the proper shared resource 12. For Memory References, a subsection catch queue 330 in each memory subsection 204 collects all incoming requests to that particular memory subsection 204. A bank request arbitration network 332 will arbitrate among its group of subsection catch queues 330 that have pending requests for that bank 208 on each cycle. Once the request is selected, the selected request (address and data) is issued to the destination bank 208 if the request is a store (write). If the request is a load or load and flag (read), the data read from the bank 208 (the response) is held in a hold queue 334 before a return arbitration network 336 determines the priority of outgoing responses from the memory section 202. The various conflict conditions that may occur during this process are described in further detail hereinafter in connection with the section on Arbitrating Memory References.

Data returning from a section memory 202 to port 310 or from the global registers 16 to port 312 is received in a data queue 326. Each port 310 and 312 has an individual data queue 326. During each clock cycle the response arbitration network 322 arbitrates for the return data path for each load port 310 or 312. The appropriate data is selected from the data queue 326 and returned to the requesting ports 302, 306 or 308. Unlike prior art systems, responses may be returned to the requesting ports in any order as described in further detail hereinafter in connection with the section on Out-of-Order Access.

The Arbitration Networks

Referring now to FIGS. 15-18, the preferred embodiment of the various arbitration networks 320, 322, 332 and 336 will be described. It should be noted that the preferred embodiment uses very similar circuitry for each of these arbitration networks for ease of implementation, although it would be possible to implement different types of arbitration systems for each one of the arbitration networks 320, 322, 332 and 336. All of the arbitration networks 320, 322, 332 and 336 use a first-come-first-serve, multiple-requestor-toggling (MRT) system to insure that the oldest reference is processed first and that each of the ports connected to that arbitration network 320, 322, 332 or 336 has equal access to the particular shared resource 12.

The MRT system of the present invention is an efficient way of maintaining the relative priority of any number of requestors that need to be arbitrated with respect to one or more resources. The goal of the MRT system is to minimize the difference between the minimum and maximum access time in response to a request, while at the same time providing equal access to all requestors and maintaining relative time ordering of the requestors. The principle behind the MRT system of the present invention is to provide deterministic behavior for the shared resources 12 and, in particular, for the main memory 14 wherein the majority of requests are serviced nearer to the minimum access time. This principle arises out of the assumption that the relative time ordering of information requests is preferable and should determine their priority because programs and jobs typically request the shared resources 12 that are needed first.

Figure 15:
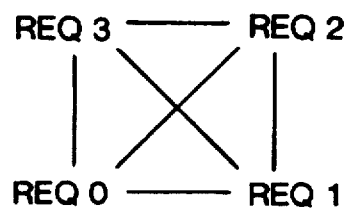
FIG. 15 is a schematic representation of a state diagram for a four requestor MRT system of the present invention.

Referring now to FIG. 15, an example of a four requestor MRT system of the preferred embodiment will be described. It can be seen that in order to maintain the relative priority among four requestors of equal priority, it is necessary to store information on six conditions or states that identify the relative priority of each of the six possible combinations of priority pairs, e.g., Req 0's priority with respect to Req 1, Req 0's priority with respect to Req 2, etc. In the MRT system of the present invention, the state of each priority pair is stored as a single bit that represents the requestor's relative priority with respect to one specific other requestor. Because a requestor is either higher or lower priority than the specific other requestor, one state (one bit) is sufficient to represent each priority pair. Thus, for N requestors, it is possible to represent the number of relative priority states among all N requestors with $(N*(N-1)/2)$ bits.

Figure 16A:
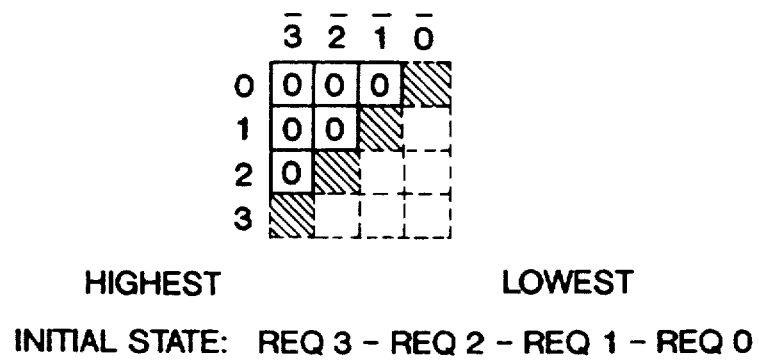
FIGS. 16a, 16b, 16c, 16d and 16e are state diagrams for the four requestor MRT system shown in FIG. 15.

FIGS. 16a-16e show a relative state matrix for all of the priority pairs of the 4 requestor system shown in FIG. 15. In this system, each priority pair is represented by a single bit. The inputs to the relative state matrix are comprised of both a positive and negative representation of each requestor. When each requestor receives a valid request, the requestor attempts to set all of its bits to the lowest priority, i.e., positive bits are set to "0" and negative bits are set to "1". To "read" the relative state matrix as shown in FIG. 16a, each row is examined. In the initial state shown in FIG. 16a, row 0 shows Req 0 is lower than Req 1, Req 2 and Req 3. Row 1 shows that Req 1 is lower than Req 2 and Req 3. Row 2 shows that Req 2 is lower than Req 3. Thus, the priority pairs for all six states are represented in the relative state matrix.

Figure 16B:
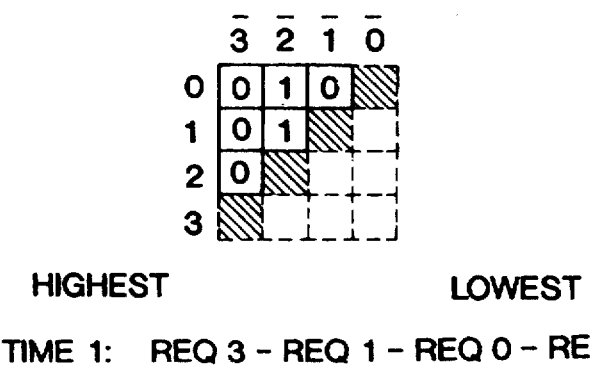

Referring now to FIG. 16b, the relative state matrix is shown at Time 1 when Req 2 has a valid request. As can be seen, Req 2 modifies the relative state matrix in response to the valid request and is now the lowest priority request. Req 2 has set all of its positive states to "0" and all of its negative states to "1". Reading row 0, Req 2 is lower than Req 0, but Req 0 is still lower than Req 3 and Req 1. Row 1 shows that Req 2 is lower than Req 1, but Req 1 is still lower than Req 3. Finally, row 2 shows that Req 2 is lower than Req 3. Thus, Req 2 is set to the lowest priority and will be serviced if Req 0, Req 1 or Req 3 is not presently requesting access to the resource being arbitrated.

Figure 16C:
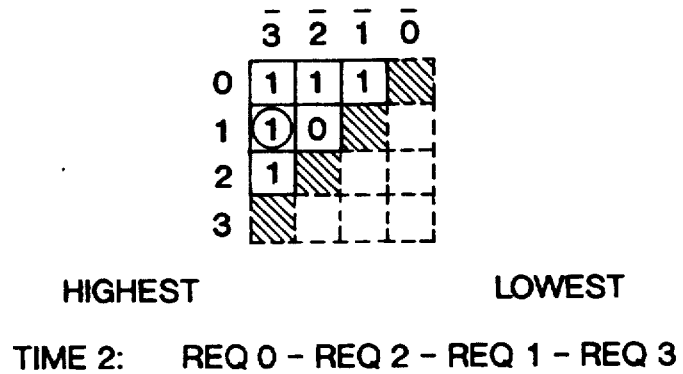

The relative state matrix is shown at Time 2 in FIG. 16c when new requests are received for both Req 1 and Req 3. Again, an attempt is made to set all of the bits in the priority pairs associated with each requestor with a valid request to the lowest priority. In row 0, both Req 1 and Req 3 are now lower than Req 0. Req 2 is still lower than Req 0 because the priority pair bit (0/2') remains in its previous condition, even though the request for Req 2 at Time 1 is already being serviced. The circled priority pair bit (1/3') illustrates the toggling case when two requestors collide. In this case, Req 1 is higher than Req 3 and will be the requestor to be serviced first. Because Req 2 was being serviced in Time 2, Req 1 will be serviced in Time 3, then Req 3 will be serviced in Time 4.

Figure 16D:
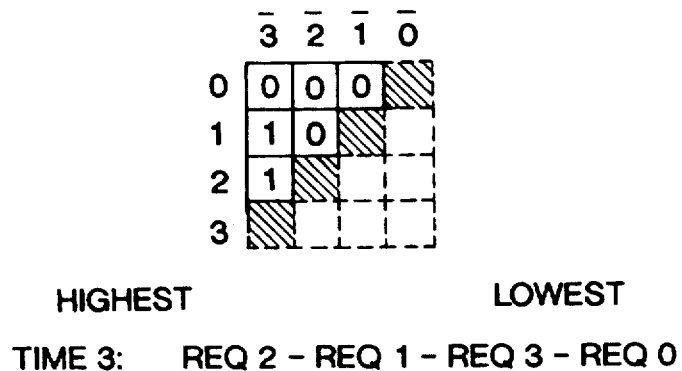

FIG. 16d shows the relative state matrix at Time 3. During Time 3, a new valid request is received from Req 0 which updates all of its priority pair bits. Req 3 still has an active request pending because both Req 1 and Req 3 were requesting the same resource during Time 2, but Req 1 had priority. Req 3's delayed request is now competing with the new request from Req 0. Because Req 3 is older, it will be granted during Time 4 and Req 0 will be delayed for one clock cycle. After both requests have been serviced, and assuming that neither requestor has a new valid request, the relative state matrix begins to toggle the priority pair bit on each clock cycle until one or the other requestors "freezes" the state with a new valid request. This toggling insures that if simultaneous requests are received again, both requestors have an equal chance of being set to the higher priority in the priority pair bit of the relative state matrix.

Figure 16E:
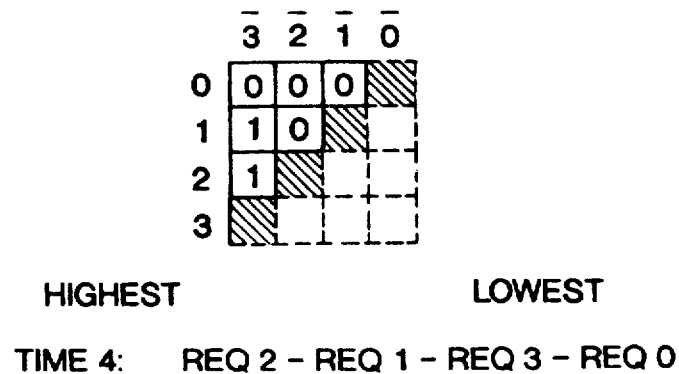

Finally, FIG. 16e shows the relative state matrix at Time 4. The previous request from Req 0 is now serviced. It will be noted that in the MRT system shown in FIGS. 16a-16e, a maximum delay of four cycles can occur if all four requestors have valid requests to the same resource during the same cycle.

Figure 17:
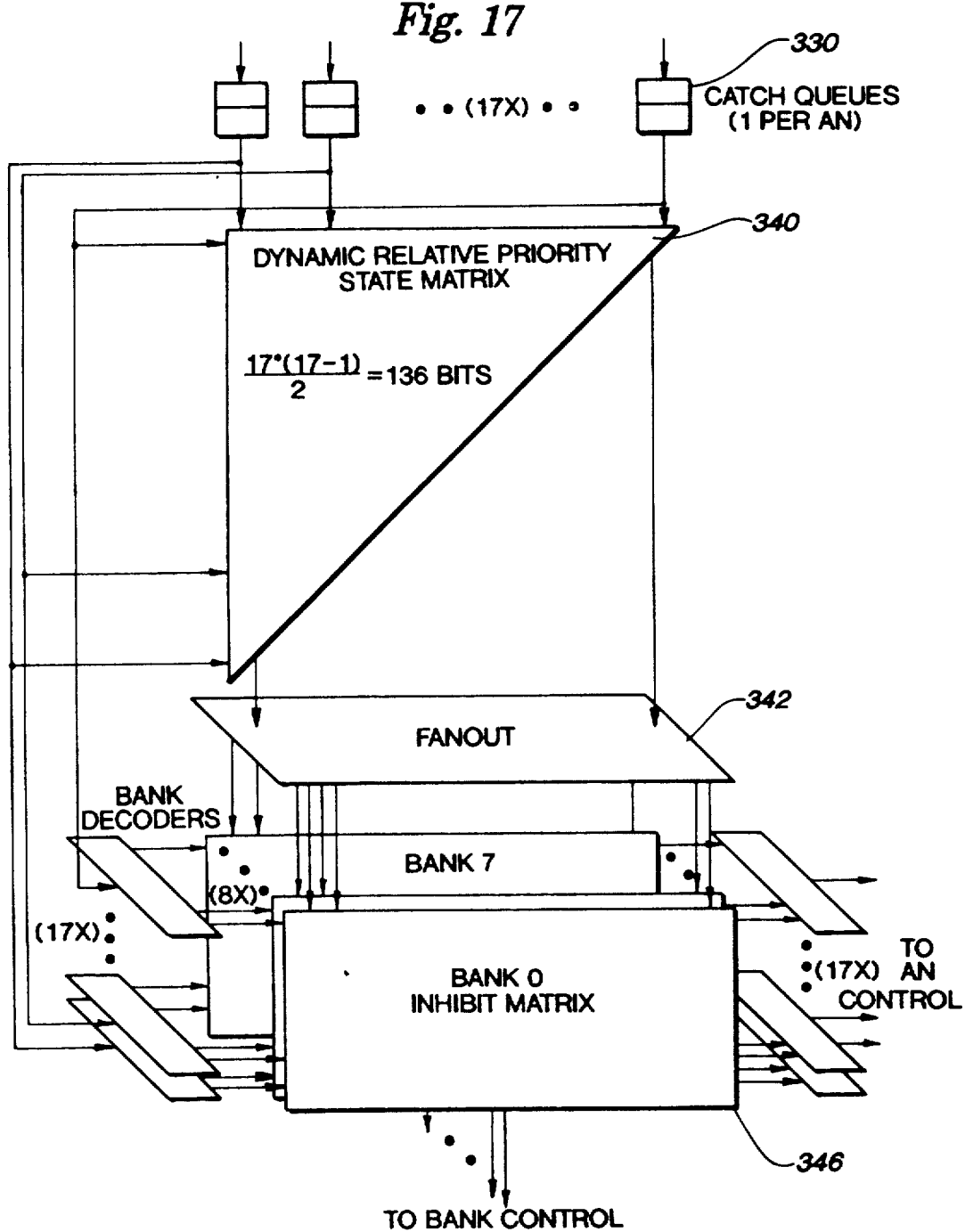
FIG. 17 is a schematic diagram of a bank arbitration network showing a seventeen requestor MRT relative state matrix.

Referring now to FIG. 17, the preferred implementation of the MRT system is shown for a bank arbitration network 332. The valid requests are held in the subsection catch queues 330 until they are first in the queue. At that time, the new valid request is presented to both the positive and negative inputs of the relative state matrix 340. The new valid request is also presented to each of the eight bank decoders 342. A fanout means 342 transfers the output of the relative state matrix 340 to each of eight bank inhibit matrices 346. This technique allows a single relative state matrix 340 to drive the arbitration logic for an entire subsection worth of memory banks 208, thereby eliminating the need for what would otherwise be duplicate arbitration logic at each bank 208.

Figure 18A:
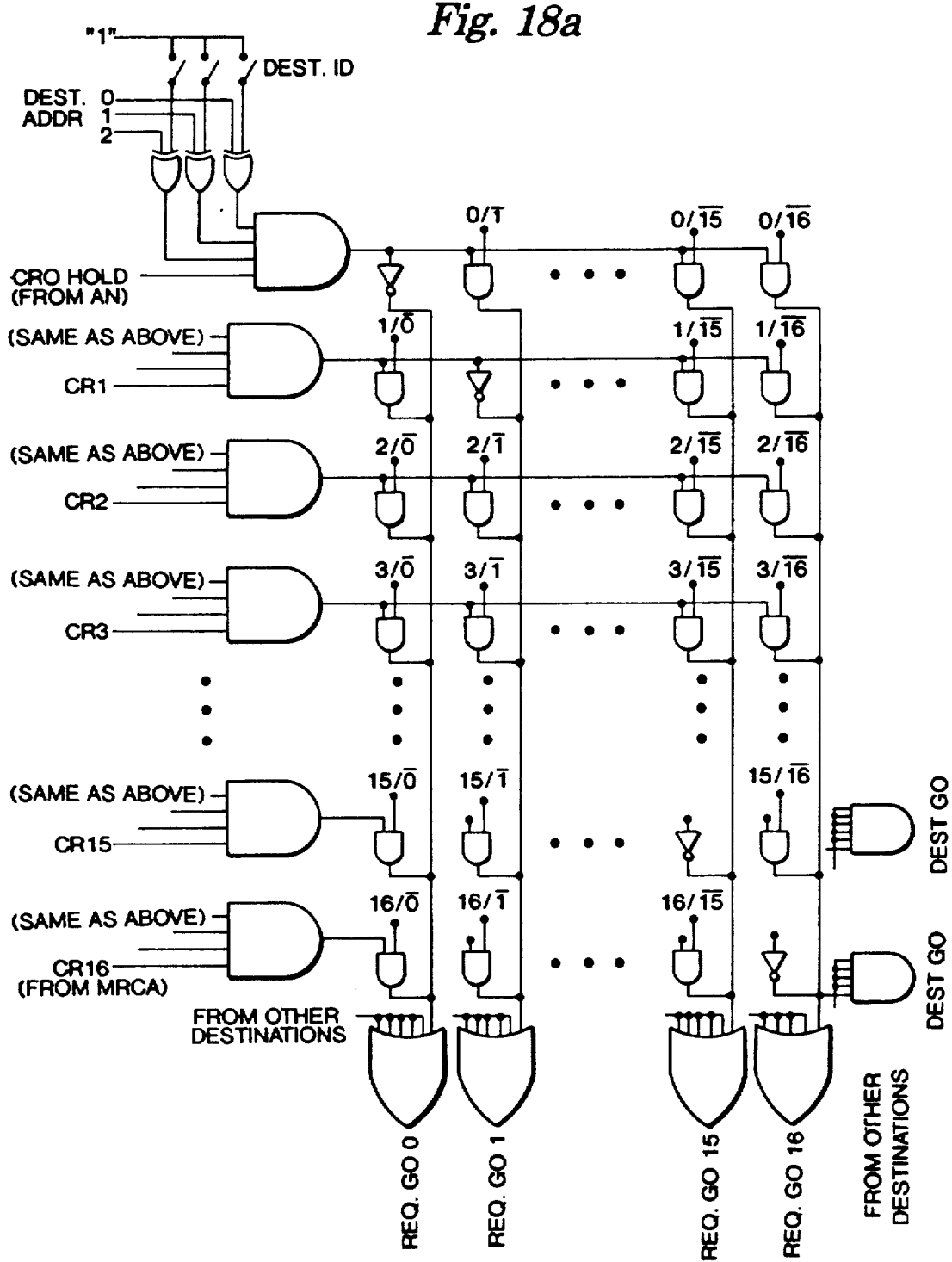
FIGS. 18a, 18b and 18c are detailed circuit diagrams for the MRT relative state matrix shown in FIG. 17.
Figure 18B:
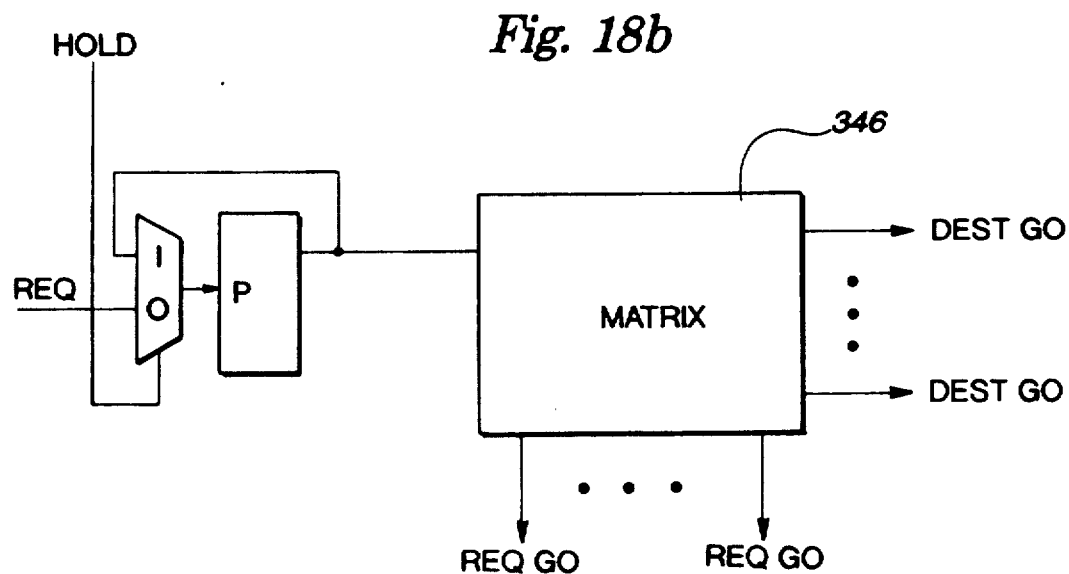
Figure 18C:
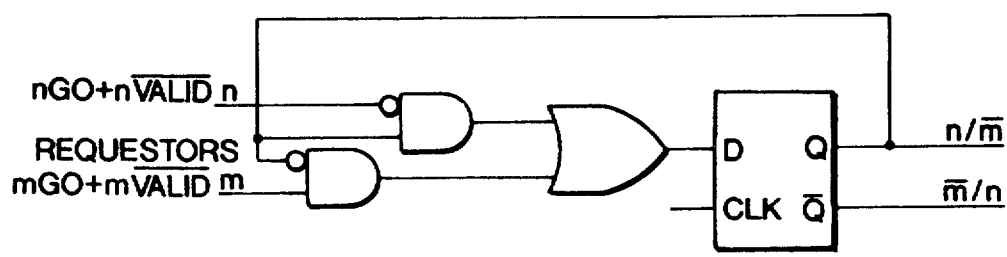

FIGS. 18a, 18b and 18c show detailed circuit diagram for implementing the bank arbitration network 332 as shown in FIG. 17. FIG. 18a shows the logic elements associated with one of the bank inhibit matrices 346. It will be noted that each of the priority pair inputs (e.g., 1/0', 2/0') are inputs generated from the relative state matrix 340. The implementation shown in FIGS. 18b and 18c allows the relative state matrix 340 to process the connection between requestor and destination in a single cycle. FIG. 18b shows the relationship between a request valid indication and the subsection catch queue 330, for example, prior to allowing a request to enter the relative state matrix 340 and inhibit matrix 346. FIG. 18c shows the atomic operation of the preferred embodiment of a priority pair within the relative state matrix 340.

The Remote Cluster Adapter Means

Figure 19A:
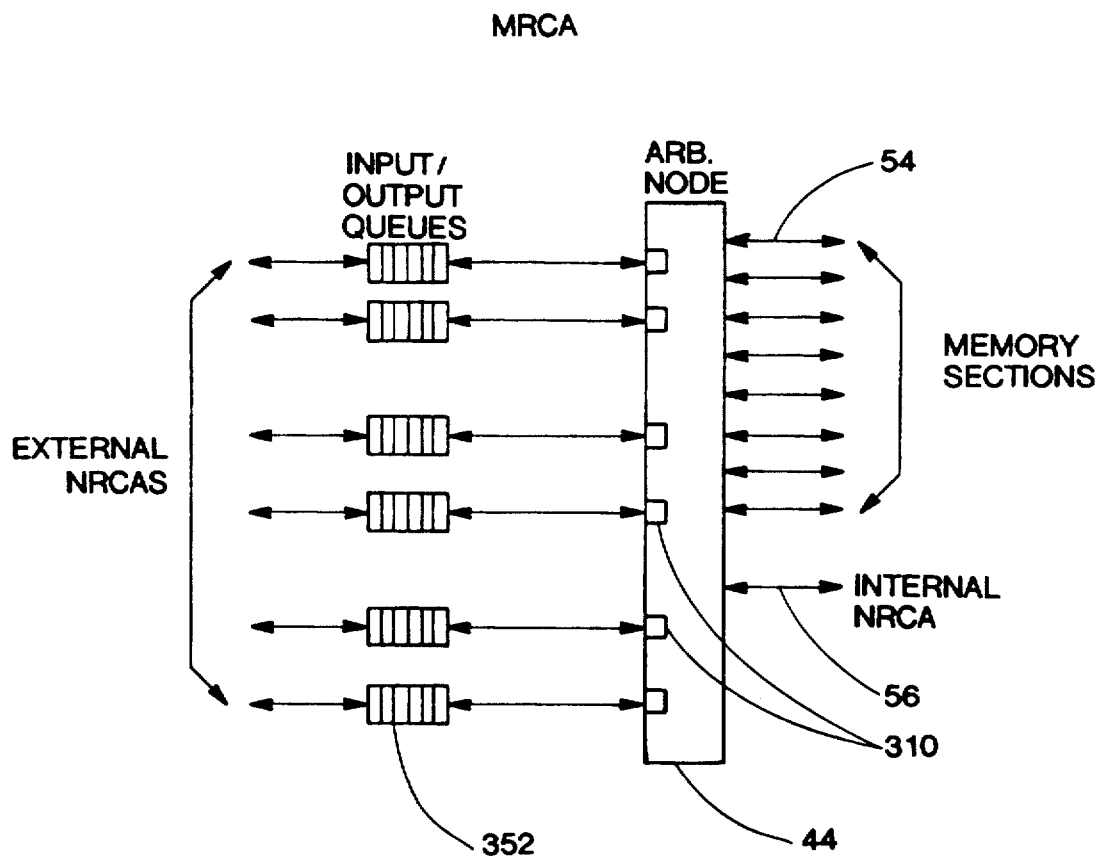
FIGS. 19a and 19b are block diagrams for the MRCA and NRCA means.

The remote cluster adapter means 42 is comprised of two separate logical components, the NRCA means 46 and the MRCA means 48. In the preferred embodiment, the NRCA means 46 is physically implemented with the same circuitry that supports the global registers 16 and the interrupt mechanisms 18, and the MRCA means 48 is physically implemented as a seventeenth arbitration node 44. Referring now to FIG. 19a, a block diagram of the MRCA means 48 is shown. Unlike the ports 302, 304, 306 and 308 in a normal arbitration node 44, the MRCA means 48 has just six input/output ports 350. In addition to the input queue 324 and data queue 332 for each port 350 in the arbitration node 44, the MRCA means 48 has six input/output queues 352 that act as an additional buffer mechanism between the MRCA means 48 and the NRCA means 46 of other clusters 40. Each input/output queue 352 is capable of holding up to sixty four requests from its associated remote cluster.

Figure 19B:
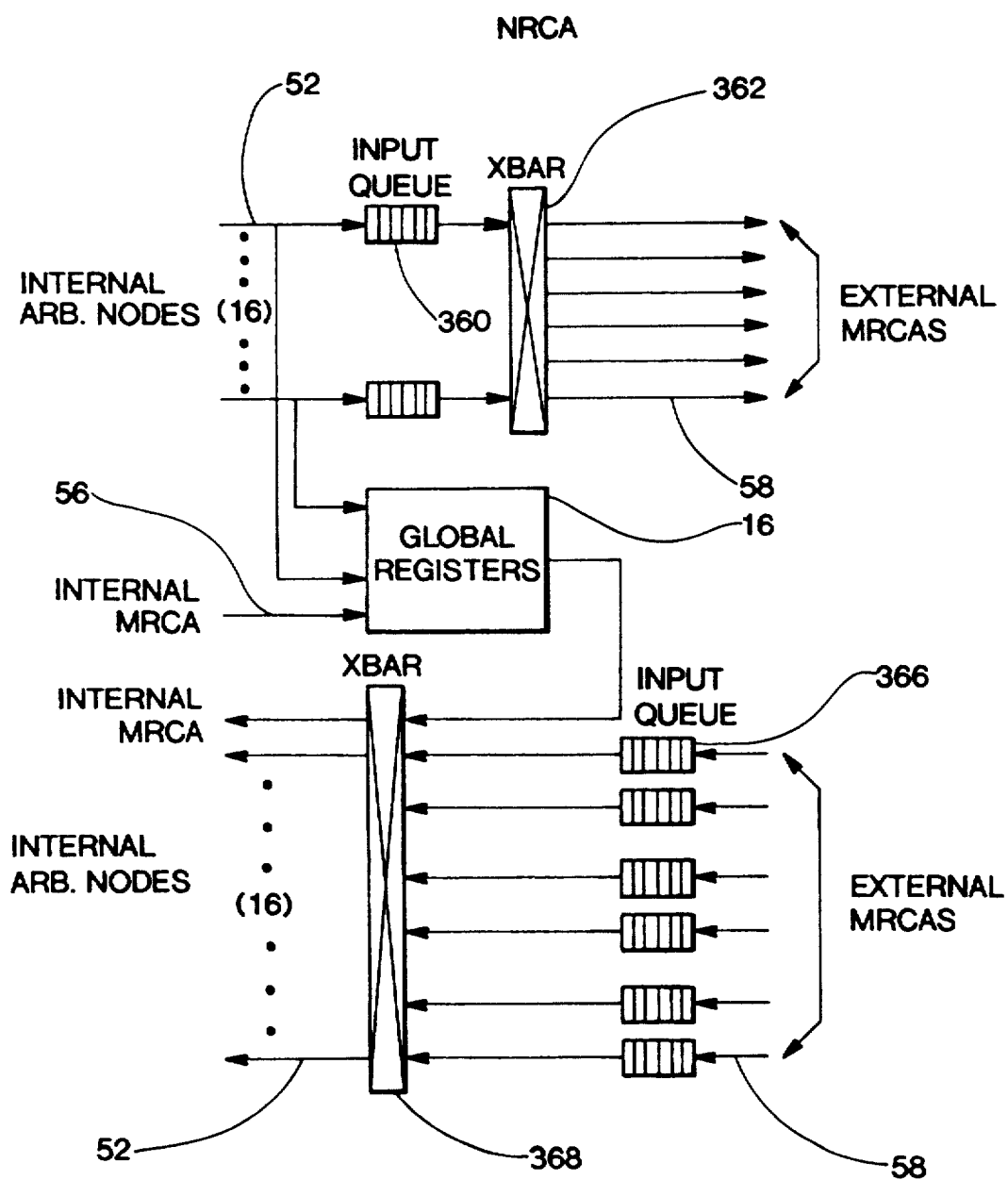

Referring now to FIG. 19b, the NRCA means 46 will be described. The paths 52 from each of the 16 arbitration nodes 44 are connected to an input queue 360 that queues requests to the other remote clusters 40. A 16×6 cross bar switch 362 connects the appropriate path 58 with the request in the input queue 360. When the requests return from a remote cluster 40, they are routed into one of six input queues 366. A 6×16 cross bar switch then connects the returning requests from the input queue 366 to the appropriate path 52.

Arbitrating Memory References

As shown in FIG. 16c, conflicts can occur when one or more requestors are attempting to access the same shared resource 12 (i.e., a bank 208, a data path 50, etc.) during the same clock cycle, or when that shared resource 12 is already servicing another request and has a busy or reservation time associated with it. In the case of memory request, a conflict creates a wait condition for the Memory Reference that can range from one to several clock cycles depending upon the conflict type.

Referring now to FIG. 20, the various types of shared resource conflicts that may occur will be described. A Memory Reference may be thought of as consisting of five phases. Each phase must be completed in succession. Conflicts at any given phase are not evaluated until the Memory Reference has passed all conflicts in any previous phase.

Phase I is the issuance of a memory reference by a processor 10 or external interface means 22. Associated with this phase is a constant pipeline latency of N1 clock cycles. Also associated with this phase is a variable delay of V1 clock cycles. V1 is determined by the request arbitration network 320 as a function of Simultaneous Section Conflict (SSC) and Catch Queue Full (CQF) conflicts. A SSC occurs when two or more ports 310 or 312 sharing the same arbitration node 44 request the same memory section 202 on the same clock cycle. A CQF occurs when the number of outstanding Memory References from a given arbitration node 44 to a given subsection 206 exceeds the maximum number of pipeline stages in the catch queue 330 to queue these Memory References on the input side of the bank 208.

Phase II is the issuance of a Memory Reference at the bank level. Associated with this phase is a constant pipeline latency of N2 clock cycles and a variable delay of V2 clock cycles. V2 is determined by the bank arbitration network 332 and is a function of Simultaneous Bank Conflict (SBC), Bank Busy Conflict (BBC) and Hold Queue Full (HCQ) conflicts. A SBC conflict occurs when two or more Memory References from different arbitration nodes 44 attempt to access the same bank 208 on the same clock cycle. This is a one cycle conflict that then turns into a BBC conflict. A BBC conflict occurs when a memory reference addresses a bank 208 that is currently busy due to a previous reference and is a function of the SRAM technology used in the banks 208. A HQF conflict occurs when the number of outstanding memory references from a given arbitration node 44 to any given subsection 204 exceeds the maximum number of pipeline stages in the hold queue 334 to queue the response to the Memory References on the output side of the bank 208.

Phase III of a memory reference is the progress of the memory reference through the bank. Associated with this phase is a constant delay of N3 clock cycles corresponding to the access time of the SRAMs in the bank 208.

Phase IV is the issuance of the load return data back to the requesting arbitration node 44. Associated with this phase is a constant pipeline delay of N4 clocks and a variable delay of V4 clocks. V4 is determined by the memory as a function of Simultaneous Return Conflict (SRC) and Data Queue Full (DQF) conflicts. A SRC conflict occurs when two or more Memory References from a given arbitration node 44 are sent to the same memory section 202, but different subsections 206 are attempting to return words on the same clock cycle. This conflict occurs because of bank conflicts and subsequent skewing of the Memory References and is resolved by the response arbitration network 336. This conflict also occurs if these Memory References are issued at their respective banks on different cycles and delay due to DQF conflicts cause a time realignment such that the Memory References attempt to use the same load data return path on the same clock cycle. A DQF conflict occurs when the number of outstanding Memory References from a given arbitration node 44 to a given memory section 202 exceeds the maximum number of pipeline stages in the data queue 326 to queue those returning references at the arbitration node 44.

Phase V of a memory reference is the return of words of data to the requesting port 302, 306 or 308 in the arbitration node 44. Associated with this phase is a constant delay of N5 clock cycles and a variable delay of V5 clock cycles. V5 is determined by the response arbitration network 322 as a function of any Port Busy Conflict (PBC) conflicts. A PBC conflict occurs when two or more Memory References from different memory sections 202 attempt to return to the same port 302, 306 or 308 on the same clock cycle.

Out-of-Order Access

Data may be returned to the requesting ports 302, 306 and 308 in a different order than it was requested. The arbitration node 44 receives a set of tags with each load address and queues them for future reference. When data is returned from main memory 14, the tags are re-attached to the corresponding data words and both data and tags are passed back to the requesting port. The processors 100 and external interface means 22 use the tags to route the data to its proper location. For the vector means 104 and the external interface means 22, the proper location insures correct sequencing of operations. For the scalar means 102, the proper location refers to the particular registers (S or L) or the location in the instruction cache 110 to which the data is to be routed. Because the out-of-order access feature is handled automatically through the hardware associated with the arbitration node 44, a user does not need to be concerned with this functionality.

Figure 21A:
FIGS. 21a, 21b, 21c and 21d are schematic representations of the pipelining techniques of the prior art and present invention.
Figure 21B:
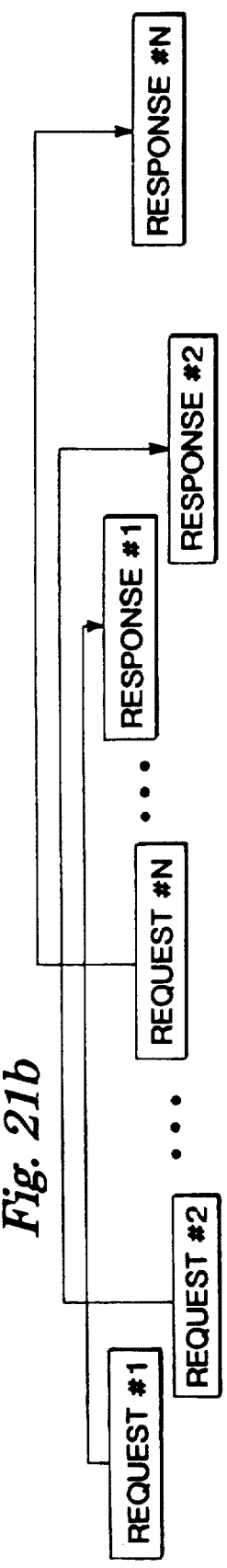
Figure 21C:
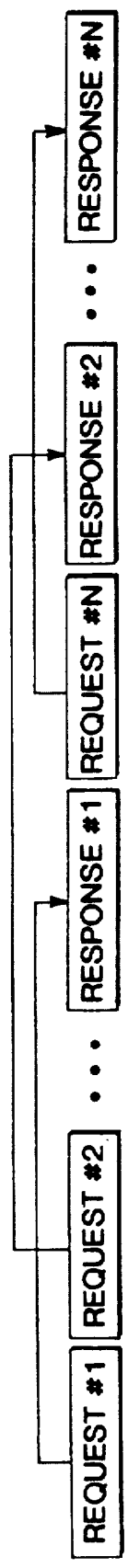
Figure 21D:
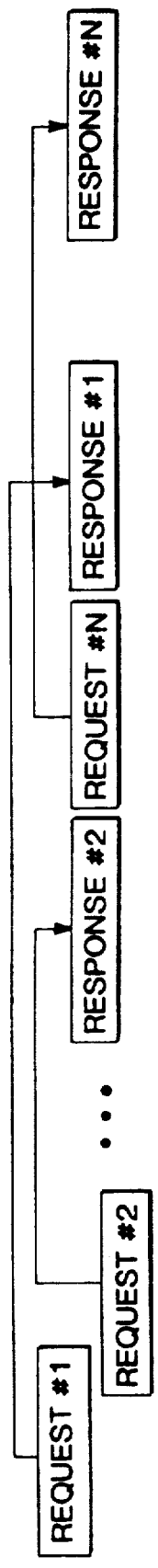

Referring now to FIGS. 21a-21d, a schematic representation of the pipelined, out-of-order access mechanism of the present invention as compared to the prior art is set forth. These figures are applicable to a requestor/resource operation at each level in the architecture, e.g., among the registers and functional units of a scalar means 102 or vector means 104, among the request ports of an arbitration node 44 and the various shared resources 12, or among multiple processes as scheduled by the operating system. FIG. 21a shows how a stream of requests and responses would be handled in a prior art system. Because there is no capability of out-of-order access, each consecutive request must wait for its associated response to be completed before the next request can be initiated. Referring now to FIG. 21b, some prior art vector processors support the ability to make consecutive requests to load or write a vector register without the need to wait for each response to return. The limited pipeline technique shown in FIG. 21b has only been applied to vector processors and has not been applied to other system resources. The pipeline techniques shown in FIGS. 21c-21d have not been applied in the prior art. In the present invention, all system resources may be accessed using all of the pipeline techniques as shown in FIGS. 21b-21d. Referring now to FIG. 21c, it will be seen that the bidirectional ports and request and response queueing in the arbitration node 44, for example, allow for response 1 to be returned before request n is issued. Finally, as shown in FIG. 21d, the tagging mechanism of the present invention allows response 2 to be returned prior to response 1.

To process an out-of-order data stream, the processors 100 and external interface means 22 require that the arbitration node 44 provide information beyond the tags. This information relates to the sequencing of requests and when those requests are committed to be processed by a particular shared resource 12. In the preferred embodiment, this information is provided in the form of the Data Mark Mechanism as discussed below.

The Data Mark Mechanism

To assist in the coordination and synchronization of the various pipelines of the present invention, a Data Mark mechanism is also utilized. The Data Mark mechanism is a means to accomplish the synchronization of shared resource activity thru use of the local mark (mark) and global mark (gmark) instructions. When simultaneous (either between ports in an arbitration node 44 or between processors 10) or out-of-order accesses to the shared resources 12 are allowed, a synchronization problem exists. The Data Mark mechanism addresses this problem. In other words, the Data Mark mechanism is the process used to guarantee that data which is expected to be returned from a shared resource 12 is, in fact, the data that is returned, independent of order of request.

The Data Mark mechanism allows a processor or I/O device to determine when no other requests (either locally or globally) can get ahead of the marked requests in the pipelines. All subsequent requests from this requestor are suspended until the marked requests have cleared the shared resource. A local marked reference is acknowledged by the particular shared resource 12 when the request has been committed by the arbitration node 44. A global marked reference is acknowledged when the request has been committed by the particular shared resource 12. The local Data Mark mechanism is handled relatively quickly, while the global Data Mark mechanism is moderately slow for intra-cluster checks and much slower for inter-cluster checks.

In the preferred embodiment, the Data Mark mechanism is implemented through the use of the mark, gmark and waitmk instructions as explained in greater detail in Appendix B. Unlike prior art schemes for marking data as unavailable until a certain event occurs, the Data Mark mechanism of the present invention separates the marking of a shared resource 12 (mark or gmark) from the wait activity that follows (waitmk). This separation allows for the scheduling of non-dependent activity in the interim, thereby minimizing the time lost waiting for marked references to commit.

Load and Flag Mechanism

The Load and Flag mechanism is an atomic memory operation that simultaneously returns the current value of a memory location and stores a predefined pattern in its place.

In conjunction with the gather and scatter instructions as explained in greater detail in connection with Appendix B, the Load and Flag mechanism provides a powerful means for multithreading, vectorizing, and pipelining traditionally scalar "Monte Carlo" applications. The term "Monte Carlo" refers to the random nature of the requested memory address stream created by these applications as they attempt to update various memory locations determined by pseudo-random techniques. In prior art, this random address stream prevented the use of pipelines, vectorization, and multithreading because address conflicts might occur. In this invention, the Load and Flag mechanism does not eliminate these conflicts, rather it supports pipelining of the detection and processing of these conflicts. In the preferred embodiment, the Load and Flag mechanism is accomplished by issuing a read and write function to a location in the main memory 14 simultaneously. Logic at each bank 208 interprets this read and write function as a write of a predefined flag pattern to the memory location. Because the address for the memory location is set up prior to the issue of the write of the predefined flag pattern, this logic can read the data currently at the memory location one clock cycle prior to issuing the write operation. The data that is read is then returned to the requestor using the normal read mechanisms. When the requestor is finished modifying the data in the flagged location, a subsequent store issued by the requestor to the flagged location will "clear" the flag.

The Global Registers

The global registers 16 are used for synchronization and for sharing data among the processors 10 and external interfaces 22. Any and all processors 10 and external interface means 22 may simultaneously access the same or different global registers 16 in any given clock cycle. The global registers 16 are physically and logically organized into groups or files. Simultaneous references to registers in separate groups take place in the same clock cycle. Simultaneous references to a register in the same group are serialized over a number of clock cycles. The global register logic resolves any access contention by serially granting access to each requestor so that only one operation is performed at a time. References to a single global register are processed in the order in which they arrive. References to global registers within a given group take place at the rate of one operation every clock cycle.

Figure 22:
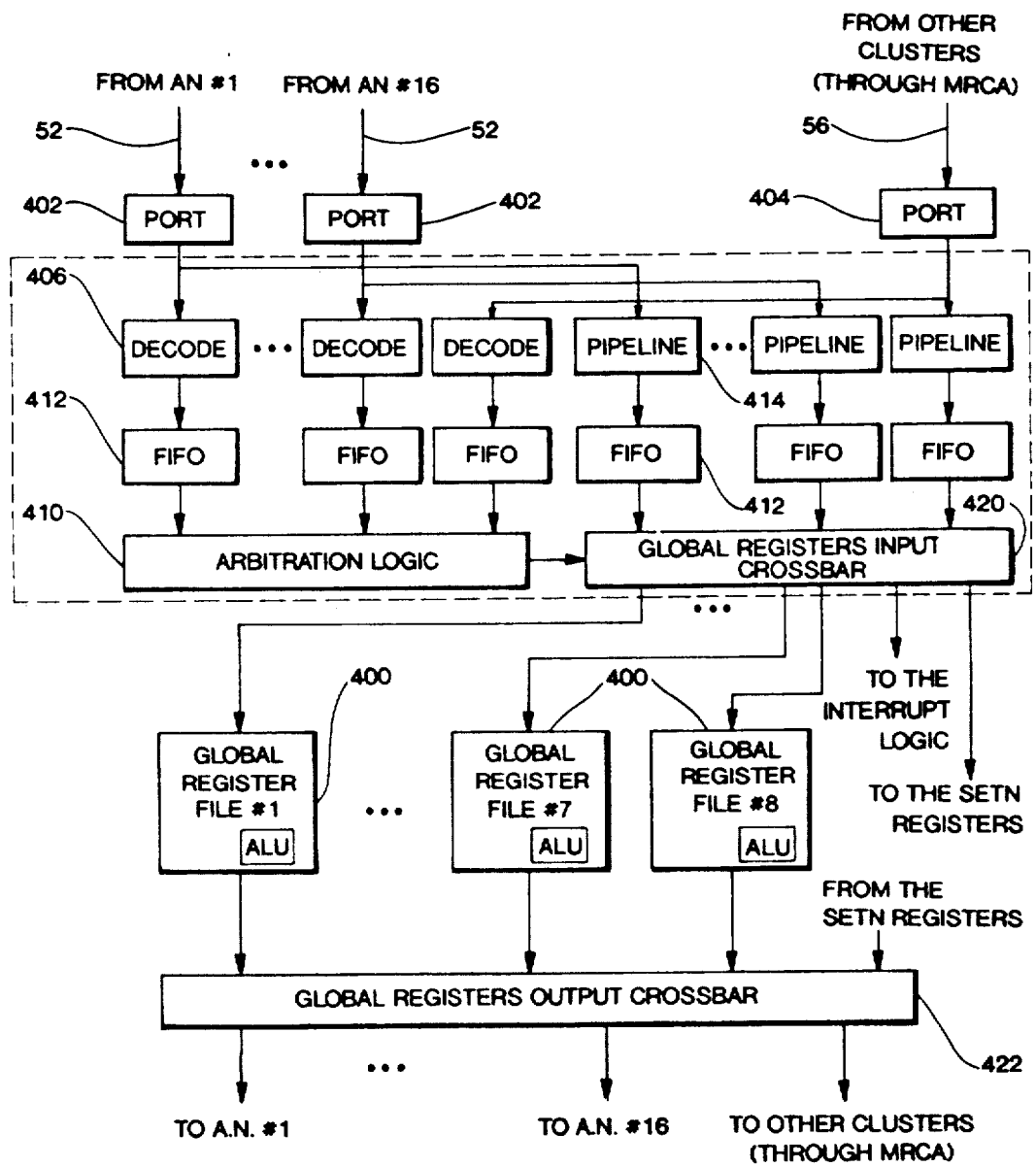
FIG. 22 is a block diagram of the global registers of the present invention.
Figure 23:
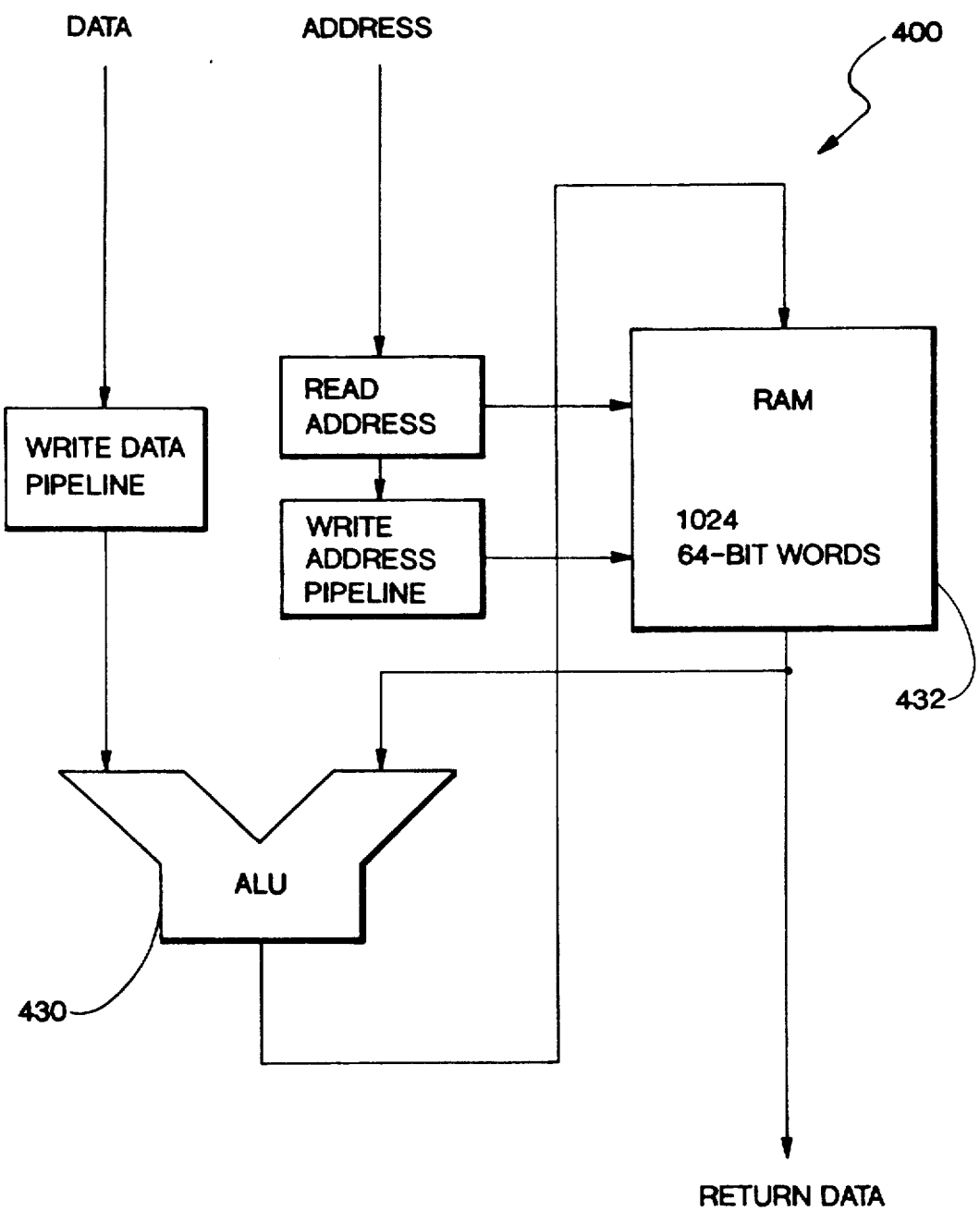
FIG. 23 is a block diagram of a global register file means within the global registers shown in FIG. 22.

Referring now to FIGS. 22 and 23, the physical organization of the global registers 16 in the four-cluster preferred embodiment of the present invention will be described. The preferred embodiment provides addressing for a contiguous block of 32,768 global registers located among the four clusters 40. There are 8192 global registers per cluster 40. The global registers are organized within each cluster 40 as eight global register files 400 so that accesses to different global register files 400 can occur simultaneously. In this embodiment, the global registers 16 for each cluster 40 are physically located within the NRCA means 46 of that cluster.

As shown in FIG. 22, there are sixteen ports 402 to the global registers 16 from the thirty-two processors 100 and thirty-two external interface means 22 in a cluster 40. Each port 402 is shared by two processors 100 and two external interface means 22 and is accessed over the path 52. A similar port 404 services inter-cluster requests for the global registers 16 in this cluster as received by the MRCA means 48 and accessed over the path 56. As each request is received at a port 402 or 404, decode logic 406 decodes the request to be presented to a global register arbitration network 410. If simultaneous requests come in for multiple global registers 16 in the same global register file 400, these requests are handled in a pipelined manner by the FIFO's 412, pipelines 414 and the global register arbitration network 410.

Priority is assigned by FIFO (first in, first out) scheme supplemented with a rotating priority scheme for simultaneous arrivals. The global register arbitration network 410 uses arbitration logic similar to that previously discussed in connection with the section on the Arbitration Nodes. When priority is determined by the arbitration network 410, a 17×10 crossbar switch means 420 matches the request in the FIFO 412 with the appropriate global register file 400, or interrupt mechanism 18 or SETN register as will be described in greater detail hereinafter in connection with the section on Interrupts. After the operation is completed, another cross bar switch means 422 routes any output from the operation back to the requesting port.

It will be recognized that access time to global registers 16 will, in general, be slightly faster than to main memory 14 when requests remain within the same cluster 40. Also, there is no interference between in-cluster memory traffic and global register traffic because requests are communicated over different paths.

As shown in FIG. 23, each global register file 400 has one thousand twenty-four general purpose, 64-bit registers. Each global register file 400 also contains a separate ALU operation unit 430, permitting eight separate global register operations in a single clock cycle per cluster. The global register files 400 are interleaved eight ways such that referencing consecutive locations accesses a different file with each reference. In this embodiment, the global register are implemented using a very fast 1024×64-bit RAM 432.

Figure 24:
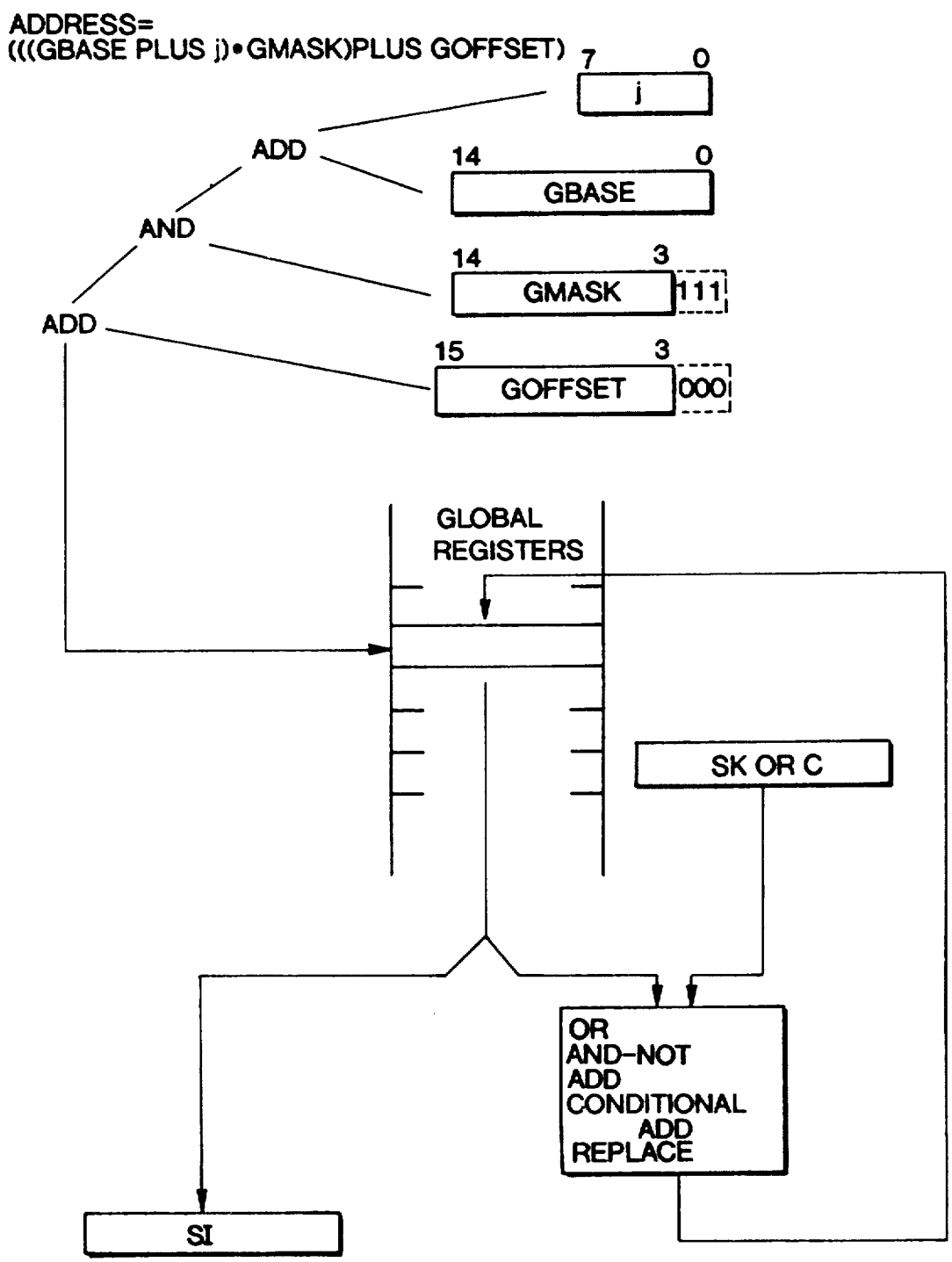
FIG. 24 is a schematic representation of a flow chart showing the global register addressing.

Referring now to FIG. 24, the method for accessing the global registers 16 is illustrated. The present invention uses a relative addressing scheme for the global registers 16 to eliminate the need for explicit coding of global register addresses in the user's program. Global register address calculations are based on the contents of three processor control registers: GOFFSET, GMASK and GBASE. Setting GMASK to all ones permits the user to access all of the available global registers 16. GOFFSET and GMASK are protected registers that can be written only by the operating system. Together they define a segment of the global register space that the processor can address. The three least-significant bits of GOFFSET are assumed to be zero when the address calculation is performed, and the three least-significant bits of GMASK are assumed to be ones.

GBASE is a user-accessible 15-bit register. The value contained in the instruction j field is added to GBASE to form the user address. The j field is considered to be unsigned, and any carry out is ignored. The sum of GBASE and the instruction j field is logically ANDed with the contents of GMASK, placing a limit on the maximum displacement into the register set that the user can address. The result of the mask operation is added to the contents of GOFFSET. Any carry out is ignored. It should be noted that the two most significant bits of the resulting 15-bit sum are used to select which cluster 40 is accessed. A carry that propagates into the upper two bits as a result of either of the add operations will change the cluster select bits. Note that GOFFSET is a 16-bit register. The 16th bit is used to select the SETN registers (described in further detail hereinafter in connection with the Interrupt Section) and must be zero when accessing the global registers 16.

Figures 25A, 25B, 26:
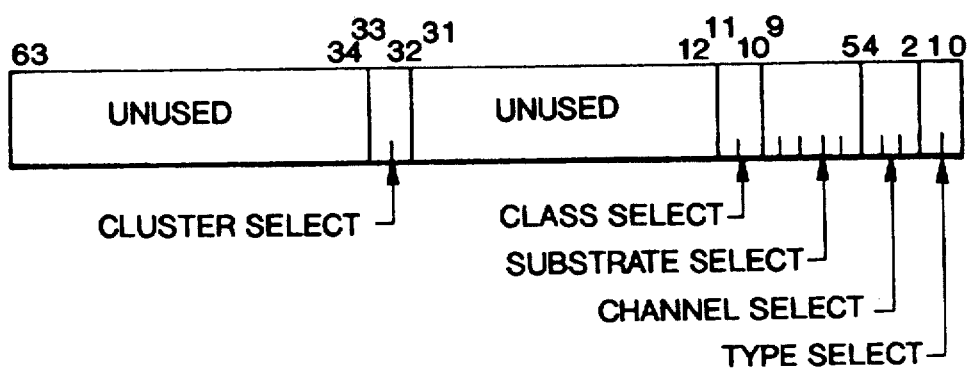
FIGS. 25a and 25b are schematic representations showing the global register physical address map and the global register address implementation.
FIG. 26 is a schematic representation showing the signal device selection implementation.

The address generated by this method allows access to the set of global registers 16 that the operating system assigns to any particular processor. All processors 10 could be assigned to one particular set or to different sets of global registers 16, depending on the application and availability of processors. Upon initialization, the global registers in each cluster are assigned a base address. The logical-to-physical arrangement of this addressing scheme is shown in FIG. 25a.

The I/O concentrator means 24 can also perform global register operations. The operating system reserves for itself any number of global register sets that will be used for parameter passing, interrupt handling, synchronization and I/O control. In the preferred embodiment, the various I/O concentrator means 24 contain part of the operating system software and are able to access all of the global registers 16 in all clusters 40. The addressing scheme for global register addressing from the I/O concentrator means 24 through the external interface means 22 is shown in FIG. 25b. This method permits 8192 global registers to be addressed in each of the four clusters 40. It should be noted that address values which specify a binary one in bit position 13 will address the SETN registers, rather than the global registers 16.

A key feature of the global registers 16 of the present invention is their ability to perform a read-modify-write operation in a single uninterruptable operation. Several versions of such an "atomic" operation are supported. The global register operations are as follows:

Test And Set (TAS). Data written to the selected register is logically ORed with data in the register. Contents of the register prior to modification are returned to the originator of the request.

Set (SET). Data written to the selected register is logically ORed with data in the register.

Clear (CLR). Clear bits in the selected global register are set in data supplied by the originator of the request.

Add (ADD) Data written to the selected register is arithmetically added to the value in the register, and the result is placed in the register.

Fetch And Add (FAA). Data written to the selected register is arithmetically added to the value in the register. Register contents prior to the addition are returned to the originator of the request.

Fetch and Conditional Add (FCA). Data written to the selected register is arithmetically added to the value in the register. If the result of the add is less than zero, the register contents are not changed. Register contents prior to the addition are returned to the originator of the request.

SWAP. Data supplied by the originator of the request is written into the selected register. Contents of the register prior to modification are returned to the originator of the request.

Read. Contents of the register are returned to the originator of the request.

Write. Data supplied by the originator of the request is written into the selected register.

Synchronization via a semaphore-like operation using the global registers 16 is accomplished by the Test and Set (TAS) instruction and a software convention to make a specific global register 16 contain semaphore information. The TAS instruction causes a number of bits to be set in a global register 16. However, before the data is modified, the contents of the global register 16 are sent back to the issuing processor 100. The processor 100 then checks to see if these bits are different. If they are different, the processor 100 has acquired the semaphore because only one register at a time can change any data in a global register 16. If the bits are the same, the software may loop back to retry the TAS operation.

Besides the obvious rapid synchronization capability required to support parallel processing, additional functionality has been designed into the global registers 16 and the overall architecture. At compilation, each process determines how many processors 100 it can use for various portions of the code. This value can be placed in its active global register set as the process's processor request number. Any free processor is, by definition, in the operating system and can search for potential work simply by changing the GMASK and GOFFSET control registers and scanning an active process's processor request number.

Processors, when added to a process, decrement the processor request number. The operating system can easily add processors to a process, or pull processors from a process, based on need and usage. The fetch and conditionally add (FCA) instruction ensures that no more processors than necessary are added to a process. This instruction also facilitates the parallel loop handling capabilities of multiple processors as discussed in further detail hereinafter.

The Interrupt Mechanism

Figure 27:
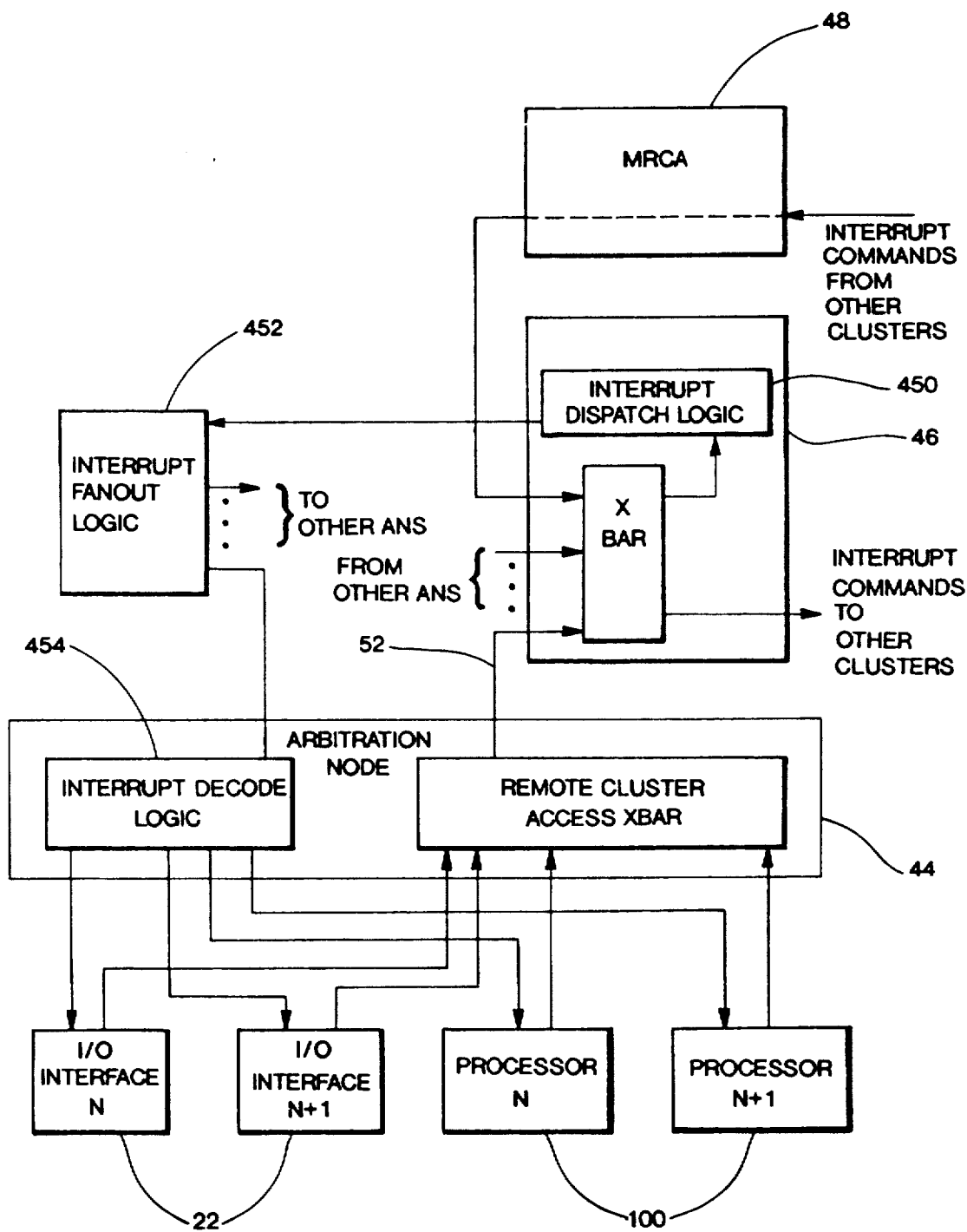
FIG. 27 is an overall block diagram showing the signals (interrupts) of the present invention.

Referring now to FIG. 27, a logical block diagram shows the operation of signals (interrupts) within the present invention. Both processors 100 and I/O concentrator means 24 can send and receive signals, in the same and in different clusters. Processors 100 may initiate signals by executing the Signal instruction. Once the interrupt signal has reached the interrupt dispatch logic 450 in the NRCA means 46, it is dispatched from there in the same manner. An interrupt fanout logic 452 returns the interrupt signal from the interrupt dispatch logic 450 to the arbitration mode 44 of the processor 100 or external interface 22 being interrupted. Additional interrupt decode logic 454 within the arbitration node 44 then passes the interrupt signal to the appropriate processor 100 or external interface means 22.

For interrupts generated by the Signal instruction, the value in the S register selected by the Signal instruction is interpreted as the destination select value. Signals are received by the processors 100 as interrupt requests. Interrupt requests are masked by the Disable Type bits (DT0-3) in the System Mode register. Masks for the Interval Timer and Fast Interrupt requests as described hereinafter are also located in the System Mode register. Pending interrupts are captured in the Pending Interrupt (PI) control register. A bit in the PI register corresponds to each type of interrupt. An incoming signal sets the appropriate PI register bit and causes an interrupt if the SM mask for that bit is not set. PI bits are cleared by the interrupt handler code after recognizing the interrupts.

The I/O concentrator means 24 can initiate signals by writing the destination select value to the interrupt logic. A command code is supported by the Standard Channel 34 that allows a peripheral controller to perform this operation. The Standard Channel 34 and the SMS 28 may also transmit signals to peripheral device controllers. As discussed in greater detail hereinafter, logic in the I/O system initiates the appropriate channel activity when it detects that a signal has been sent to the device associated with any given channel. This method is used to initiate signals and the action taken in response to a signal varies according to device type.

Signals are initiated by sending a destination select value to the signal logic. FIG. 26 shows the logical to physical mapping for the destination select values.

Substrate Select determines which physical processor or I/O concentrator will receive the interrupt.

Class Select determines which type of device will receive the interrupt. The two bit code is as follows: 0-processor, 1-I/O concentrator, 2-secondary memory transfer controller, and 3-reserved.

Channel Select. When an I/O concentrator is specified in the Class Select field, bits 4 through 2 address a channel adapter on the concentrator selected in the Substrate Select field. When the secondary memory transfer controller is specified in the Class Select field, bit 2 selects which secondary memory transfer controller in an I/O concentrator means 26 will be interrupted. This field is ignored for all other class selections.

Type Select determines which type of interrupt is to be transmitted. The signal type is captured at the destination device. The effect of different types of signals is device dependent.

Figure 28A:
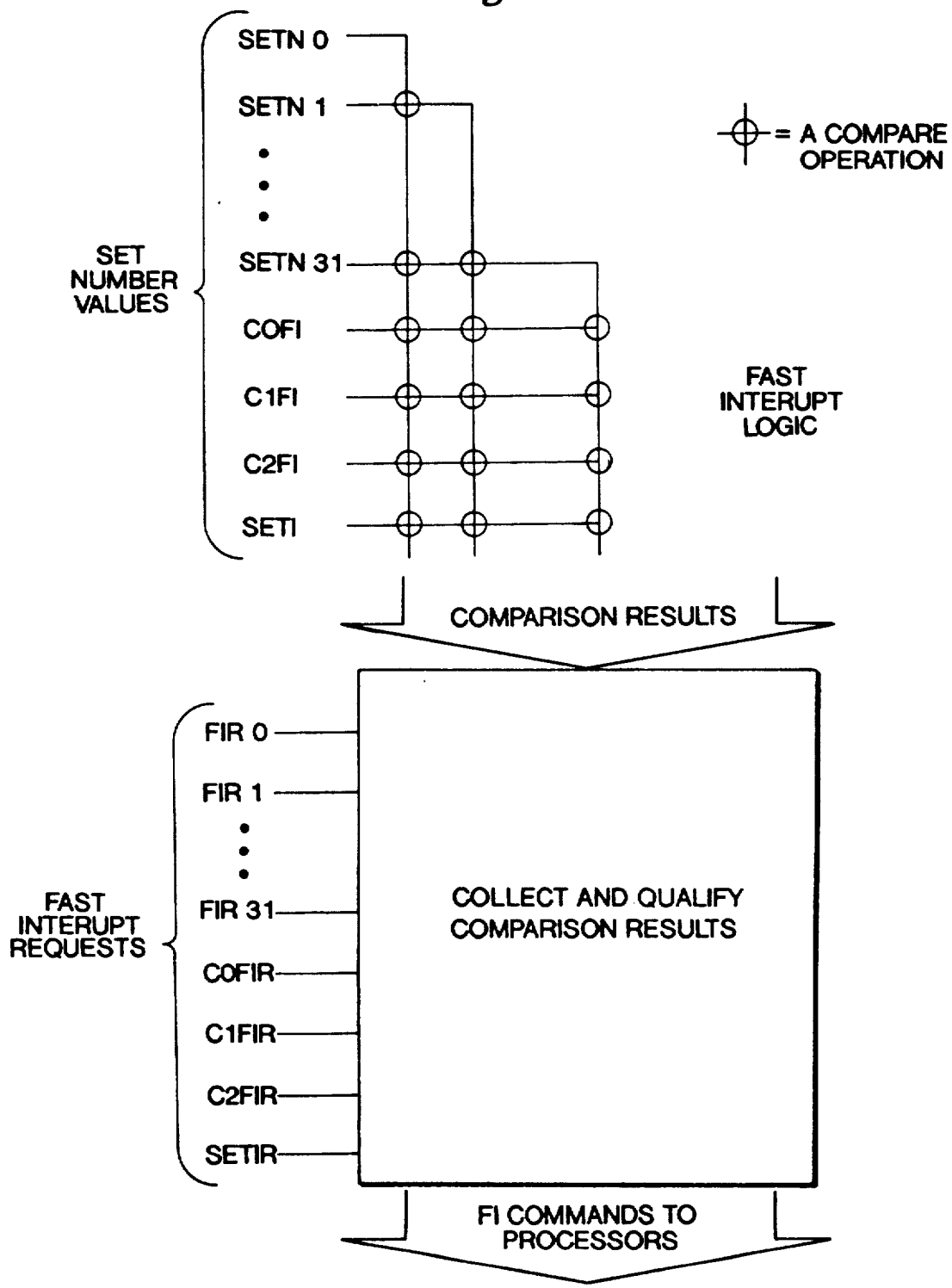
Figure 28C:
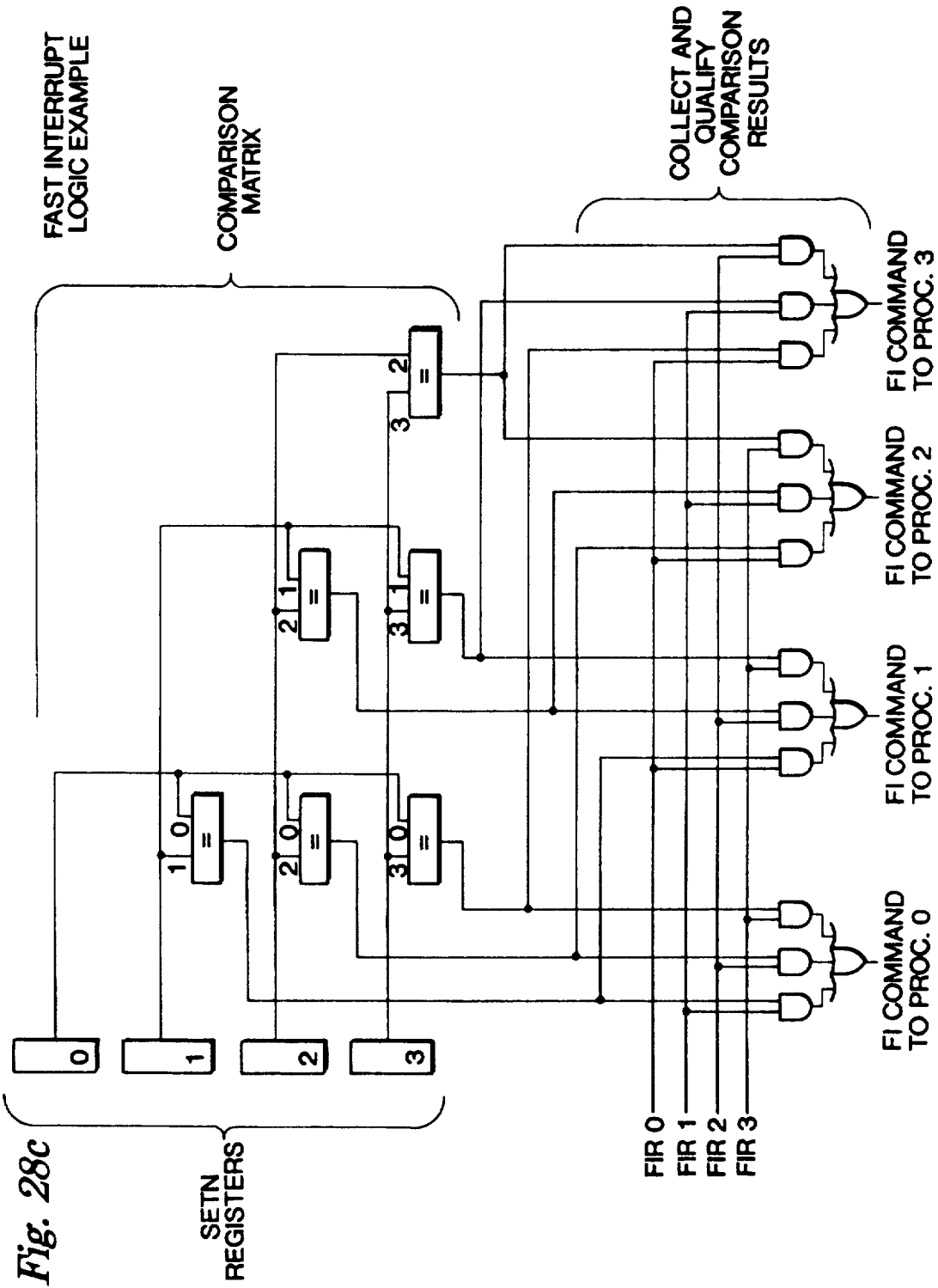
FIG. 28c is a detailed circuit diagram of the Fast Interrupt facility shown in FIGS. 28a and 28b.

Referring now to FIGS. 28a, 28b and 28c, the Fast Interrupt facility will be described. The Fast Interrupt facility allows a processor 100 to simultaneously send an interrupt to all other processors 100 associated with the same process. Processors 100 are mapped into logical sets for purpose of operating system control by the contents of a group of Set Number (SETN) registers that are part of each cluster 40. There are 32 SETN registers in the global register system for a single cluster 40, one for each processor 100. When one processor in a set generates a Fast Interrupt request, the interrupt dispatch logic 450 sends interrupts to all of the processors 100 in the same set as the one that initiated the request by performing a 36-way simultaneous comparison of all SETN values as shown in FIG. 28a. Before the interrupt signal is actually sent to the processor 100, the comparison results are feed into a verification circuit that insures that a valid Fast Interrupt request was, in fact, sent by the requesting processor. If so, the Fast Interrupt signal is then sent to each of the processors that that has the same set number as the set number for the requesting processor. FIG. 28b shows the additional logic on the NRCA means 46 that is used to send Fast Interrupts to other remote clusters 40. A detailed circuit diagram of the preferred implementation of the interrupt logic for the simultaneous comparison and verification circuit for a four interrupt system is shown in FIG. 28c.

It is important to note that the Fast Interrupt facility can simultaneously process all of the interrupt signals received at the interrupt logic in a single cycle. The ability to handle all of the Fast Interrupts received in a single cycle within that cycle eliminates the problems associated with the queueing of interrupts. It will be recognized, however, that signal delays may cause both the issuance and receipt of Fast Interrupts to be delayed for a plurality of cycles before or after the interrupt logic. Even so, these delays do not result in any queuing of interrupts.

The Fast Interrupt is initiated by three processor mechanisms: (1) an exception condition (captured in the Exception Status register); (2) issuing a Fast Associate Interrupt Request (FAIR) instruction to request an interrupt in the set of associated processors; or (3) writing a set number to the SETI register. The Fast Interrupt Request Mask (FIRM), located in the System Mode register, disables generation of a Fast Interrupt request when any exception is encountered. Setting FIRM to a binary one disables Fast Interrupt requests. If an individual exception is disabled, the Fast Interrupt cannot occur for that type of exception. Another System Mode register bit, Disable Fast Interrupt (DFI), disables incoming Fast Interrupt requests. A processor cannot be interrupted by a Fast Interrupt request while DFI is set.

The Fast Associate Interrupt Request (FAIR) instruction also generates a Fast Interrupt request. Executing a FAIR instruction causes a Fast Interrupt to occur in the associated processors, but not in the issuing processor. Two steps are necessary to include a processor in a set: (1) the SETN register for that processor must be written with the number of the set it will be associated with; and (2) the DFI bit in that processor's System Mode register must be set to zero.

Although both I/O peripheral devices 32 and the SMS 28 may initiate Fast Interrupts, only processors can be interrupted by Fast Interrupt Operations. The I/O subsystem allows a device to directly write the number of the set to be interrupted to the Fast Interrupt logic. This occurs by writing into the SETI register. All processors whose SETN registers contain the set number value written are then interrupted.

The I/O Subsystem

Figure 29:
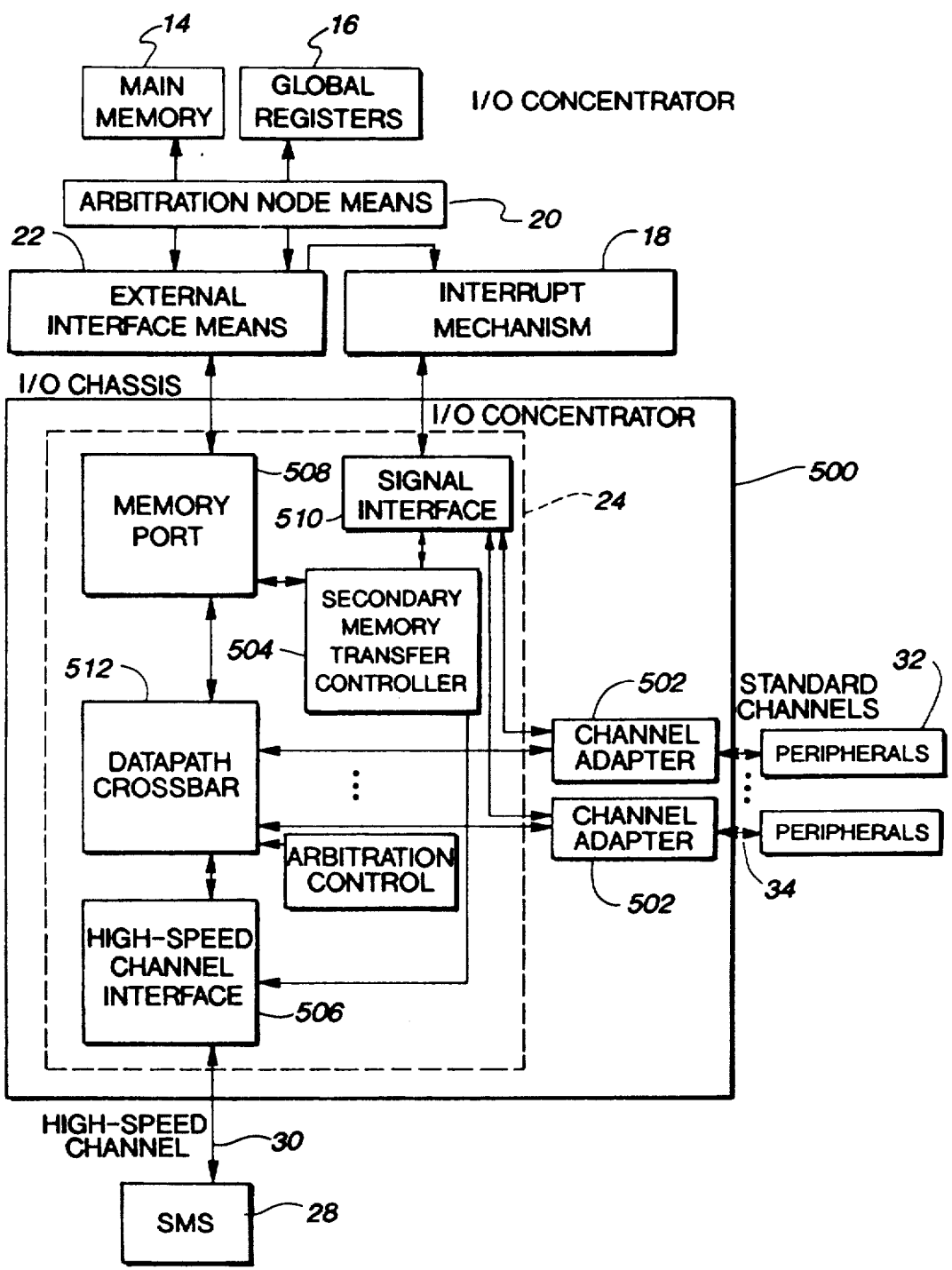
FIG. 29 is an overall block diagram of the I/O subsystem of the present invention.

Referring now to FIG. 29, the I/O subsystem of the present invention will be described. The I/O peripheral devices 32 are connected through the standard channels 34, the I/O concentrator means 24 and the external interface means 22 to the main memory 14 and global registers 16 and can directly read and write to these shared resources 12 within the same cluster 40, as well as in other clusters 40. The I/O peripheral devices 32 can also read and write to the secondary memory system (SMS) 28 associated with the same cluster 40, but cannot access the SMS 28 in other clusters 40. It should be noted that a path is not available to allow processors 10 and I/O peripheral devices 32 to directly exchange data. Any such exchanges must take place through main memory 14, SMS 28 or the global registers 16.

The I/O concentrator means 24 contains the data paths, switches, and control functions to support data transfers among the various I/O components. In the preferred embodiment, up to eight I/O concentrator means 24 are physically located within a single I/O chassis 500. Each I/O concentrator means 24 supports up to eight channel adapters 502 to the standard channels 34, a secondary memory transfer controller (SMTC) 504 that controls a high speed channel interface 506 to the high speed channel 30 and the SMS 28, a main memory port 508 that connects to the external interface means 22, a signal interface means 510 that distributes interrupt signals to and from the channel adapters 502 and the SMTC 504, and a datapath crossbar switch means 512. Each I/O concentrator means 24 can read or write a single, 64-bit in main memory 14 every other clock cycle. It can read or write a word to the SMS 28 while simultaneously accessing main memory 14.

Each channel adapter 502 contains the functions necessary to exchange data with an I/O peripheral device 32 over a standard I/O channel 34. The channel adapters 502 access main memory 14, SMS 28 and global registers 16, and send signals to the processors 10 through the I/O concentrator means 24. An I/O concentrator means 24 multiplexes access requests among the channel adapters 502 attached to it, routing data to the destination selected by a given transfer. All eight channel adapters 502 requesting data at the maximum rate require the maximum available rate from main memory 14 or the maximum available rate from SMS 28.

The SMTC 504 governs the exchange of blocks of data between main memory 14 and the SMS 28. These exchanges can proceed at the rate of one word every other clock cycle, which is the maximum rate possible for the memory port 508. All eight channels adapters 502 and a secondary memory request to the SMTC 504 may be active at the same time. Because the SMTC 504 is capable of requesting all available memory cycles, the relative allocation of cycles between the SMTC 504 and the channel adapters 502 is selectable. The SMTC allocation can range from all available to no memory cycles. This allocation is specified to the SMTC along with other transfer parameters when the transfer is started. The I/O concentrator means 24 uses this priority when allocating memory access among active requestors.

The cross bar switch 512 allows up to four transfers to occur in parallel each cycle. The possible sources and destinations are:

To main memory from a channel adapter or secondary memory
To secondary memory from a channel adapter or main memory
To a channel adapter from secondary memory
To a channel adapter from main memory Priority among the channels is based on a rotating priority scheme. Channel requests may be between 1 and n words in length. The bandwidth of the switch and I/O priority scheme is high enough to guarantee that all channels can be serviced at their maximum transfer rate. An I/O arbitration control network 514 similar to the arbitration networks previously described handles the resolution of competing requests in accordance with the priority allocation between the SMTC 504 and the channel adapters 502.

As previously discussed in connection with the Mark Data section, main memory write operations can complete out of order. As with the processors 10, an I/O peripheral device 34 and the SMS 28 can also use the Data Mark mechanism to determine when all prior references have completed. A marked reference is acknowledged by the memory system when the data has been written into memory. The channel adapters 502 or SMTC 504 can mark any block or group of references. All subsequent requests for this requestor are ignored until the marked writes have cleared the memory system.

Also as previously discussed in connection with the Interrupt Mechanism section, I/O peripheral devices 32 and the SMTC 504 are able to send and receive signals to the processors 10 in the same and other clusters. Signalling a processor 10 interrupts that processor's instruction execution stream, typically invoking an interrupt handler. Sending a signal to an I/O device such as the SMTC 504 causes the signalled device to take action characteristic of that device. A typical result is to cause the device to fetch a block of command information left in main memory.

In the preferred embodiment, there are thirty-two I/O concentrators means 24 in a single cluster, one per external interface means 22. The total I/O subsystem for each cluster 40 is capable of supporting 256 standard channels 34 (8 per concentrator means) and thirty-two SMTC's 504. Only full word (64-bit) access is supported, i.e., there are no partial word reads or writes. References to the I/O subsystem are also constrained to be aligned on full word boundaries, i.e. no byte offset is supported. A reference can be made to any address in a cycle. Requests for main memory transfers (reads or writes) may be initiated by either the channel adapters 502 or the SMTC 504. Error detection and correction is done at the main memory port 508.

In the preferred embodiment, the SMTC 504 controls transfers to the SMS 28. The only addressable unit in the SMS is a block thirty-two, 64-bit words. Transfers are constrained to begin on a block boundary. Requests for secondary memory transfers (reads or writes) may be initiated by either the channel adapters 502 or the SMTC 504. Transfers to the channel adapters 502 and to the main memory port 508 may proceed simultaneously. Error detection and correction is done at the SMTC 504.

The Instruction Set

Figure 30A:
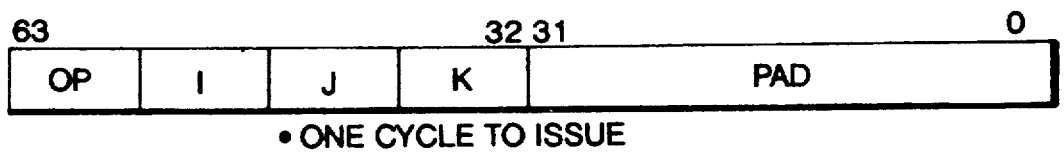
FIGS. 30a, 30b and 30c are schematic diagrams of the various instruction formats.
Figure 30B:
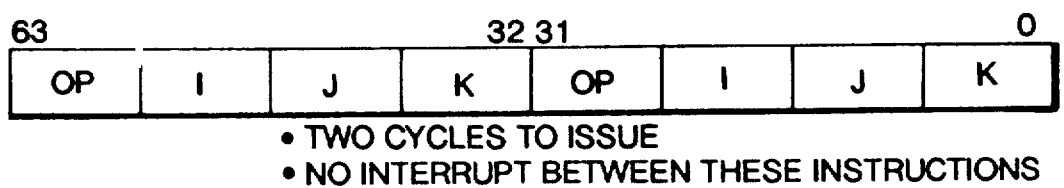
Figure 30C:
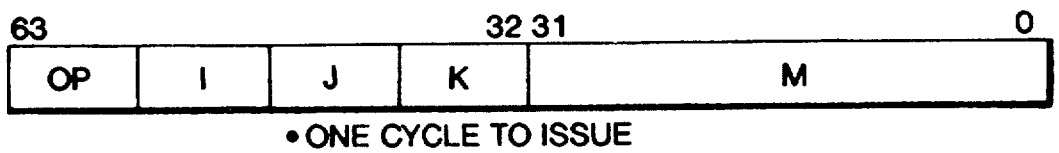

Referring now to FIGS. 30a–30c, the various instruction formats for the instruction set for the processor 100 will be described. Instructions are either one parcel (32 bits) or two parcels (64 bits). A two-parcel instruction may not cross a word boundary. Therefore, a 64-bit instruction may contain any one of the following: one two-parcel instruction (FIG. 30a), two one-parcel instructions to be executed with the upper parcel first (FIG. 30b), or a one-parcel instruction in the upper parcel and a pad code in the lower parcel (FIG. 30c). The pad code is not an instruction and does not take any time to execute.

The fields in the instruction format may contain various information. The "op" field contains an 8-bit op code. The "i" field usually designates the target of the instruction. This is either the number of an S register, or the one's complement of the number of V register. In memory stores, the "i" field designates the register to be stored. This field sometimes contains an opcode modifier, such as a comparison type. The "j" field usually designates one of the operands. If so, "j" must contain the number of an S register, or the one's complement of the number of a V register. Most instructions require that "j" specify a V register if and only if "i" specifies a V register. The "k" field either designates a register (S or V as above) for the second operand, or it contains an 8-bit signed constant to use as an operand. In instructions where one operand is a vector and the other is a scalar or constant, the "k" field is used for the scalar or constant. In some instructions, a combined "jk" or "ij" field is used for a 16-bit constant. The "m" field may contain a 32-bit constant for load-literal instructions or relative branches. It may be combined with the "j" and "k" field to form a 48-bit "jkm" field for load literal instructions or absolute addresses.

A summary of the instruction set for the present invention is set forth in Appendix A which is attached hereto. A detailed description of each instruction is set forth in Appendix B which is also attached hereto. A summary and detailed description of the various processor C registers that are controlled or affected by the instructions is set forth in Appendix C which is also attached hereto.

The Operating System and Context Switches

To understand how the operating system schedules processes also how the operating system accounts for the scheduling and of multiple processes to be run on the multiprocessor operating system of the present invention, it is important to describe the two timers that exist within each processor 100 and are used by the system: a Real Time Clock (RTC) and an Interval Timer (IT), and the procedures for handling the four types of interrupts that are used to perform context switches, including: Interrupt, Exception, Trap Instruction and Trap Return.

The RTC is a 64-bit counter that increments with each system clock cycle. It cannot be loaded under program control; it can only be initialized prior to system deadstart. Thus, if the RTC of each processor 100 is initialized to the same value and the processor clocks are started at one time, then the various RTCs will always contain identical values. The RTC can be used for timing the operation of programs, with two restrictions. First, time is real time. If a program is interrupted, swapped out, etc., the RTC still measures total elapsed time. Second, time is measured in clock cycles. A program must know the processor's clock frequency to convert the count into an elapsed time.

The IT is a 32-bit counter that decrements continuously. It may be loaded by system code. Whenever the IT is negative and the interrupt is enabled, an "Interval Timer Interrupt" is generated. The IT returns control to the operating system when a user's timeslice has expired. When the interrupt is generated, the IT nonetheless continues counting toward more negative numbers; thus the system may determine how much time beyond the allocated timeslice was actually used. If the elapsed time of each timeslice is saved and accumulated by the operating system, the IT may be used to determine how much processor time a program used. If the IT timer counts through its entire negative range and overflows back to positive numbers, a "watchdog fault" indication is sent to a Maintenance Control Unit, that is used to detect failed processors.

The basic processor scheduling mechanism within the multiprocessor system is a context switch. A processor context switch switches between user code and operating system code. A processor context switch may be made four ways: Interrupt, Exception, Trap Instruction and Trap Return.

As previously discussed in connection with the section on Interrupt Mechanism, interrupts are events which are outside the control of the currently executing program, and which preempt the processor so that it may be used for other purposes. An interrupt may be caused by: (1) an I/O device; (2) another processor, via the signal instruction; or (3) the interval timer (IT) reaching a negative value. Interrupts may be masked via the SM register. If so, pending interrupts are held at the processor until the mask bit is cleared. If multiple interrupts are received before the first one takes effect, the subsequent interrupts do not have any additional effect. Interrupt-handling software must determine via software convention the source of an interrupt from other processors or from I/O. It may read the IT register to determine if a timeslice has expired (although it does not necessarily know if it expired before or after the interrupt was taken).

An exception terminates the currently executing program because of some irregularity in its execution. The causes are: (1) Operand Range Error: a data read or write cannot be mapped; (2) Program Range Error: an instruction fetch cannot be mapped; (3) Write Protect violation: a data write is to a protected segment; (4) Double bit Ecc error; (5) Floating-point exception; (6) Instruction protection violation: an attempt to execute certain privileged instructions from non-privileged code; (7) Instruction alignment error: a two-parcel instruction in the lower parcel of a word; and (8) Invalid value in SM (i.e., the valid bit not set.)

In general, exceptions do not take effect immediately; several instructions may execute after the problem instruction before the context switch takes place. In addition, an exception will never be taken between two one-parcel instructions in the same word. Some exceptions may be controlled by bits in the User Mode register. If masked, the condition does not cause an exception. Unlike interrupts, the condition is not saved pending a change to the mask; except for the floating point conditions, which are recorded in the User Status register, no record is kept of masked errors.

An interrupt takes precedence over an exception if: (1) an interrupt occurs at the same time as an exception; (2) an interrupt occurs while waiting for current instructions to complete after exception; (3) an exception occurs while waiting for instructions to complete after an interrupt. In these cases, the cause of the exception will be saved in the ES (Exception Status) register. If the interrupt handler reenables exceptions, or executes an rtt instruction, which reenables exceptions, the exception will be taken at that time.

A voluntary context switch into system code can be made via the trap instruction. The System Call Address (SCA) register provides a base address for a table of entry points, but the entry point within the table is selected by the 't' field of the instruction. Thus 256 separate entry points are available for operating system calls and other services requiring low latency access to privileged code. Unlike interrupts and exceptions, a trap is exact; that is, no instructions after the trap will be executed before the trap takes effect. The operating system returns to the program code via the trap return. The trap operation, caused by the rtt instruction, is also used whenever the system code wishes to cause a context switch to do any of the following: (1) Restart a program that was interrupted or had an exception; (2) Return to a program that executed a trap instruction; (3) Initiate a new user program; or (4) Switch to an unrelated system or user mode task.

Figure 31:
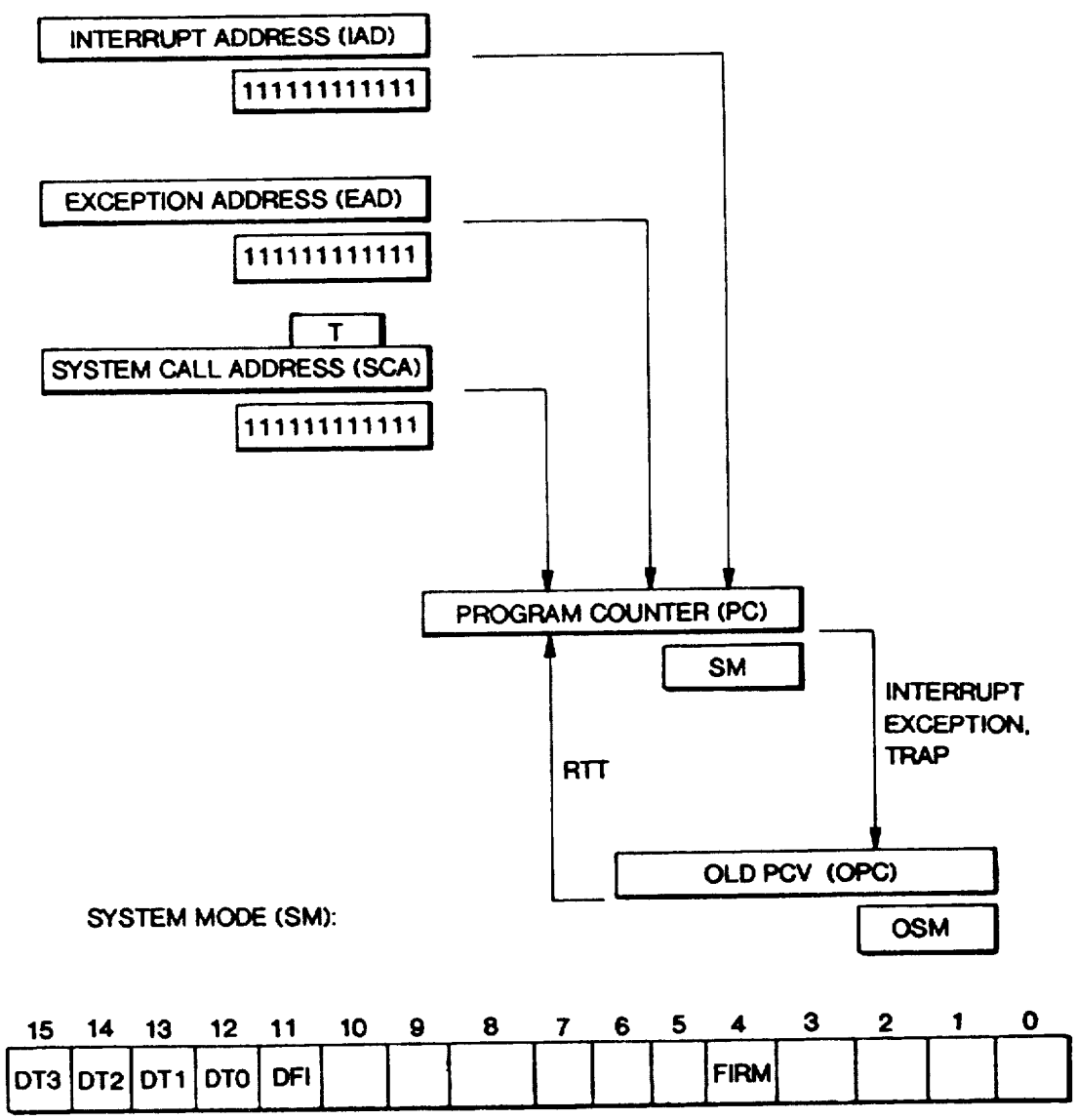
FIG. 31 is a schematic flow diagram showing the processing of an interrupt, exception or system call.

There is a common method of responding to interrupts, exceptions, and traps. As shown in FIG. 31, the handler routine saves the registers it is to use, if it is to return to the suspended program with those registers intact. This includes S, L, V, and control registers, none of which is automatically saved. In each case, these steps are performed:

- Wait for word boundary or completion of delayed jump. That is, if the next instruction waiting to issue is the second parcel of a word, or is a delay instruction following a delayed jump, wait until it issues. (This step is not done for trap instructions.)
- Move the PC register (adjusted so that it points to the next instruction to be executed) into the OPC register.
- Move the SM register into the OSM register.
- Load the PC register from either IAD, EAD, or SCA. (If SCA, 'or' in the shifted 't' field to form one of 256 possible entry points.)
- Set the SM register to all ones. This disables interrupt and exceptions, disables mapping of instructions and data, and sets privileged mode
- Resume execution at the new address.

Using The Present Invention

To better understand how the present invention will be used, it is helpful to define some of the terms that describe the execution of a job or program on the highly parallel computer processing system of the present invention. The term job or program refers to a complete user application program that may be represented in the operating system software as a collection of one or more tasks or processes. Because a program that is run on a parallel computer processing system may be executed on any number of processors, it is necessary to define two sets of terms for dividing the program into segments that may be run in parallel. The first set of terms refers to the pertaining of the program into parallel segments by a compiler. The second set of terms refers to how the operating system will actually divide those partitioned segments to be executed among a number of parallel processors.

In compiling a program to be run on the parallel computer processing system of the present invention, a compiler will perform a process known as multithreading, either on its own or in response to instructions in the source code for the job. Multithreading is the logical decomposition of a user's program into tasks, without regards for the number of processors that will execute the tasks. The term task is used by the compiler and refers to a thread of execution in a program that may, without synchronization, execute at the same time as other tasks. A thread is defined as an independent sequence of executable code.

Once the tasks are compiled, the program is ready to be scheduled for execution by the operating system. At this point, the parallel portions of the program are now referred to as processes. While it may be possible to partition a program into several tasks, it is not necessary that all or even most of these tasks be divided among different processors for execution. Hence, a process is defined as one or more tasks and an associated process image that are independently scheduled by the operating system to run on a processor. The process image is the representation of the process' resources within the operating system, such as the process' execution context information (memory allocation, registers, I/O tables, etc.), the context information for operating system subroutines called by the process, and the executable code and data for the process. The operating system is then responsible for assigning and synchronizing the processes that comprise a program among the various processors 10, external interface means 22 and shared resources 12 in the present invention.

With this understanding it is now possible to explain how the architecture of the present invention allows a multiplexer system to realize parallel performance for traditional applications. In the present invention it is not necessary to rewrite the application programs for a particular memory-hierarchy. In addition, pipelining techniques are used at each of requestor/resource operation to increase the parallel utilization of resources within the multiprocessor system.

The various mechanisms that allow the operating system and user programs to coordinate and synchronize the various resources of the multiprocessor system include, without limitation: the arbitration node means; the distributed I/O subsystem; the global registers and the atomic operations such as TAS, FAA and FCA that may be operate on the global registers; Memory Mapping; the Out-of-Order Access, Tagging and Data Mark mechanisms; the Load and Flag mechanism, the Fast Interrupt Facility; the simultaneous scaler and vector operation; and the four-way associative instruction cache. Together, and individually, these mechanisms support the symmetric access to shared resources and the multi-level pipeline operation of the multiprocessor system of the present invention.

By using the cluster architecture as described and claimed in the present invention, a computer processing environment is created in which parallelism is favored. The number of processors in the multiprocessor system of the present invention can be increased above the presently minimally parallel computer processing systems into the highly parallel range of computer processing systems, thereby increasing the problem solving space of the multiprocessor system while at the same time increasing the processing speed of the system. The features of the present invention allow a parallel processing operating system to perform repeatable accounting of parallel code execution without penalizing users for producing such parallel code. Effective debugging of such parallel code is also supported because of the particular interrupt mechanisms previously described. The end result is that the multiprocessor system of the present invention can provide consistent and repeatable answers using traditional application programs with both increased performance and throughput of the system.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A high parallel computer processing system, comprising:
   C multiprocessor clusters operably connected to one another, where C is an integer between 2 and 256, inclusive, each multiprocessor cluster comprising:
      a shared memory means for physically storing and retrieving data and instructions to be executed by the computer processing system as part of a single common logical address space without duplicate address spaces that includes all of said shared memory means of all of said C multiprocessor clusters;
      P processors means for executing said instructions and directly operating on said data in said shared memory means of any of said C multiprocessor clusters, where P is an integer between 4 and 256, inclusive;
      Q distributed external interface means for transferring said data and said instructions between said shared memory means and one or more external data sources, where Q is an integer between 2 and 256, inclusive;
      Z arbitration node means, each arbitration node means having one or more unique direct connection paths between said shared memory means in this multiprocessor cluster and a unique two or more of said processor means, and a unique one or more of said distributed external interface means, for symmetrically multiplexing said processor means and said distributed external interface means with said shared memory means, where Z is an integer between 2 and 128, inclusive; and
      remote cluster adapter means operably connected to each of said Z arbitration node means and to said shared memory means in this multiprocessor cluster and to a remote cluster adpater means in all other of said multiprocessor clusters for allowing said Z arbitration node means of this multiprocessor cluster to access said shared memory means of all other of said multiprocessor clusters and for allowing all other of said multiprocessors to access said shared memory means of this multiprocessor cluster.

2. The computer processing system of claim 1 wherein each of said processor means comprises:
   a vector processor having a plurality of vector registers, a plurality of vector functional units, and at least one vector access port; and
   a scalar process having a plurality of scalar registers, a plurality of scalar functional units, instruction decode logic, and at least one scalar access port, such that said vector access ports and said scalar access ports are connected to said arbitration node means to provide multiple connection paths between said arbitration node means and said processor means in addition to said one or more direct connection paths between said arbitration node means and said shared memory means.

3. The computer processing system of claim 1 wherein said shared memory means for each multiprocessor cluster comprises:
   S sections of main memory, each section having a separate direct connection path with each of said Z arbitration node means in this multiprocessor cluster for storing and retrieving said data and said instructions, where S is an integer between 2 and 256, inclusive.

4. The computer processing system of claim 1 wherein said remote cluster adapter means comprises:
   a node remote cluster adapter (NRCA) means for allowing said Z arbitration node means to access said remote cluster adapter means of all other of said multiprocessor clusters; and
   a memory remote cluster adapter (MRCA) means for controlling access to said shared resource means of this cluster by said remote cluster adapter means of all other of said multiprocessor clusters.

5. The computer processing system of claim 1 wherein said external data sources include one or more secondary memory systems and a plurality of channel adapters and wherein an I/O concentrator means is uniquely attached to each of said external interface means for multiplexing said data and said instructions from said external data sources to and from said external interface means.

6. The computer processing system of claim 1 wherein each multiprocessor cluster further comprises:
   global register means uniquely connected to each of said arbitration node means and said remote cluster adapter means in this multiprocessor cluster for storing and retrieving data and including an arithmetic and logic unit means for operating on said data separate from any operations performed by said processor means; and interrupt means uniquely connected to each of said arbitration node means and said remote cluster adapter means in this multiprocessor cluster for receiving and sending interrupt signals, such that said shared memory means, said global register means and said interrupt means together comprise a set of shared resources which are symmetrically accessible to all of said processor means in this multiprocessor cluster, as well as all of said processor means in all other of said multiprocessor clusters.

7. The highly parallel computer processing system of claim 1 wherein each connection path between said arbitration node means and said shared memory means is comprised of two or more unique unidirectional direct connection paths, each of said unidirectional connection paths between said arbitration node means and said shared memory means having one or more queue means for storing a plurality of requests sent to said shared memory and each of said unidirectional connection paths between said shared memory means and said arbitration node means having one or more queue means for storing a plurality of responses returned from said shared memory.

8. A highly parallel computer processing system comprising:

a single shared memory means for storing and retrieving data and instructions to be executed by the computer processing system as part of one common logical address space without duplicate address spaces;

P processor means for executing said instructions and operating directly on said data in said shared memory means, where P is an integer between 4 and 256, inclusive; and Z arbitration node means, each arbitration node means having two or more unique unidirectional direct connection paths between said shared memory means and a unique two or more of said processor means for symmetrically multiplexing said unique two or more processors with said shared memory means, where Z is an integer between 2 and 128, inclusive.

9. The computer processing system of claim 8 wherein each of said processor means comprises:

a vector processor having a plurality of vector registers, a plurality of vector functional units, and at least one vector access port; and a scaler processor having a plurality of scaler registers, a plurality of scaler functional units, instruction decode logic, and at least one scaler access port, such that said vector access ports and said scaler access ports are connected to said arbitration node means to provide multiple connection paths between said arbitration node means and said processor means in addition to said two or more unique unidirectional direct connection paths between said arbitration node means and said shared memory means.

10. The computer processing system of claim 8 wherein said shared memory means for each multiprocessor cluster comprises:

S sections of main memory, each section having a separate direct connection path for storing and retrieving said data and said instructions, where S is an integer between 2 and 256, inclusive.

11. The computer processing system of claim 8 further comprising:

O distributed external interface means, each distributed external interface means operably connected to a unique one of said Z arbitration node means for transferring data and control information between said shared resource means and one or more external data sources, where O is an integer between 4 and 256, inclusive, and wherein the ratio between O and Z is greater than or equal to 2;

wherein said external data sources include one or more secondary memory systems and a plurality of channel adapters and wherein an I/O concentrator means is uniquely attached to each said external interface means for multiplexing said data and said instructions from said external data sources to and from said external interface means.

12. The computer processing system of claim 8 wherein each multiprocessor cluster further comprises:

global register means uniquely connected to each of said arbitration node means and said remote cluster adapter means in this multiprocessor cluster for storing, manipulating and retrieving data; and interrupt means uniquely connected to each of said arbitration node means and said remote cluster adapter means in this multiprocessor cluster for receiving and sending interrupt signals, such that said shared memory means, said global register means and said interrupt means together comprise a set of shared resources which are symmetrically accessible to all of said processor means in this multiprocessor cluster, as well as all of said processor means in all other of said multiprocessor clusters.

13. The highly parallel computer processing system of claim 8 wherein each of said unidirectional connection paths between said arbitration node means and said shared memory means includes one or more queue means for storing a plurality of requests sent to said shared memory and each of said unidirectional connection paths between said shared memory means and said arbitration node means includes one or more queue means for storing a plurality of responses returned from said shared memory.

14. A highly parallel computer processing system, comprising:

C multiprocessor cluster operably connected to one another, wherein C is an integer between 2 and 256, inclusive, each multiprocessor cluster comprising:

a shared memory means for physically storing and retrieving data and instructions to be executed by the computer processing system as part of a single common logical address space without duplicate address spaces that includes all of said shared memory means of all said C multiprocessor clusters;

P processor means for executing said instruction and directly operating on said data in said shared memory means of any of said C multiprocessor clusters, wherein P is an integer between 4 and 256, inclusive;

Z arbitration node means, each arbitration node means having one or more direct connection paths that connect a unique two or more of said processor means and said shared memory means for symmetrically multiplexing said unique two or more processor means with said shared memory means, wherein Z is an integer between 2 and 128, inclusive; and remote cluster adapter means operably connected to each of said Z arbitration node means and to said shared memory means in this multiprocessor cluster and to a remote cluster adapter means in all other of said multiprocessor clusters for allowing said Z arbitration node means of this multiprocessor cluster to access said shared memory means of all other of said multiprocessor clusters and for allowing all other of said multiprocessor clusters to communicate one or more remote accesses to said shared memory means of this multiprocessor cluster and arbitrating among said remote accesses to grant access to said shared memory means of this multiprocessor cluster.

15. The highly parallel computer processing system of claim 14 wherein said processor means comprises:
- a vector processor having a plurality of vector registers, a plurality of vector functional units, and at least one vector access port; and
- a scalar processor having a plurality of scalar registers, a plurality of scalar functional units, instruction decode logic, and at least one scalar access port, such that said vector access ports and said scalar access ports are connected to said arbitration node means to provide multiple connection paths between said arbitration node means and said processor means in addition to said connection between said arbitration node means and said shared memory means.

16. The highly parallel computer processing system of claim 14 wherein said shared memory means for each multiprocessor cluster comprises:
- S sections of main memory, each section having a separated direct connection path with each of said Z arbitration node means in this multiprocessor cluster for storing and retrieving said data and said instructions, where S is an integer between 2 and 256, inclusive.

17. The highly parallel computer processing system of claim 14 wherein said remote cluster adapter means comprises:
- a node remote cluster adapter (NRCA) means for allowing said Z arbitration node means to access said remote cluster adapter means of all other of said multiprocessor cluster; and
- a memory remote cluster adapter (MRCA) means for controlling access to said shared resource means of this cluster by said remote cluster adapter means of all other of said multiprocessor clusters.

18. The highly parallel computer processing system of claim 14 wherein each multiprocessor cluster further comprises:
- global register means uniquely connected to each of said arbitration node means and said remote cluster adapter means in this multiprocessor cluster for storing, manipulating and retrieving data; and
- interrupt means uniquely connected to each of said arbitration node means and said remote cluster adapter means in this multiprocessor cluster for receiving and sending interrupt signals, such that said memory means, said global register means and said interrupt means together comprise a set of shared resources which are symmetrically accessible to all of said processor means in this multiprocessor cluster, as well as all of said processor means in all other of said multiprocessor clusters.

19. The highly parallel computer processing system of claim 14 wherein each connection path between said arbitration node means and said shared memory means is comprised of two or more unique unidirectional direct connection paths, each of said unidirectional connection paths between said arbitration node means and said shared memory means having one or more queue means for storing a plurality of requests sent to said shared memory and each of said unidirectional connection paths between said shared memory means and said arbitration node means having one or more queue means for storing a plurality of responses returned from said shared memory.

* * * * *

UNITED STATES PATENT AND TRADEMARK OFFICE
CERTIFICATE OF CORRECTION

PATENT NO. : 5,197,130

DATED : March 23, 1993

INVENTOR(S) : Steve S. Chen et al.

It is certified that error appears in the above-indentified patent and that said Letters Patent is hereby corrected as shown below:

Column 6, Line 26, please delete "time".

Column 13, Line 8, please delete "0-(buffers" and insert --0-31(buffers-- therefor.

Column 17, Line 45, please delete "44 12," and insert --44,-- therefor.

Column 17, Lines 45 - 46, please delete "selection" and insert --section-- therefor.

Column 28, Line 20, please delete "means 26 will" and insert --means will-- therefor.

Column 31, Line 17, please delete "block thirty-two", and insert --block of thirty-two-- therefor.

UNITED STATES PATENT AND TRADEMARK OFFICE
CERTIFICATE OF CORRECTION

PATENT NO. : 5,197,130

DATED : March 23, 1993

INVENTOR(S) : Steve S. Chen et al.

It is certified that error appears in the above-indentified patent and that said Letters Patent is hereby corrected as shown below:

Column 32, Lines 35 - 36, please delete "numbers: thus" and insert --numbers; thus-- therefor.

Column 34, Line 4, please delete "interrupt" and insert --interrupts-- therefor.

Column 34, Line 22, please delete "pertaining" and insert --partitioning-- therefor.

Column 34, Line 34, please delete "regards" and insert --regard-- therefor.

Column 36, Line 3, please delete "means, and" and insert --means and-- therefor.

Column 36, Line 5, please delete "means, for" and insert --means for-- therefor.

Column 39, Line 39, please delete "separated" and insert --separate-- therefor.

Column 40, Line 7, please delete "cluster" and insert --clusters-- therefor.

Signed and Sealed this

Twenty-seventh Day of May, 1997

BRUCE LEHMAN

Attest:

Attesting Officer

Commissioner of Patents and Trademarks